(12) United States Patent
Kuze et al.

(10) Patent No.: US 7,283,435 B2
(45) Date of Patent: Oct. 16, 2007

(54) OPTICAL DISC DEVICE

(75) Inventors: Yuuichi Kuze, Settsu (JP); Kenji Fujiune, Takatsuki (JP); Takashi Kishimoto, Nara (JP); Shin-ichi Yamada, Katano (JP); Katsuya Watanabe, Nara (JP); Akihiro Yasuda, Katano (JP); Shin-ichi Kadowaki, Sanda (JP); Kousei Sano, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 559 days.

(21) Appl. No.: 10/481,206

(22) PCT Filed: Jul. 4, 2002

(86) PCT No.: PCT/JP02/06824

§ 371 (c)(1),
(2), (4) Date: Jun. 17, 2004

(87) PCT Pub. No.: WO03/005352

PCT Pub. Date: Jan. 16, 2003

(65) Prior Publication Data

US 2004/0218484 A1    Nov. 4, 2004

(30) Foreign Application Priority Data

Jul. 5, 2001   (JP) .............................. 2001-204325
Feb. 15, 2002  (JP) .............................. 2002-038104

(51) Int. Cl.
*G11B 7/00* (2006.01)

(52) U.S. Cl. ................................. 369/44.23; 369/44.32
(58) Field of Classification Search ...................... None
See application file for complete search history.

(56) References Cited

U.S. PATENT DOCUMENTS 6,229,600 B1    5/2001  Martynov
(Continued)

FOREIGN PATENT DOCUMENTS

JP    2002-157750    5/2002

OTHER PUBLICATIONS

Shimano et al., "Spherical Aberration Detection for HD-DVD Optical Pickups", *International Symposium on Memory 2000 at Chitose, Hokkaido, Japan*, pp. 242-243, (2002).

(Continued)

*Primary Examiner*—William Korzuch
*Assistant Examiner*—Peter Vincent Agustin
(74) *Attorney, Agent, or Firm*—Akin Gump Strauss Hauer & Feld LLP

(57) ABSTRACT

An optical disc device of the present invention includes spherical aberration changing means for changing spherical aberration occurring on a converging position of a light beam converged by a lens, an actuator for moving the spherical aberration changing means in a relatively precise manner, and an actuator for moving the spherical aberration changing means in a relatively rough manner. The optical disc device drives a second actuator and a third actuator based on a signal of spherical aberration detecting means and performs control so that spherical aberration is almost 0. The third actuator moves the spherical aberration changing means based on a direct current component included in a signal of the spherical aberration detecting means, and the second actuator moves the spherical aberration changing means based on an alternating current component included in the signal of the spherical aberration detecting means.

5 Claims, 60 Drawing Sheets

U.S. PATENT DOCUMENTS

| | | | |
|---|---|---|---|
| 6,430,137 B1 * | 8/2002 | Saimi et al. | 369/112.1 |
| 6,584,065 B1 * | 6/2003 | Maeda et al. | 369/275.1 |
| 6,807,133 B2 * | 10/2004 | Ariyoshi et al. | 369/44.42 |
| 2001/0019528 A1 * | 9/2001 | Shiono et al. | 369/112.08 |
| 2002/0018406 A1 * | 2/2002 | Yamada | 369/44.23 |
| 2002/0036958 A1 * | 3/2002 | Wada et al. | 369/44.23 |
| 2002/0057359 A1 * | 5/2002 | Tadano et al. | 348/335 |
| 2002/0150016 A1 * | 10/2002 | Yasuda et al. | 369/53.22 |

OTHER PUBLICATIONS

Osato et al., "Progress in Optical Disk Recording With Over 20 GB of Capacity", *Optical Data Storage 2000 at British Columbia, Canada*, pp. 15-17, (2000).

* cited by examiner

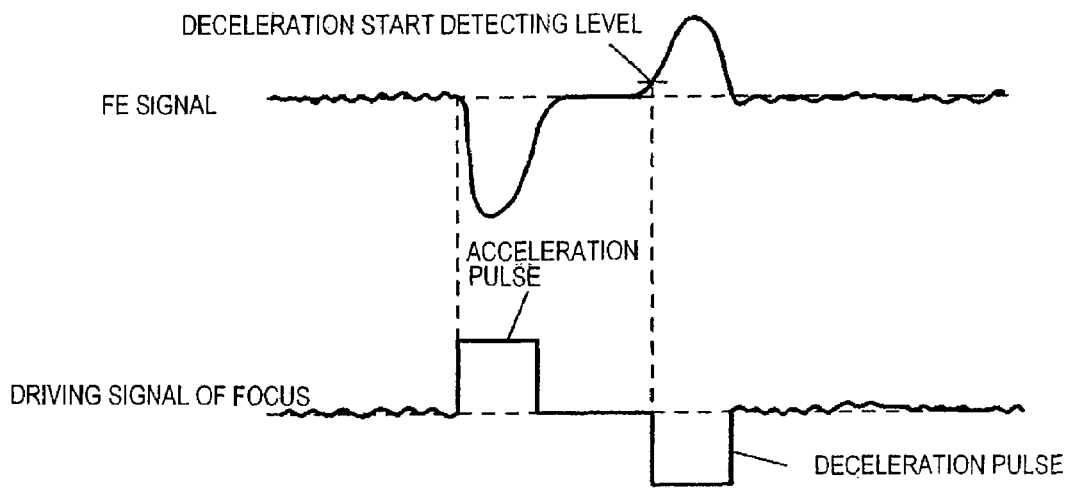
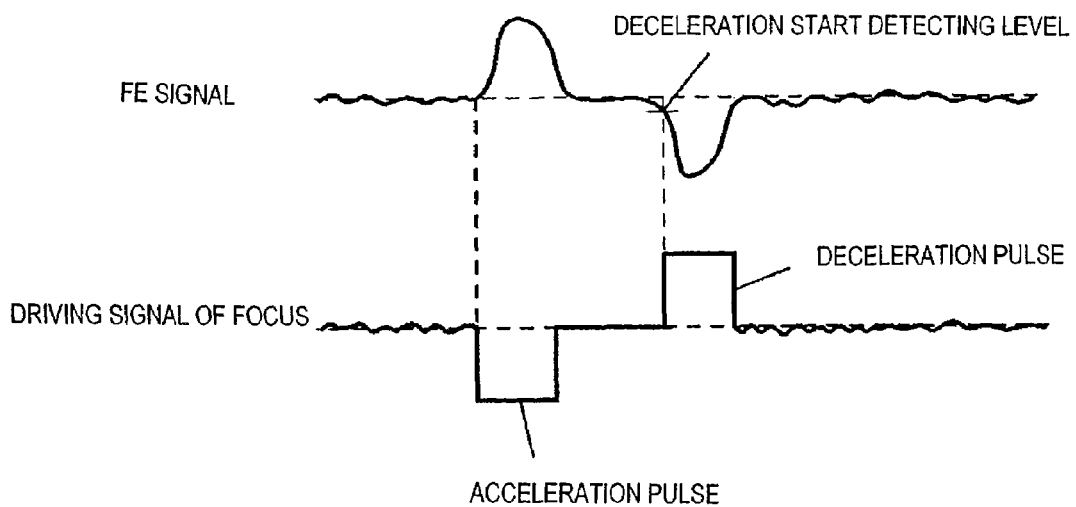
FIG. 6 (Prior Art)

FIG.12
(a) SPHERICAL ABERRATION DETECTION SIGNAL
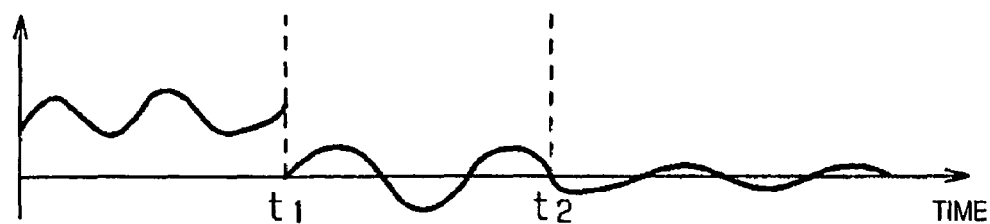
(b) BEAM EXPANDER ROUGH DRIVING SIGNAL
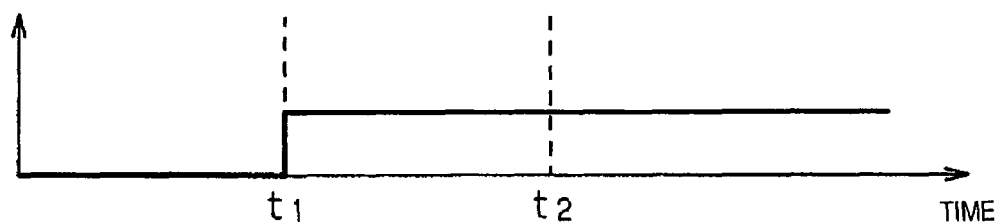
(c) BEAM EXPANDER PRECISE DRIVING SIGNAL
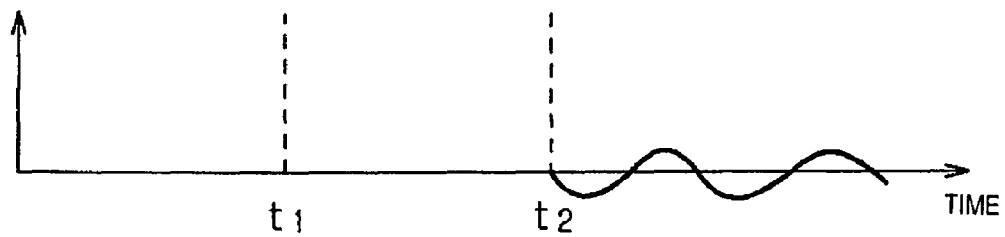

FIG.14
(a) SPHERICAL ABERRATION DETECTION SIGNAL
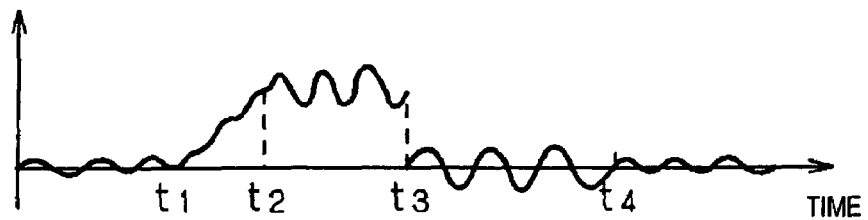
(b) BEAM EXPANDER ROUGH DRIVING SIGNAL
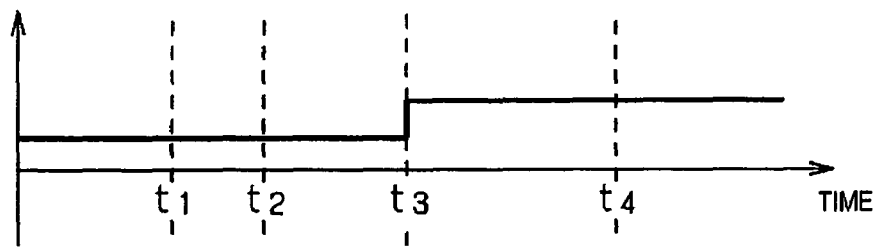
(c) BEAM EXPANDER PRECISE DRIVING SIGNAL
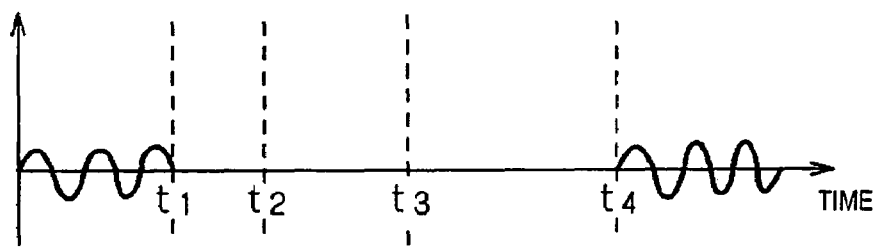
(d) FOCUS DRIVING SIGNAL
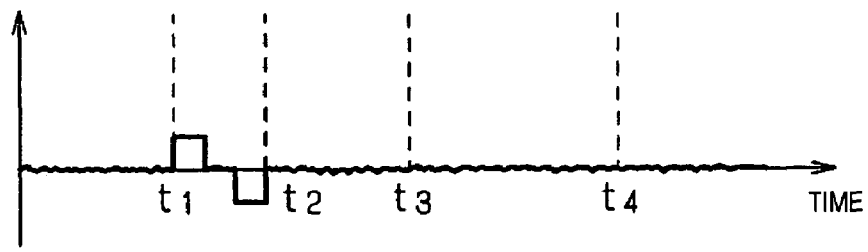

FIG.18
(a) SPHERICAL ABERRATION DETECTION SIGNAL
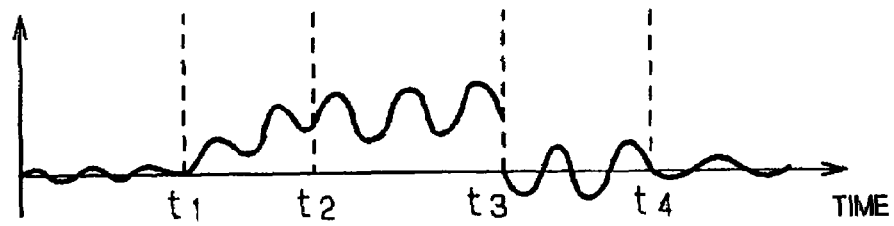
(b) BEAM EXPANDER ROUGH DRIVING SIGNAL
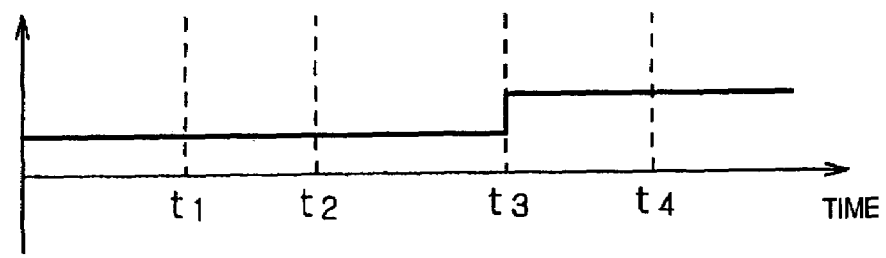
(c) BEAM EXPANDER PRECISE DRIVING SIGNAL
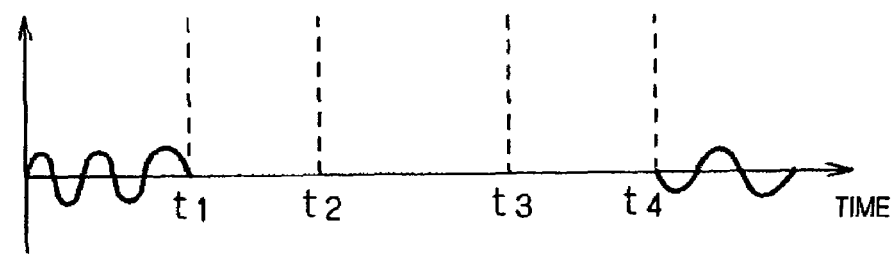
(d) TRANSFER TABLE DRIVING SIGNAL
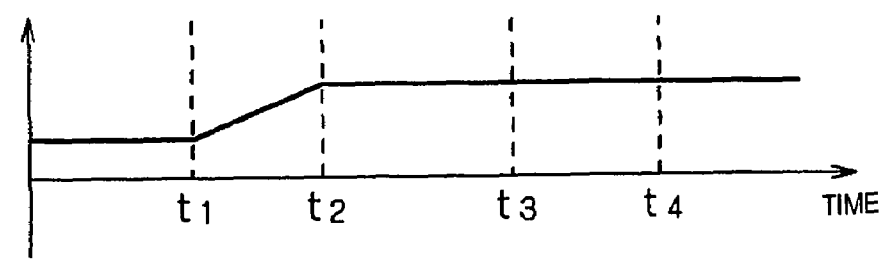

FIG.22
(a) SPHERICAL ABERRATION DETECTION SIGNAL
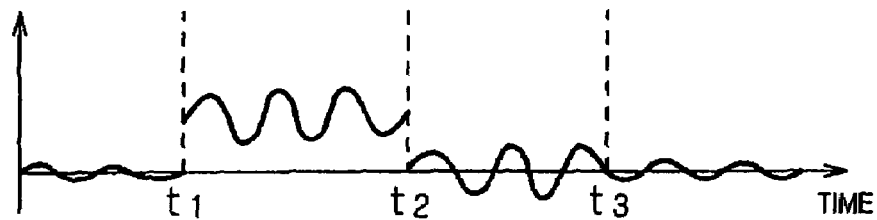
(b) BEAM EXPANDER PRECISE DRIVING SIGNAL
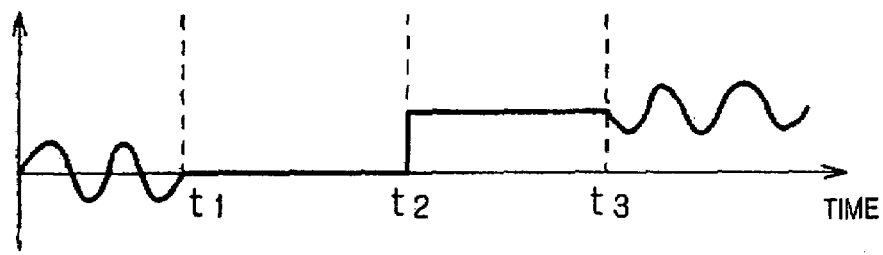
(c) OFFSET SIGNAL
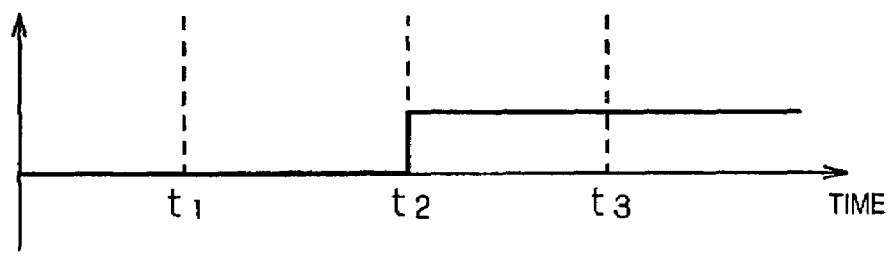
(d) FOCUS DRIVING SIGNAL
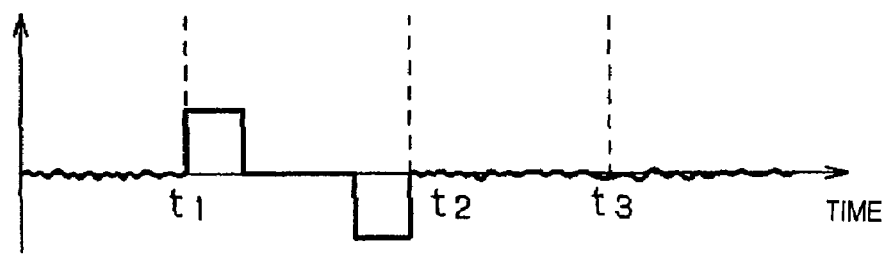

FIG.25
(a) SPHERICAL ABERRATION DETECTION SIGNAL
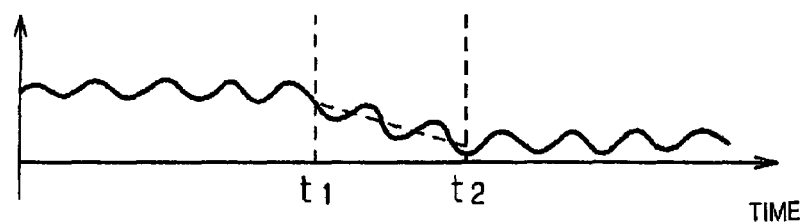
(b) BEAM EXPANDER ROUGH DRIVING SIGNAL
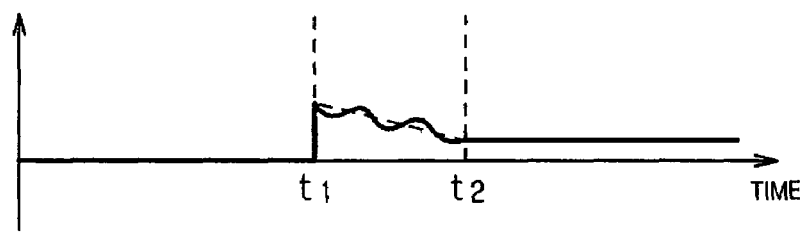
(c) STEPPING MOTOR POSITION
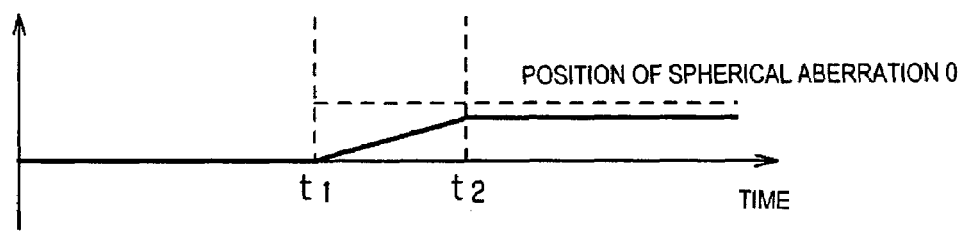
(d) SPHERICAL ABERRATION DETECTION SIGNAL AFTER DEAD BAND PROCESSING
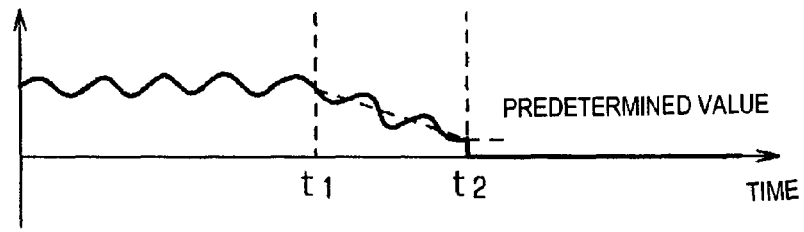

FIG.27
(a) OPTIMUM THICKNESS
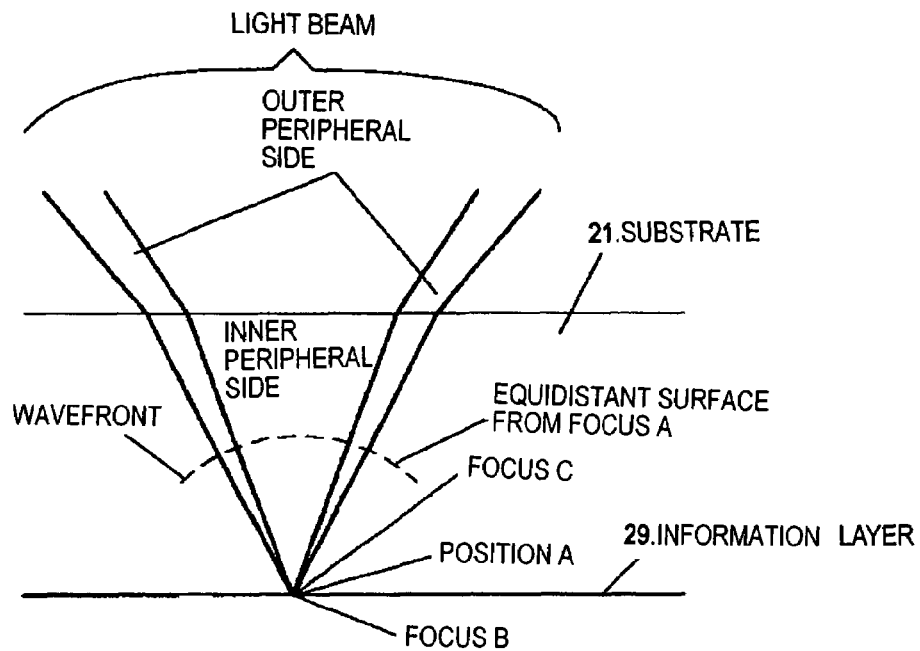
(b) SMALL THICKNESS
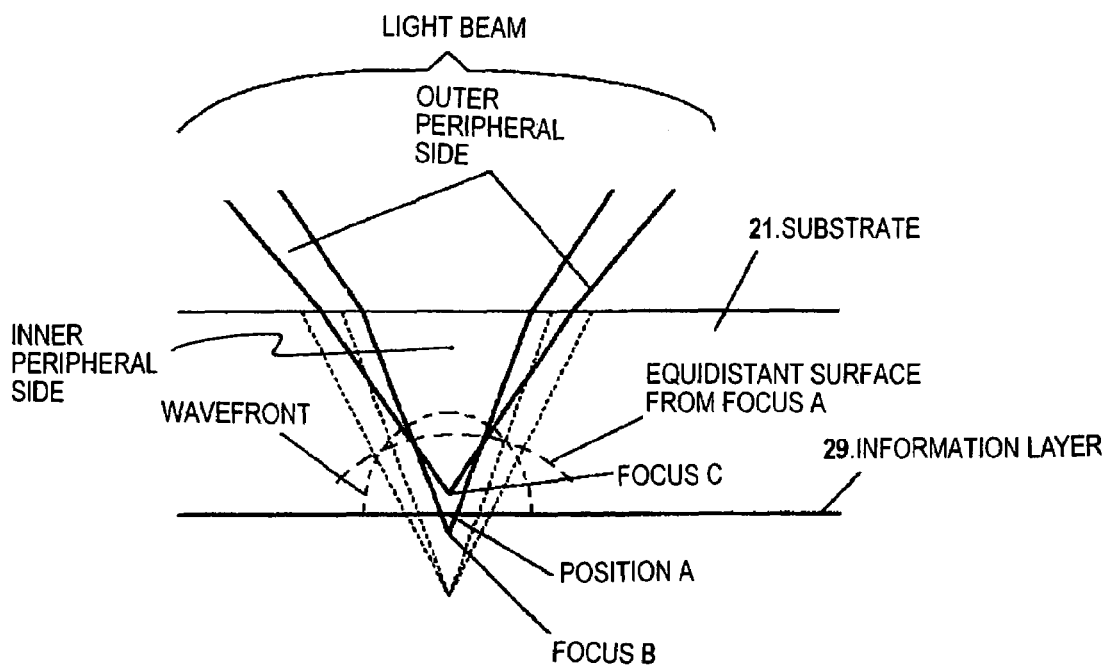

JITTER CHARACTERISTIC RELATIVE TO
SPHERICAL ABERRATION AND DEFOCUS

OPEN LOOP CHARACTERISTIC
(GAIN CROSSOVER 2 KHz)

OPEN LOOP CHARACTERISTIC
(GAIN CROSSOVER 300 Hz)

FIG.49
(a) DIVISION RATIO 50%
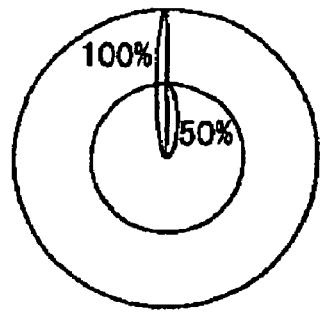
(b) OUTER PERIPHERAL FOCUS ERROR SIGNAL
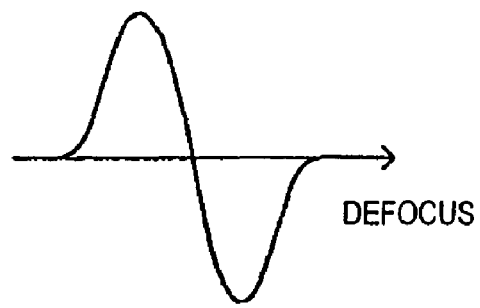
DEFOCUS
(c) INNER PERIPHERAL FOCUS ERROR SIGNAL
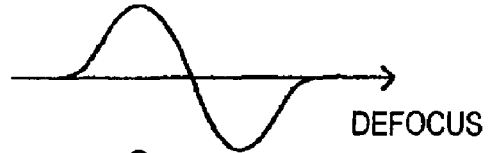
DEFOCUS
(d) FOCUS ERROR SIGNAL
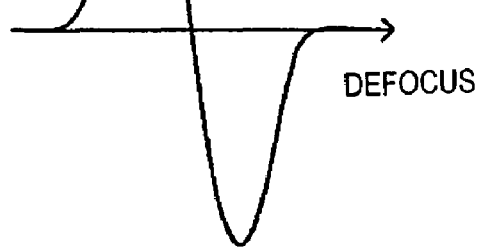
DEFOCUS
(e) SPHERICAL ABERRATION DETECTION SIGNAL
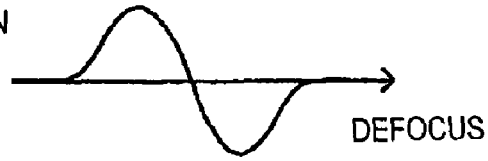
DEFOCUS

FIG.50
(a) DIVISION RATIO 75%
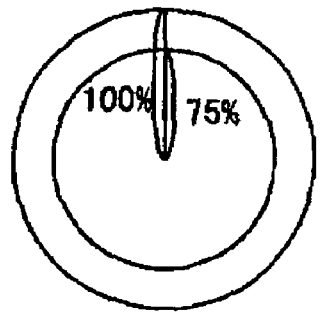
(b) OUTER PERIPHERAL FOCUS ERROR SIGNAL
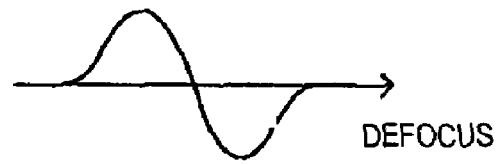
DEFOCUS
(c) INNER PERIPHERAL FOCUS ERROR SIGNAL
DEFOCUS
(d) FOCUS ERROR SIGNAL
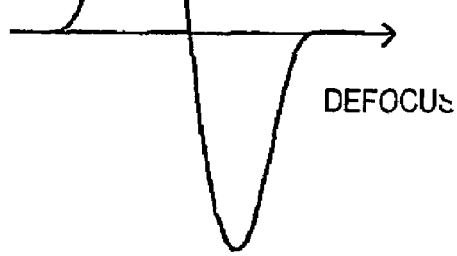
DEFOCUS
(e) SPHERICAL ABERRATION DETECTION SIGNAL
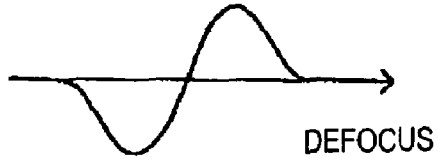
DEFOCUS

FIG.51
(a) DIVISION RATIO 75%
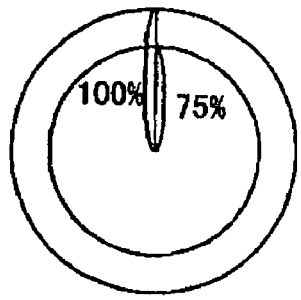
(b) OUTER PERIPHERAL FOCUS ERROR SIGNAL
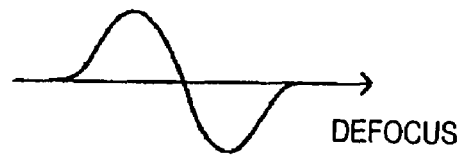
DEFOCUS
(c) INNER PERIPHERAL FOCUS ERROR SIGNAL
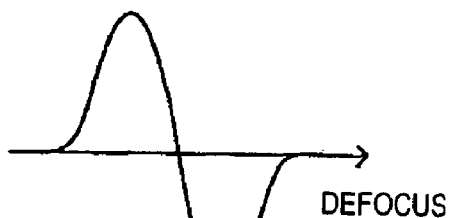
DEFOCUS
(d) FOCUS ERROR SIGNAL
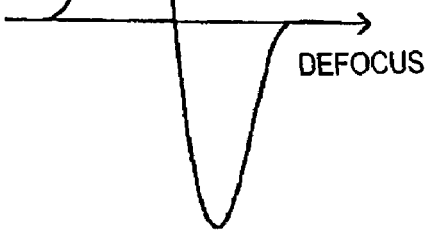
DEFOCUS
(e) SPHERICAL ABERRATION DETECTION SIGNAL
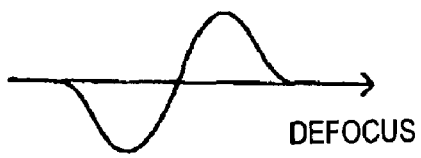
DEFOCUS

FIG.52
(a) INFORMATION LAYER L1
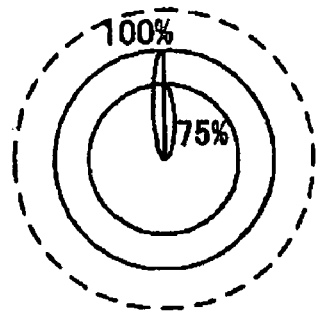
(b) OUTER PERIPHERAL FOCUS ERROR SIGNAL
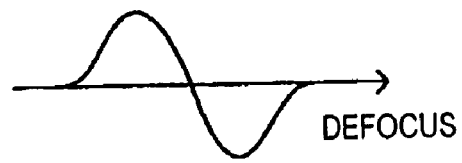
(c) INNER PERIPHERAL FOCUS ERROR SIGNAL
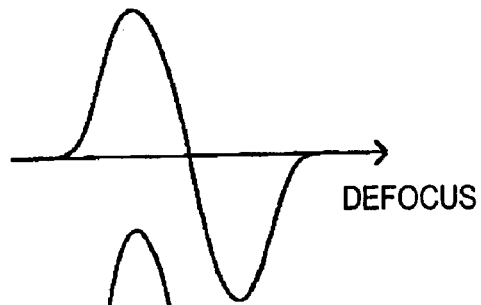
(d) FOCUS ERROR SIGNAL
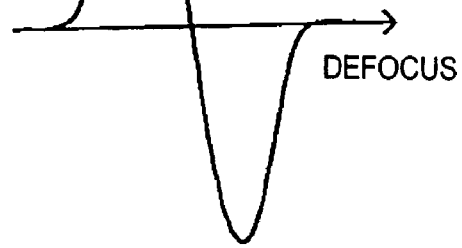
(e) SPHERICAL ABERRATION DETECTION SIGNAL
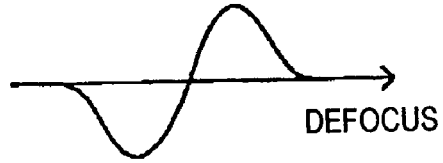

OPTICAL DISC DEVICE

TECHNICAL FIELD

The present invention relates to an optical disc device or apparatus which records and reproduces optical information. The present invention particularly relates to an optical disc device which can accurately correct spherical aberration occurring on a converging position of a light beam and perform data recording and reproduction with a high density even if a lens having a large numerical aperture is used to converge the light beam.

BACKGROUND ART

As storage mediums for storing video information, voice information, or data including computer programs, various optical storage mediums have been conventionally proposed which include a so-called read-only optical disc, a phase-change optical disc, a magneto-optical disc, or an optical card.

Optical disc devices are used to write data on such optical storage mediums (hereinafter, referred to as "optical discs") or read data recorded on optical discs. In the present specification, an optical disc device widely includes not only an optical disc drive but also various kinds of apparatuses capable of writing data on an optical disc and reading data from an optical disc. Namely, an "optical disc device" of the present specification includes, for example, a game machine, audio-visuals, a personal computer, and so on. Additionally, the optical disc device also includes a personal digital assistant (PDA) in which data can be written/read on/from a small optical disc.

Referring to FIG. 1, the configuration of the optical disc will be firstly discussed below. An optical disc 20 of FIG. 1 comprises, from the side irradiated with a light beam by the optical head, a substrate 21 made of a transparent material permitting the passage of a light beam, an information layer 29 for recording and reproducing data, and a protective layer 25 for protecting the disc. The substrate 21 also has a function of protecting data from a flaw or crack, contamination, and so on of a disk just like the protective layer 25. Besides, the "substrate" and the "protective layer" both indicate transparent members existing between the information layer of the optical disc and the atmosphere in the present specification. Therefore it is not necessary to distinguish between the "substrate" and the "protective layer" according to a material, a thickness, a manufacturing method thereof. Therefore, an optical head may be disposed on the side of the protective layer and a member represented as a "substrate" and a member represented as a "protective layer" may be replaced with each other in the present specification.

FIG. 2 is a perspective view schematically showing an enlarged information layer 29 of the optical disc 20. A light beam is emitted to the disc 20 from the upper side of FIG. 20. As shown in FIG. 2, convex tracks 28 are formed on the information layer 29 of the optical disc 20. The tracks 28 are formed concentrically or spirally with respect to the center of the disc. The tracks 28 may be wobbled. Information such as address information can be previously recorded on the optical disc 20 according to the wobbling shape and the wobbling frequency of the tracks 28.

FIG. 3 is a block diagram showing the configuration of a conventional optical disc device. The optical disc 20 is rotated by a disc motor 10 with a predetermined number of revolutions. A light beam emitted from a light source 3 such as a semiconductor laser, which acts as light beam irradiating means, is converged onto the information layer 29 of the optical disc 20 by an objective lens 1, which acts as converging means, and the light beam forms a light beam spot on a desired converging position on the information layer 29.

An optical system including the objective lens 1 is designed so that fixed spherical aberration correction is performed on the assumption that focus control is stably performed on the information layer 29 of the optical disc 20. Namely, optical design for minimizing spherical aberration is made according to the thickness of the substrate 21 of the optical disc 20. This is because dynamic correction is not necessary for spherical aberration in the conventional optical disc device.

Light reflected from the optical disc 20 is received by a light-receiving part 4 and photocurrent is generated according to a quantity of the received light.

The optical disc device comprises a focus actuator 2 and a tracking actuator 27. The focus actuator 2 moves the objective lens 1 substantially perpendicularly to the information layer 29 of the optical disc 20 to change the converging position of a light beam. The tracking actuator 27 moves the objective lens 1 in the radius direction of the optical disc 20 to permit the converging position of the light beam to correctly follow the tracks 28 on the information layer 29 of the optical disc 20.

The objective lens 1, the focus actuator 2, the light source 3, and the light-receiving part 4 are integrated into a module serving as an optical head 5. The optical head 5 can be moved in the radius direction of the optical disc 20 by a transfer table 60 acting as searching means. The transfer table 60 is driven by an output signal (driving signal) from a transfer table driving circuit 62.

Subsequently, focus control in the optical disc device will be discussed below.

A light beam generated by the light source 3 such as a semiconductor laser is converged on the information layer 29 of the optical disc 20 by the objective lens 1 and the light beam forms a light beam spot. Reflected light of the light beam spot from the optical disc 20 is inputted again to the light-receiving part 4 via the object lens 1.

The light-receiving part 4 is divided into four areas. Photocurrent is generated according to a light quantity detected in each of the areas and the photocurrent is outputted to a preamplifier 11. The preamplifier 11 comprises I/V converters. Photocurrent inputted from the light-receiving part 4 to the preamplifier 11 is converted into voltage by the I/V converters. Each converted signal is transmitted to a focus error signal generator 7 and a tracking error signal generator 18. The focus error signal generator 7 generates, from an output signal of the preamplifier 11, an error signal of the optical disc 20 and a light beam spot, which is outputted from the optical disc 5 and is focused, with respect to the vertical direction.

The optical system generally comprises a focus error detecting system using the astigmatic method and a tracking error detecting system using the push-pull method.

The focus error signal generator 7 generates a focus error signal (hereinafter, referred to as an FE signal) based on an input signal according to the astigmatic method. The FE signal, which is an output signal of the focus error signal generator 7, is subjected to a filtering operation such as phase compensation and gain compensation in the focus control section 17 and then the FE signal is outputted to a focus actuator driving circuit 9.

The objective lens 1 is driven by the focus actuator 2 based on a driving signal from the focus actuator driving circuit 9. As a result, the light beam spot is driven so as to have a predetermined converging state on the information layer 29 of the optical disc 20 and thus focus control is achieved.

The following will discuss tracking control in the optical disc device.

From an output signal of the preamplifier 11, the tracking error signal generator 18 generates, with respect to the radius direction of the optical disc 20, an error signal between the tracks 28 and a light beam spot which is outputted and focused from the optical head 5. The tracking error signal generator 18 generates a tracking error signal (hereinafter, referred to as a TE signal) based on an input signal according to the push-pull method. The TE signal, which is an output signal of the tracking error signal generator 18, is subjected to a filtering operation such as phase compensation and gain compensation in a tracking control section 19 and then the TE signal is outputted to a tracking actuator driving circuit 26.

The objective lens 1 is driven by a tracking actuator 27 based on a driving signal outputted from the tracking actuator driving circuit 26. As a result, the light beam spot is driven so as to follow the tracks 28 on the information layer 29 of the optical disc 20 and thus tracking control is achieved.

Referring to FIG. 4, the following will specifically describe the generation of the focus error signal and the tracking error signal.

As shown in FIG. 4, the light-receiving part 4 is divided into four areas A, B, C, and D. The areas A to D of the light-receiving part 4 generate photocurrent according to a light quantity detected in each of the areas and outputs the photocurrent to corresponding I/V converter 6a, I/V converter 6b, I/V converter 6c, and I/V converter 6d, which are included in the preamplifier 11.

Signals having been converted from current to voltage by the I/V converter 6a, the I/V converter 6b, the I/V converter 6c, and the I/V converter 6d are transmitted to the focus error signal generator 7 and the tracking error signal generator 18.

The "information track longitudinal direction" shown in FIG. 4 is a direction tangential to the tracks 28 of the optical disc 20, and the "optical disc radius direction" is a direction perpendicular to the tracks 28 of the optical disc 20. Therefore, in the focus error signal generator 7, the sum of the output of the I/V converter 6b and the output of the I/V converter 6d is subtracted from the sum of the output of the I/V converter 6a and the output of the I/V converter 6c, so that an FE signal is acquired by the astigmatic method.

In the tracking error signal generator 18, the sum of the output of the I/V converter 6b and the output of the I/V converter 6c is subtracted from the sum of the output of the I/V converter 6a and the output of the I/V converter 6d, so that a TE signal is acquired by the push-pull method.

In this way, the conventional optical disc device performs focus control and tracking control when information is written on the optical disc and/or information is read from the optical disc.

However, in the conventional optical disc device, it has become difficult to write/read information by using a high-density optical disc. This point will be discussed in detail.

In recent years an objective lens with a numerical aperture (NA) larger than 0.6 and a light source with a wavelength shorter than 650 nm have been proposed to further increase a recording density and a capacity of an optical disc. For example, a disc is proposed which has a numerical aperture of 0.85, a light source with a wavelength of 405 nm, a substrate (or a protective layer) with a thickness of 0.1 mm, and a capacity of 20 to 25 GB. Since a laser beam diameter (spot diameter) on the optical disc is proportionate to $\lambda/NA$, it is preferable to reduce $\lambda$ and increase NA in view of improvement of a recording density, where $\lambda$ represents a wavelength of a laser beam.

When NA is 0.85 and the light source has a wavelength of 405 nm, although a beam spot is reduced, the aberration of a light beam, particularly spherical aberration becomes too large to neglect. The spherical aberration is caused by the object lens and the substrate (or the protective layer) constituting the optical disc.

As shown in FIG. 1, the information layer 29 of the optical disc 20 is protected by the substrate 21. A light beam outputted from the optical head 5 passes through the substrate 21 and forms a light beam spot on the information layer 29.

In conventional DVDs using optical systems with an NA of 0.6, a change in spherical aberration caused by an uneven thickness of the substrate 21 is within a tolerance and thus the change is negligible. However, when the substrate 21 has an even thickness, the light beam spot has spherical aberration proportionate to the fourth power of the NA. Thus, when the NA is increased to 0.85, a change in spherical aberration becomes too large to neglect.

In a DVD standard, a double-layer disc having two information recording surfaces is also adopted to increase a recording capacity for each optical disc. FIG. 5 is a diagram showing an example of the configuration of the double-layer disc. As shown in FIG. 5, the double-layer disc comprises, from the side of an optical head, a substrate 21, an L0 layer (first information recording surface) 22, a spacer layer 24, an L1 layer (second information recording surface) 23, and a protective layer 25 on the back. The substrate 21 and the spacer layer 24 are composed of a transparent medium such as a resin.

According to the multi-layer structure of FIG. 5, on the optical disc 20 having more than one information recording surface, it is necessary to move the focal position of a light beam from the information recording surface, on which a light beam spot is currently positioned, to an adjacent information recording surface. Such a movement of the focal position of a light beam between the different information recording surfaces will be referred to as "interlayer movement" in the following description. Referring to FIGS. 3 and 6, the method of interlayer movement will be discussed below.

First, the following will describe the case where the focus of a light beam is moved from the information recording surface close to the objective lens 1 of the optical head 5 to the information recording surface far from the objective lens 1. A microcomputer 8 stops focus control once and simultaneously outputs, to the focus actuator driving circuit 9, an acceleration pulse for moving the objective lens 1. The acceleration pulse has a waveform of FIG. 6(a) and moves the objective lens 1 to the back (that is, to the information recording surface far from the objective lens 1).

Then, the microcomputer 8 compares a deceleration start level and an FE signal of the focus error signal generator 7. When the FE signal exceeds the deceleration start level, the microcomputer 8 outputs a deceleration pulse. When the output of the deceleration pulse is completed in the end, focus control is resumed.

The following will describe the case where the focus of a light beam is moved from the information recording surface far from the objective lens 1 of the optical head 5 to the information recording surface close to the objective lens 1. In this case, the acceleration pulse/deceleration pulse with the waveforms of FIG. 6(b) is applied by the same method, so that the focus of a light beam can be moved between layers.

A higher recording density and a larger capacity are also demanded regarding the double-layer disc. In order to meet such a demand, the numerical aperture of the objective lens needs to exceed 0.6 and the light source needs to have a wavelength shorter than 650 nm.

In the case of the double-layer disc, since the spacer layer 24 is provided between the L0 layer 22 and the L1 layer 23, regarding a thickness from the surface of the optical disc 20 on the side of the optical head to the information recording surface, the L1 layer 23 is larger in thickness than the L0 layer 22 by the thickness of the spacer layer 24. Such a difference in thickness causes spherical aberration. In an optical system of a DVD standard where the NA of the objective lens is 0.6, the spherical aberration is within a tolerance and thus information can be recorded and reproduced without correcting aberration. As described above, in the case where an objective lens having a larger NA (e.g., 0.8 or more) is used, when the objective lens is adjusted on one of the information recording surfaces, spherical aberration caused by the thickness of the spacer layer 24 on the other information recording surface cannot be negligible.

Namely, when the NA of the objective lens exceeds 0.6, the conventional optical disc device cannot record information or reproduce recorded information on both of the information recording surfaces.

When the NA exceeds 0.6 (e.g., to 0.8 or larger), the provision of a spherical aberration correction lens unit 15 in FIG. 7 can be considered. The spherical aberration correction lens unit 15 is typically composed of a pair of lenses. A relative distance between the pair of lenses is changed by moving one of the lenses. By using such a spherical aberration correction lens unit 15, when recording/reproduction are performed on the double-layer disc, it is possible to correct spherical aberration in a proper manner for the information recording surfaces, thereby eliminating spherical aberration caused by the spacer layer.

The spherical aberration correction lens unit 15 is driven by a plate spring. In this case, while quick response is achieved and control is performed with high accuracy, the spherical aberration correction lens unit 15 moves just in a narrow range and results in a narrow correctable range for spherical aberration. Particularly when an uneven thickness of the substrate, the uneven characteristics of the objective lens, and the uneven characteristics of the spherical aberration correction lens unit 15 are considered, the double-layer disc lacks a correction range, so that recording and reproduction cannot be performed in a proper manner.

In view of the above problems, an object of the present invention is to provide an optical disc device which is capable of stably recording or reproducing information even when an optical disc includes a substrate (or a protective layer) having an uneven thickness causing spherical aberration.

Another object of the present invention is to provide an optical disc device which performs spherical aberration control with quick response and a wide correction range for spherical aberration, even when the NA of the objective lens is increased more than the conventional NA (e.g., 0.8 or larger), so that recording/reproduction can be performed on a high-density and large-capacity optical disc.

DISCLOSURE OF INVENTION

According to one aspect of the invention, an optical disc device is provided which comprises: light beam emitting means for emitting a light beam, converging means for converging the light beam toward an information storage medium, a first actuator for moving the converging means substantially perpendicularly to an information layer of the information storage medium to change a converging position of the light beam, spherical aberration changing means for changing spherical aberration occurring on a converging position of the light beam converged by the converging means, a second actuator for moving the spherical aberration changing means in a relatively precise manner, a third actuator for moving the spherical aberration changing means in a relatively rough manner, light-receiving means for receiving light reflected from the information storage medium of the light beam, converging state detecting means for detecting a signal according to a converging state on the information layer of the information storage medium of the light beam based on a signal of the light-receiving means, focus control means for driving the first actuator based on a signal of the converging state detecting means and performing control so that the light beam is converged on a desired position of the information layer of the information storage medium, spherical aberration detecting means for detecting a signal, based on a signal of the light-receiving means, according to an amount of spherical aberration occurring on the converging position of the light beam on the information layer of the information storage medium, and spherical aberration control means for driving the second actuator and the third actuator based on a signal of the spherical aberration detecting means and performing control so that spherical aberration is almost 0, wherein the third actuator moves the spherical aberration changing means at least based on a direct current component included in the signal of the spherical aberration detecting means, and the second actuator moves the spherical aberration changing means based on an alternating current component included in the signal of the spherical aberration detecting means.

In a preferred embodiment, the spherical aberration control means divides a control band so that the third actuator is driven when a change in spherical aberration is equal to or lower than a rotational frequency of the information storage medium, and the second actuator is driven when a change in spherical aberration is equal to or higher than the rotational frequency of the information storage medium.

According to another aspect of the invention, an optical disc device for recording data on an information storage medium having at least two laminated information layers and/or reproducing data from the information storage medium is provided, which comprises: light beam emitting means for emitting a light beam, converging means for converging the light beam toward the information storage medium, a first actuator for moving the converging means substantially perpendicularly to the information layer of the information storage medium to change a converging position of the light beam, spherical aberration changing means for changing spherical aberration occurring on a converging position of the light beam converged by the converging means, a second actuator for moving the spherical aberration changing means in a relatively precise manner, a third actuator for moving the spherical aberration changing means in a relatively rough manner, light-receiving means for receiving light reflected from the information storage medium of the light beam, converging state detecting means for detecting a signal according to a converging state on the information layer of the information storage medium of the light beam based on a signal of the light-receiving means, focus control means for driving the first actuator based on a signal of the converging state detecting means and performing control so that the light beam is converged on a desired position of the information layer of the information storage medium, interlayer moving means for driving the first actuator so as to move the converging position of the light beam to another information layer, spherical aberration detecting means for detecting a signal, based on a signal of the light-receiving means, according to an amount of spherical aberration occurring on the converging position of the light beam on the information layer of the information storage medium, and spherical aberration control means for driving the second actuator and the third actuator based on a signal of the spherical aberration detecting means and performing control so that spherical aberration is almost 0, wherein the third actuator moves the spherical aberration changing means at least based on a direct current component included in the signal of the spherical aberration detecting means, the second actuator moves the spherical aberration changing means based on an alternating current component included in the signal of the spherical aberration detecting means, and when the converging position of the light beam is moved to another information layer by the interlayer moving means, the spherical aberration changing means is driven by the third actuator so as to minimize spherical aberration caused by the movement.

In a preferred embodiment, a signal based on an amount of spherical aberration occurring on another information layer is applied to the third actuator as an offset when the converging position of the light beam is moved to another information layer by the interlayer moving means.

In a preferred embodiment, an operation of the spherical aberration control means based on the signal of the spherical aberration detecting means is not performed until the converging position of the light beam is moved to another information layer by the interlayer moving means and the signal of the converging state detecting means is converged within a predetermined range.

According to still another aspect of the invention, an optical disc device is provided which comprises: an optical head for storing, as one unit, light beam emitting means for emitting a light beam, converging means for converging the light beam toward an information storage medium, a first actuator for moving the converging means substantially perpendicularly to an information layer of the information storage medium to change a converging position of the light beam, spherical aberration changing means for changing spherical aberration occurring on a converging position of the light beam converged by the converging means, a second actuator for moving the spherical aberration changing means, a third actuator for moving the spherical aberration changing means, and light-receiving means for receiving light reflected from the information storage medium of the light beam, converging state detecting means for detecting a signal according to a converging state on the information layer of the information storage medium of the light beam based on a signal of the light-receiving means, focus control means for driving the first actuator based on a signal of the converging state detecting means and performing control so that the light beam is converged on a desired position of the information layer of the information storage medium, spherical aberration detecting means for detecting a signal, based on a signal of the light-receiving means, according to an amount of spherical aberration occurring on the converging position of the light beam on the information layer of the information storage medium, spherical aberration control means for driving the second actuator and the third actuator based on a signal of the spherical aberration detecting means and performing control so that spherical aberration is almost 0, and searching means for moving the optical head in a radius direction of the information storage medium, wherein the third actuator moves the spherical aberration changing means at least based on a direct current component included in the signal of the spherical aberration detecting means, the second actuator moves the spherical aberration changing means based on an alternating current component included in the signal of the spherical aberration detecting means, and when the converging position of the light beam is moved to a different radius position of the information storage medium by the searching means, the third actuator is driven so as to minimize spherical aberration caused by the movement.

In a preferred embodiment, a signal based on an amount of spherical aberration occurring on a radius position of another information layer is applied to the third actuator as an offset when the converging position of the light beam is moved to a radius position of another information layer by the searching means.

In a preferred embodiment, an operation of the spherical aberration control means based on the signal of the spherical aberration detecting means is not performed until the converging position of the light beam is moved to a radius position of another information layer by the searching means and the signal of the converging state detecting means is converged within a predetermined range on the radius position of another information layer.

According to another aspect of the invention, an optical disc device for performing recording and reproduction on an information storage medium having at least two information layers in a laminated structure is provided, which is characterized by comprising: light beam emitting means for emitting a light beam, converging means for converging the light beam toward the information storage medium, a focus actuator for moving the converging means substantially perpendicularly to the information layer of the information storage medium to change a converging position of the light beam, light-receiving means for receiving light reflected from the information storage medium of the light beam, converging state detecting means for detecting a signal according to a converging state on the information layer of the information storage medium of the light beam based on a signal of the light-receiving means, focus control means for driving the focus actuator based on a signal of the converging state detecting means and performing control so that the light beam is converged on a desired position of the information layer of the information storage medium, spherical aberration detecting means for detecting a signal, based on a signal of the light-receiving means, according to an amount of spherical aberration occurring on the converging position of the light beam on the information layer of the information storage medium, spherical aberration changing means for changing spherical aberration occurring on the converging position of the light beam converged by the converging means, the change being made by driving with an elastic body, spherical aberration control means for driving the spherical aberration changing means based on a signal of the spherical aberration detecting means and performing control so that spherical aberration is almost 0, offset applying means for applying an offset to the spherical aberration changing means, and offset switching means for switching an offset amount of the offset applying means according to the information layer of the information storage medium.

In a preferred embodiment, when the spherical aberration control means is not operated, a predetermined offset is applied to the spherical aberration changing means by the offset applying means, and when the spherical aberration control means is operated, an offset is determined based on an average of driving output of the spherical aberration changing means for a circumference of the information storage medium and the offset of the offset applying means is switched.

According to another aspect of the invention, an optical disc device is provided which comprises: light beam emitting means for emitting a light beam, converging means for converging the light beam toward an information storage medium, a focus actuator for moving the converging means substantially perpendicularly to the information layer of the information storage medium to change a converging position of the light beam, spherical aberration changing means for changing spherical aberration occurring on the converging position of the light beam converged by the converging means, light-receiving means for receiving light reflected from the information storage medium of the light beam, converging state detecting means for detecting a signal according to a converging state on the information layer of the information storage medium of the light beam based on a signal of the light-receiving means, focus control means for driving the focus actuator based on a signal of the converging state detecting means and performing control so that the light beam is converged on a desired position of the information layer of the information storage medium, spherical aberration detecting means for detecting a signal, based on a signal of the light-receiving means, according to an amount of spherical aberration occurring on the converging position of the light beam on the information layer of the information storage medium, spherical aberration control means for moving the spherical aberration changing means based on a signal of the spherical aberration detecting means and performing control so that spherical aberration is almost 0, and dead band area generating means for preventing a signal of the spherical aberration control means from being transmitted to the spherical aberration changing means when the signal of the spherical aberration control means has a value within a predetermined range.

According to still another aspect of the invention, an optical disc device is provide which comprises: converging means for converging a light beam toward an information storage medium, a focus actuator for moving the converging means substantially perpendicularly to an information layer of the information storage medium, spherical aberration changing means for changing spherical aberration occurring on a converging position of the light beam converged by the converging means, driving means for operating the spherical aberration changing means, light-receiving means for receiving light reflected from the information storage medium of the light beam, converging state detecting means for detecting a signal according to a converging state on the information layer of the information storage medium of the light beam based on a signal of the light-receiving means, focus control means for driving the focus actuator based on a signal of the converging state detecting means and performing control so that the light beam is converged on a desired position of the information layer of the information storage medium, spherical aberration detecting means for detecting a signal, based on a signal of the light-receiving means, according to an amount of spherical aberration occurring on the converging position of the light beam on the information layer of the information storage medium, spherical aberration control means for driving the driving means based on a signal of the spherical aberration detecting means and performing control so that spherical aberration is almost 0, and spherical aberration signal correcting means for amplifying a signal of the converging state detecting means by a predetermined gain and then adding the signal to a detection signal of the spherical aberration detecting means.

In a preferred embodiment, the optical disc device further comprises: first test signal generating means for applying a test signal to the focus actuator, first amplitude detecting means for detecting amplitude of the detection signal of the spherical aberration detecting means, and spherical aberration correction learning means for calculating an added gain of the spherical aberration signal correcting means so that the first amplitude detecting means detects minimum amplitude of the spherical aberration detecting signal in a state in which the test signal is applied to the focus actuator by the first test signal generating means.

In a preferred embodiment, the spherical aberration correction learning means learns an added gain in a state in which the focus control means is operated and the spherical aberration control means is not operated.

In a preferred embodiment, the spherical aberration signal correction means comprises added gain storing means for storing an added gain for each layer in the information unit having information layers in a laminated structure, and added gain switching means for retrieving an added gain corresponding to a position of the optical beam from the added gain storing means and switching the added gain.

In a preferred embodiment, the optical disc device further comprises: first test signal generating means for applying a test signal to the focus actuator, focus control gain adjusting means for adjusting a gain of the focus control means, second test signal generating means for applying a test signal to the driving means, and spherical aberration control gain adjusting means for adjusting a gain of the spherical aberration control means, wherein when the focus control means and the spherical aberration control means are operated, the focus control gain adjusting means makes an adjustment based on a first test signal generated by the first test signal generating means and the first test signal after focus control, and the spherical aberration control gain adjusting means makes an adjustment based on a spherical aberration test signal generated by the second test signal generating means and the spherical aberration test signal after spherical aberration control.

According to still another aspect of the invention, an optical disc device is provided which comprises: converging means for converging a light beam toward an information storage medium, a focus actuator for moving the converging means substantially perpendicularly to an information layer of the information storage medium, spherical aberration changing means for changing spherical aberration occurring on a converging position of the light beam converged by the converging means, driving means for operating the spherical aberration changing means, light-receiving means for receiving light reflected from the information storage medium of the light beam, converging state detecting means for detecting a signal according to a converging state on the information layer of the information storage medium of the light beam based on a signal of the light-receiving means, focus control means for driving the focus actuator based on a signal of the converging state detecting means and performing control so that the light beam is converged on a desired position of the information layer of the information storage medium, spherical aberration detecting means for detecting a signal, based on a signal of the light-receiving means, according to an amount of spherical aberration occurring on the converging position of the light beam on the information layer of the information storage medium, spherical aberration control means for driving the driving means based on a signal of the spherical aberration detecting means and performing control so that spherical aberration is almost 0, and converging state detection signal correcting means for amplifying the signal of the spherical aberration detecting means by a predetermined gain and then adding the signal to the detection signal of the converging state detecting means.

In a preferred embodiment, the optical disc further comprises focus control means which does not add the detection signal of the spherical aberration detecting means to the detection signal of the converging state detecting means, the detection signal of the spherical aberration detecting means having been multiplied by a predetermined multiple by the converging state detection signal correcting means, which drives the focus actuator only based on the detection signal of the converging state detecting means, and performs control so that the light beam is converged on a converging position of the information layer of the information storage medium when the spherical aberration control means is not performed.

In a preferred embodiment, the optical disc device further comprises: second test signal generating means for applying a test signal to the driving means, and second amplification detecting means for detecting amplitude of the detection signal of the converging state detecting means, converging state detection correction learning means for calculating an added gain of the converging state detection signal correcting means so that an effective value of the converging state detection signal is minimized by the second amplitude detecting means in a state in which the test signal is applied to the driving means by the second test signal generating means.

In a preferred embodiment, the converging state detection correction learning means is operated by the focus control means and learns an added gain in a state in which the spherical aberration control means is not operated.

In a preferred embodiment, the optical disc device further comprises: first test signal generating means for applying a test signal to the focus actuator, focus control gain adjusting means for adjusting a gain of the focus control means, second test signal generating means for applying a test signal to the driving means, and spherical aberration control gain adjusting means for adjusting a gain of the spherical aberration control means, wherein when the focus control means and the spherical aberration control means are operated, the focus control gain adjusting means makes an adjustment based on a first test signal generated by the first test signal generating means and the first test signal after focus control, and the spherical aberration control gain adjusting means makes an adjustment based on a spherical aberration test signal generated by the second test signal generating means and the spherical aberration test signal after spherical aberration control.

According to still another aspect of the invention, an optical disc device Is provided which comprises: converging means for converging a light beam toward an information storage medium, a focus actuator for moving the converging means substantially perpendicularly to an information layer of the information storage medium, spherical aberration changing means for changing spherical aberration occurring on a converging position of the light beam converged by the converging means, driving means for operating the spherical aberration changing means, light-receiving means for receiving light reflected from the information storage medium of the light beam, converging state detecting means for detecting a signal according to a converging state on the information layer of the information storage medium of the light beam based on a signal of the light-receiving means, focus control means for driving the focus actuator based on a signal of the converging state detecting means and performing control so that the light beam is converged on a desired position of the information layer of the information storage medium, spherical aberration detecting means for detecting a signal, based on a signal of the light-receiving means, according to an amount of spherical aberration occurring on the converging position of the light beam on the information layer of the information storage medium, lowpass filter means for retrieving a component lower than a predetermined frequency of an output signal of the spherical aberration detecting means, spherical aberration control means for driving the driving means based on a signal of the lowpass filter means and performing control so that spherical aberration is almost 0, highpass filter means for retrieving a component higher than the predetermined frequency of the output signal of the spherical aberration detecting means, and spherical aberration signal adding means for adding a signal of the highpass filter means to the signal of the converging state detecting means.

According to still another aspect of the invention, an optical disc device is provided which comprises: converging means for converging a light beam toward an information storage medium, a focus actuator for moving the converging means substantially perpendicularly to an information layer of the information storage medium, spherical aberration changing means for changing spherical aberration occurring on a converging position of the light beam converged by the converging means, driving means for operating the spherical aberration changing means, light-receiving means for receiving light reflected from the information storage medium of the light beam, converging state detecting means for detecting a signal according to a converging state on the information layer of the information storage medium of the light beam based on a signal of the light-receiving means, focus control means for driving the focus actuator based on a signal of the converging state detecting means and performing control so that the light beam is converged on a desired position of the information layer of the information storage medium, spherical aberration detecting means for detecting a signal, based on a signal of the light-receiving means, according to an amount of spherical aberration occurring on the converging position of the light beam on the information layer of the information storage medium, and spherical aberration control means for driving the driving means based on a detection signal of the spherical aberration detecting means and performing control so that spherical aberration is almost 0, wherein the focus control means has a band ten times larger than a band of the spherical aberration control means.

According to still another aspect of the invention, an optical disc device is provided which comprises: converging means for converging a light beam toward an information storage medium having a spiral or a concentric track, a focus actuator for moving the converging means substantially perpendicularly to an information layer of the information storage medium, spherical aberration changing means for changing spherical aberration occurring on a converging position of the light beam converged by the converging means, driving means for operating the spherical aberration changing means, a tracking actuator for moving the converging means in a direction of crossing the track on the information storage medium, light-receiving means for receiving light reflected from the information storage medium of the light beam, converging state detecting means for detecting a signal according to a converging state on the information layer of the information storage medium of the light beam based on a signal of the light-receiving means, focus control means for driving the focus actuator based on a signal of the converging state detecting means and performing control so that the light beam is converged on a desired position of the information layer of the information storage medium, spherical aberration detecting means for detecting a signal, based on a signal of the light-receiving means, according to an amount of spherical aberration occurring on the converging position of the light beam on the information layer of the information storage medium, spherical aberration control means for driving the driving means based on a signal of the spherical aberration detecting means and performing control so that spherical aberration is almost 0, track displacement detecting means for detecting a signal corresponding to a displacement of the light beam relative to the track of the information storage medium based on the signal of the light-receiving means, tracking control means for driving the tracking actuator based on a signal of the track displacement detecting means and performing control so that the light beam scans the track, transfer means for permitting the tracking actuator to move in a radius direction of an information unit, and transfer driving means for driving the transfer means, wherein when the transfer means is operated in a state in which the focus control means is operated and the tracking control means is not operated, the spherical aberration changing means is moved by a predetermined amount.

BRIEF DESCRIPTION OF DRAWINGS

FIGS. 6(a) and 6(b) are waveform charts showing the driving signals of a focus during the interlayer movement of the conventional optical disc device.

FIGS. 12(a) to 12(c) are waveform charts showing driving signal for spherical aberration correction according to Embodiment 1.

FIGS. 14(a) to 14(d) are waveform charts showing driving signal for spherical aberration correction during interlayer movement according to Embodiment 2.

FIGS. 18(a) to 18(d) are waveform charts showing driving signals for spherical aberration correction during movement in the radius direction according to Embodiment 3.

FIGS. 22(a) to 22(d) are waveform charts showing driving signals for spherical aberration correction during interlayer movement according to Embodiment 4.

FIGS. 25(a) to 25(d) are waveform charts showing driving signals for spherical aberration correction during interlayer movement according to Embodiment 5.

FIGS. 27(a) and 27(b) are sectional views showing light beams to explain a method of detecting spherical aberration.

FIGS. 49(a) to 49(e) are waveform charts showing the influence of defocus upon a spherical aberration detection signal.

FIGS. 50(a) to 50(e) are waveform charts showing the influence of defocus upon the spherical aberration detection signal.

FIGS. 51(a) to 51(e) are waveform charts showing the influence of different information layers upon the spherical aberration detection signal.

FIGS. 52(a) to 52(e) are waveform charts showing the influence of different information layers upon the spherical aberration detection signal.

BEST MODE FOR CARRYING OUT THE INVENTION

The embodiments of the present invention will be described below.

Embodiment 1

Figure 8:
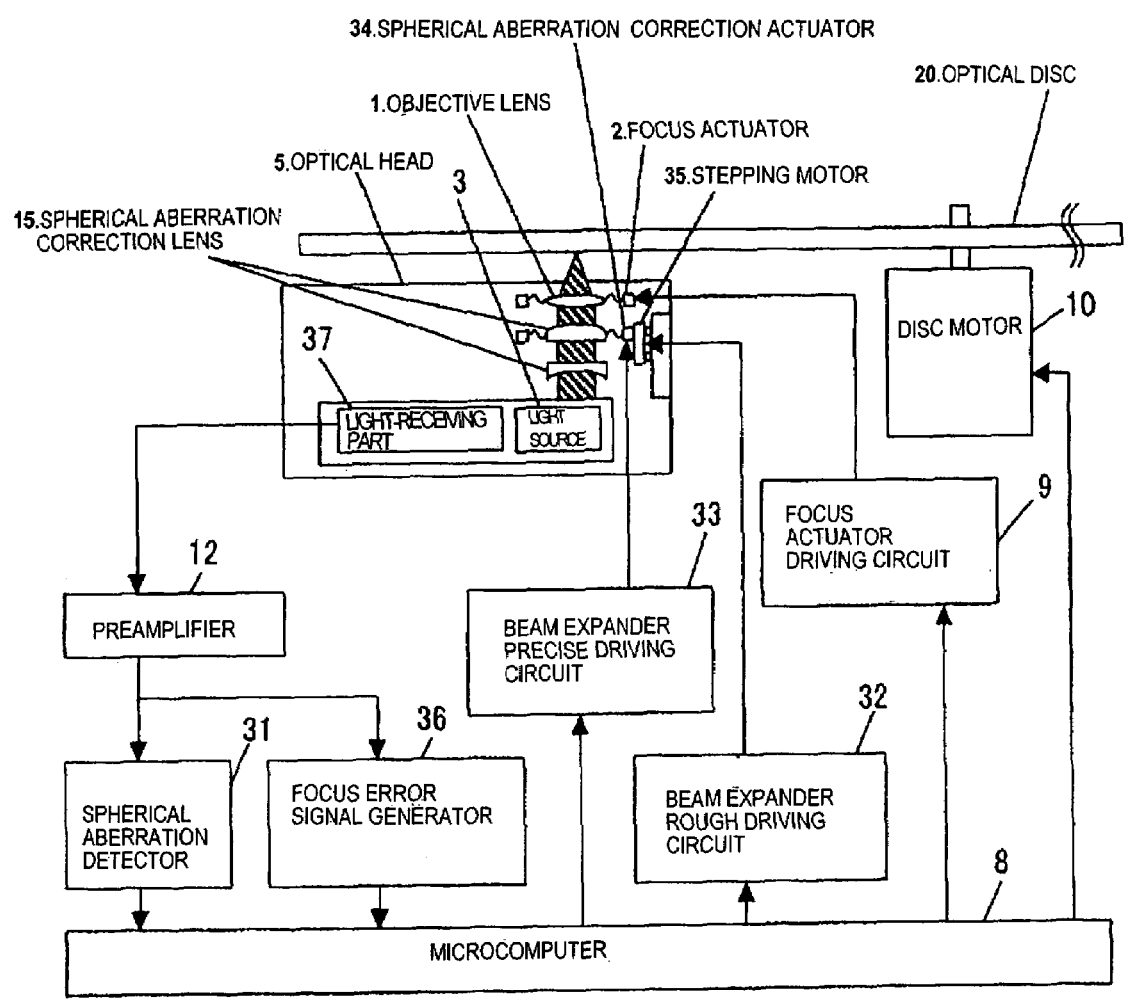
FIG. 8 is a block diagram showing the configuration of an optical disc device according to Embodiment 1 of the present invention.
Figure 9:
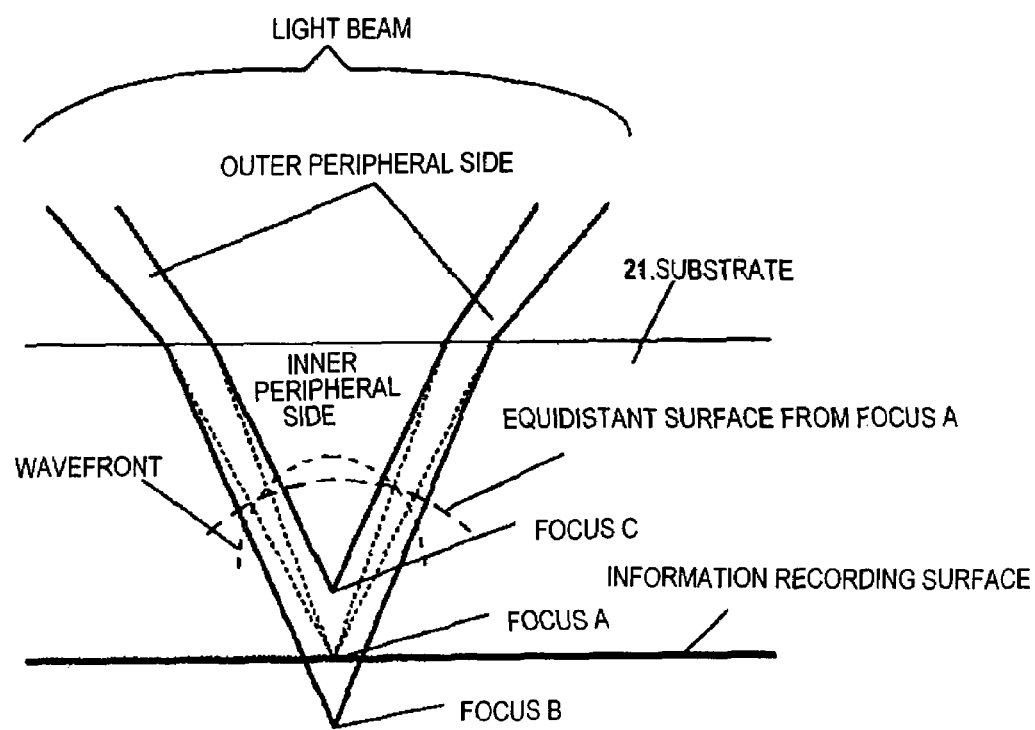
FIG. 9 is a sectional view showing a light beam to explain a method of detecting spherical aberration.
Figure 10:
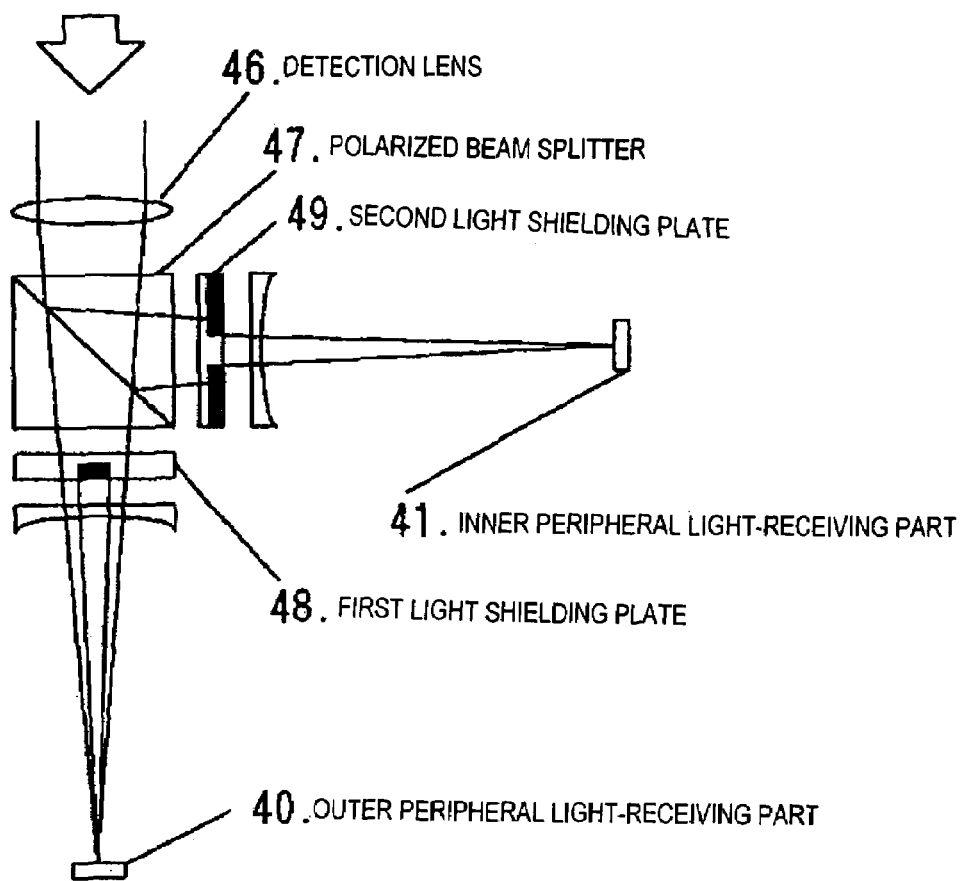
FIG. 10 is a sectional view showing the configuration of the light-receiving part in detail.
Figure 11:
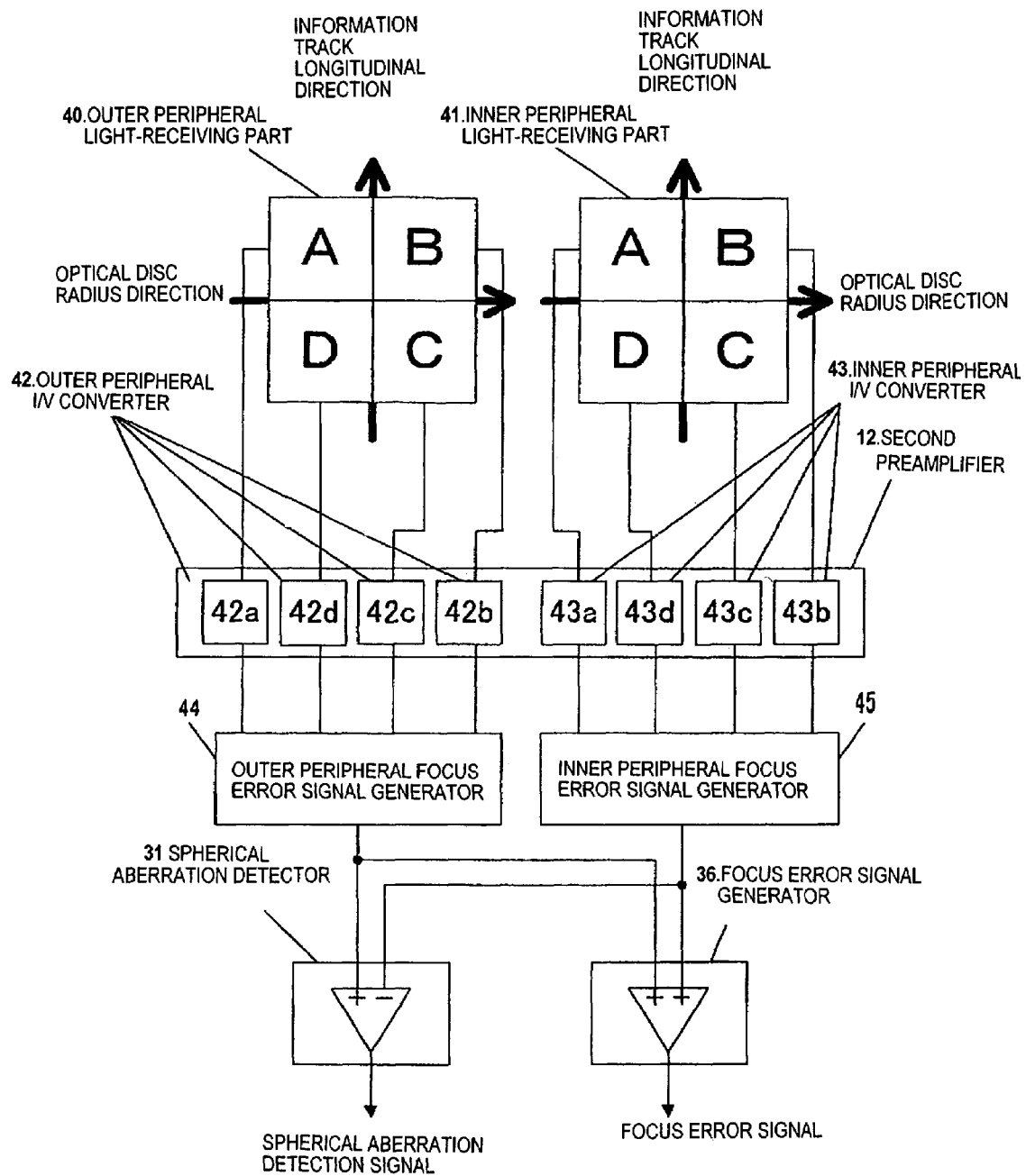
FIG. 11 is a block diagram showing the detail of the light-receiving part and the preamplifier.

FIG. 8 is a block diagram showing the configuration of an optical disc device according to Embodiment 1 of the present invention. FIG. 9 is a sectional view showing a light beam to describe a method of detecting spherical aberration in the present embodiment. FIG. 10 is a sectional view particularly showing the detail of a light-receiving part 37 in the optical disc device of FIG. 8. FIG. 11 is a block diagram showing the detail of the light-receiving part 37 and a preamplifier 12 in the optical disc device of FIG. 8. In these drawings, components corresponding to the constituent elements of a conventional optical disc device are indicated by the same reference numerals.

Figure 3:
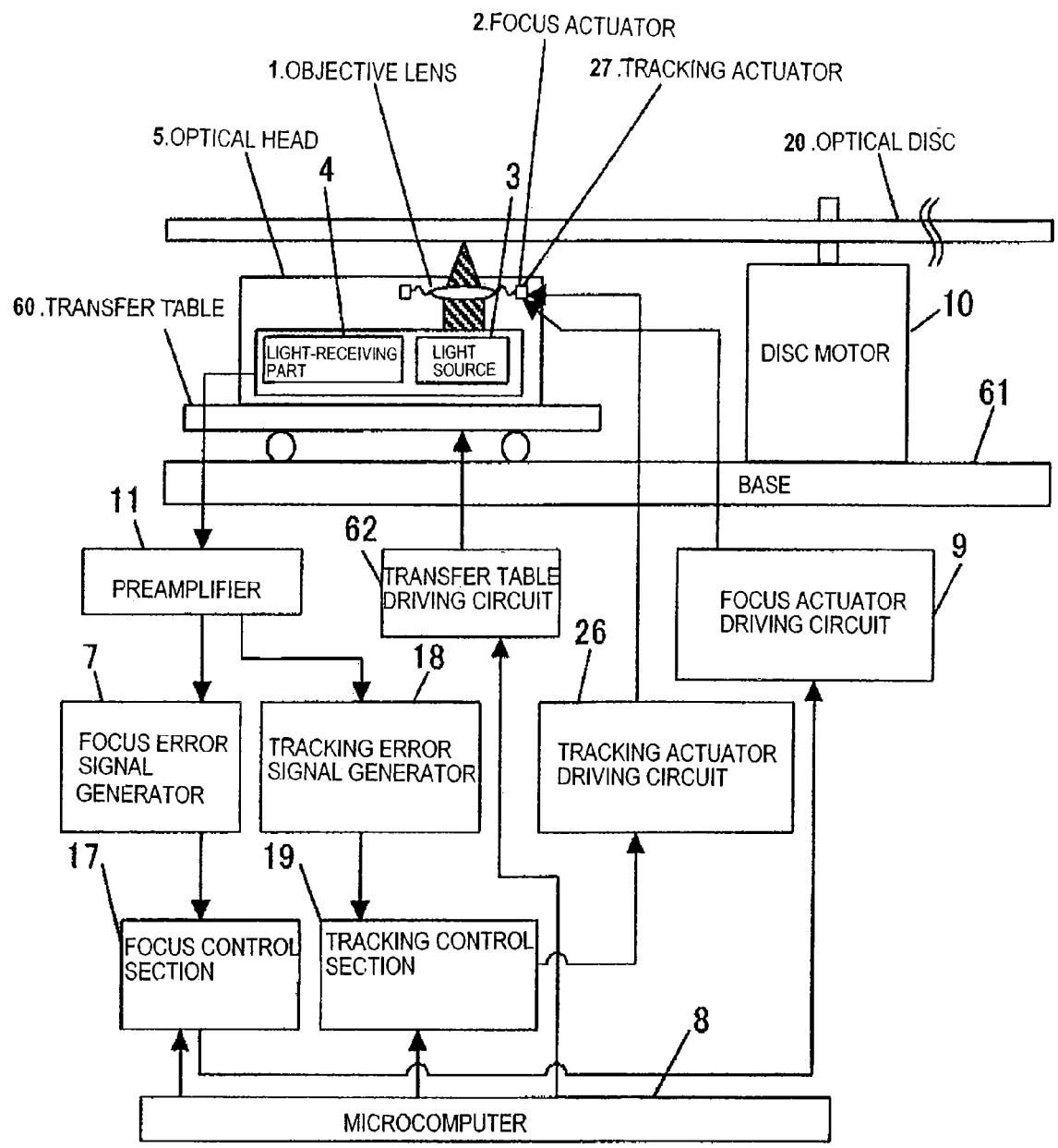
FIG. 3 is a block diagram showing the configuration of a conventional optical disc device.
Figure 4:
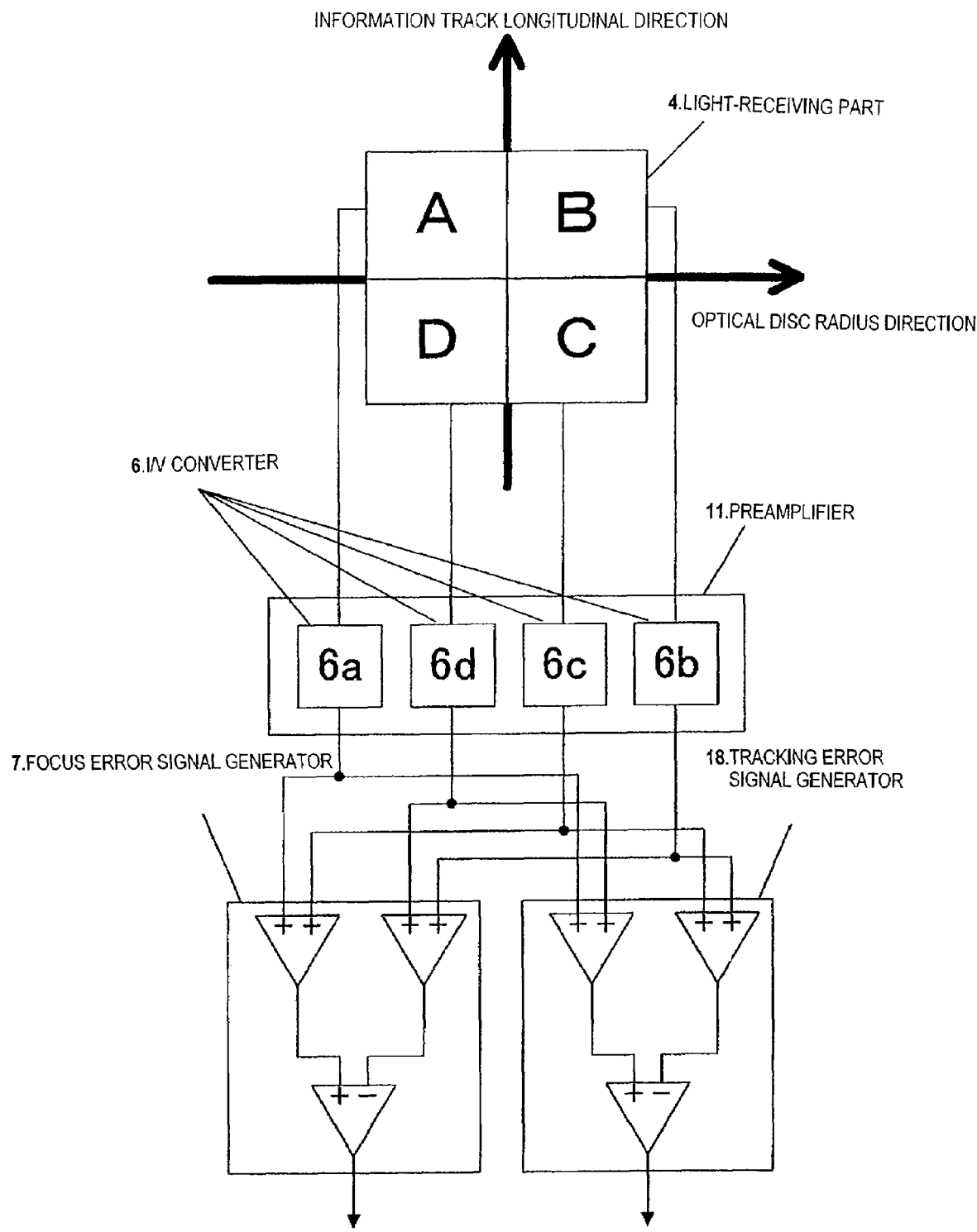
FIG. 4 is a block diagram showing the configuration of a light-receiving part and a preamplifier in the conventional optical disc device.

As with the optical disc device of FIG. 3, focus control in the present embodiment is performed by driving an objective lens 1 by a focus actuator 2 serving as a first actuator.

In the spherical aberration correction of the present embodiment, a spherical aberration correction lens unit 15 is used which acts as spherical aberration changing means, and the correction is performed by two kinds of actuators (first and second actuators) 34 and 35 for driving the spherical aberration correction lens unit 15. This point will be described in detail below.

Figure 7:
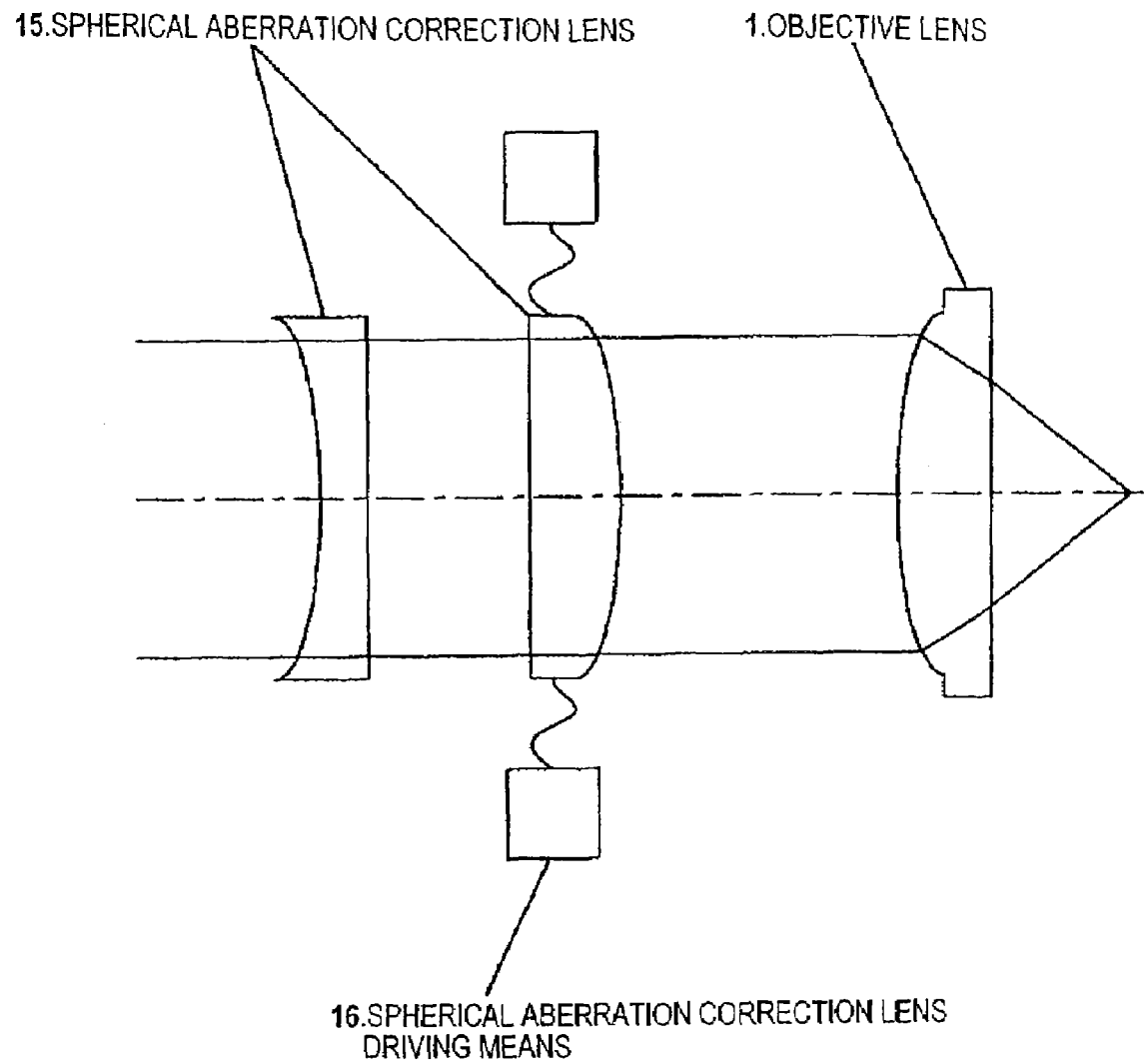
FIG. 7 is a sectional view showing a spherical aberration correction lens.

In the present embodiment, the spherical aberration correction lens unit 15 of FIG. 7 is provided. The spherical aberration correction lens unit 15 comprises a spherical aberration correction actuator (second actuator) 34 for finely moving one of a pair of lenses constituting the spherical aberration correction lens unit 15, and a stepping motor 35 (third actuator) for roughly moving the spherical aberration correction lens unit 15 and the spherical aberration correction actuator 34.

The spherical aberration correction actuator 34 acting as a second actuator is provided to drive the spherical aberration correction lens unit 15 acting as spherical aberration changing means. The spherical aberration correction actuator 34 changes a lens interval of the spherical aberration correction lenses 15 to adjust spherical aberration. A range for permitting the spherical aberration correction actuator 34 to move one of the spherical aberration correction lenses 15, that is, a movable distance, is smaller than that of the stepping motor 35 (described later) acting as a third actuator. However, the spherical aberration correction actuator 34 precisely responds to a signal (particularly a signal of a high frequency) corresponding to an alternating current component (AC component) included in a spherical aberration correction signal, which is calculated from a spherical aberration detection signal. Thus the actuator 34 moves the spherical aberration correction lens unit 15 to correct spherical aberration.

The stepping motor 35 serving as a third actuator moves one of the spherical aberration correction lenses 15 and the spherical aberration correction actuator 34. The stepping motor 35 is less capable of following a high-frequency signal but has a wider range for moving the spherical aberration correction lens unit 15 (movable distance) as compared with the spherical aberration correction actuator 34. Hence, the stepping motor 35 can smoothly follow a DC signal and a low-frequency signal.

In the present embodiment, the stepping motor 35 moves the spherical aberration correction lens unit 15 to roughly correct spherical aberration in response to a signal of a direct current component (DC component) included in a spherical aberration correction signal calculated based on a signal (spherical aberration detection signal) from a spherical aberration detector 31. A precisecorrection of spherical aberration is carried out by the spherical aberration correction actuator 34 serving as a second actuator.

The spherical aberration correction actuator 34 and the stepping motor 35 are driven by a beam expander precise driving circuit 33 and a beam expander rough driving circuit 32, respectively. The beam expander precise driving circuit 33 and the beam expander rough driving circuit 32 each amplify an AC component and a DC component of a control signal (spherical aberration correction signal) outputted from the microcomputer 8. The spherical aberration correction signal is outputted from the microcomputer 8 based on the spherical aberration detection signal.

Referring to FIGS. 8 to 12, the spherical aberration correction control of Embodiment 1 will be described in detail below. FIG. 12 is a waveform chart showing driving signals for spherical aberration correction according to Embodiment 1.

Firstly referring to FIG. 8, a focus error signal generator 36 acting as converging state detecting means detects a signal corresponding to a converging state of a light beam on the information layer of the optical disc 20, based on a signal from the light-receiving part 37 serving as light-receiving means. To be specific, the focus error signal generator 36 generates a signal indicating a radial position error between a light beam spot, which is outputted from the optical head 5 and is focused, and the optical disc 20.

A method of generating a focus error signal (hereinafter, referred to as an FE signal) will be discussed in detail below. As shown in FIG. 10, the light-receiving part 37 divides, by using a polarized beam splitter 47, a light beam passing through a detection lens 46. A first light shielding plate 48 passes only an outer peripheral light beam and a second light shielding plate 49 passes only an inner peripheral light beam. Light quantities of the light beams are detected by an outer peripheral light-receiving part 40 and an inner peripheral light-receiving part 41, respectively.

As shown in FIG. 11, the outer peripheral light-receiving part 40 and the inner peripheral light-receiving part 41 are each divided into four areas A, B, C, and D. Each of the areas generates photocurrent according to a detected light quantity and outputs the photocurrent to corresponding I/V converters 42*a* to 42*d* and I/V converters 43*a* to 43*d* that are included in the preamplifier 12.

Signals converted from current to voltage by the I/V converters 42*a* to 42*d* and the I/V converters 43*a* to 43*d* are subjected to operations similar to those of a conventional focus error signal generator 7 in an outer peripheral focus error signal generator 44 and an inner peripheral focus error signal generator 45, so that the signals are converted into an outer peripheral focus error signal and an inner peripheral focus error signal.

A focus error signal actually used for focus control in Embodiment 1 is obtained by adding the outer peripheral focus error signal and the inner peripheral focus error signal in a focus error signal generator 36.

In this way, the method of generating the focus error signal according to the present embodiment is somewhat different from a conventional method of generating a focus error signal according to the astigmatic method. However, the characteristics are the same. Hence, by using the FE signal serving as an output signal of the focus error signal generator 36, a light beam spot is driven so as to have a predetermined converging state on the information recording surface 20 of the optical disc 20 in the same may as a conventional device and thus focus control is achieved.

Referring to FIGS. 9, 11, and 12, the following will describe a method of detecting a spherical aberration detection signal and a controlling method using the same.

Figure 2:
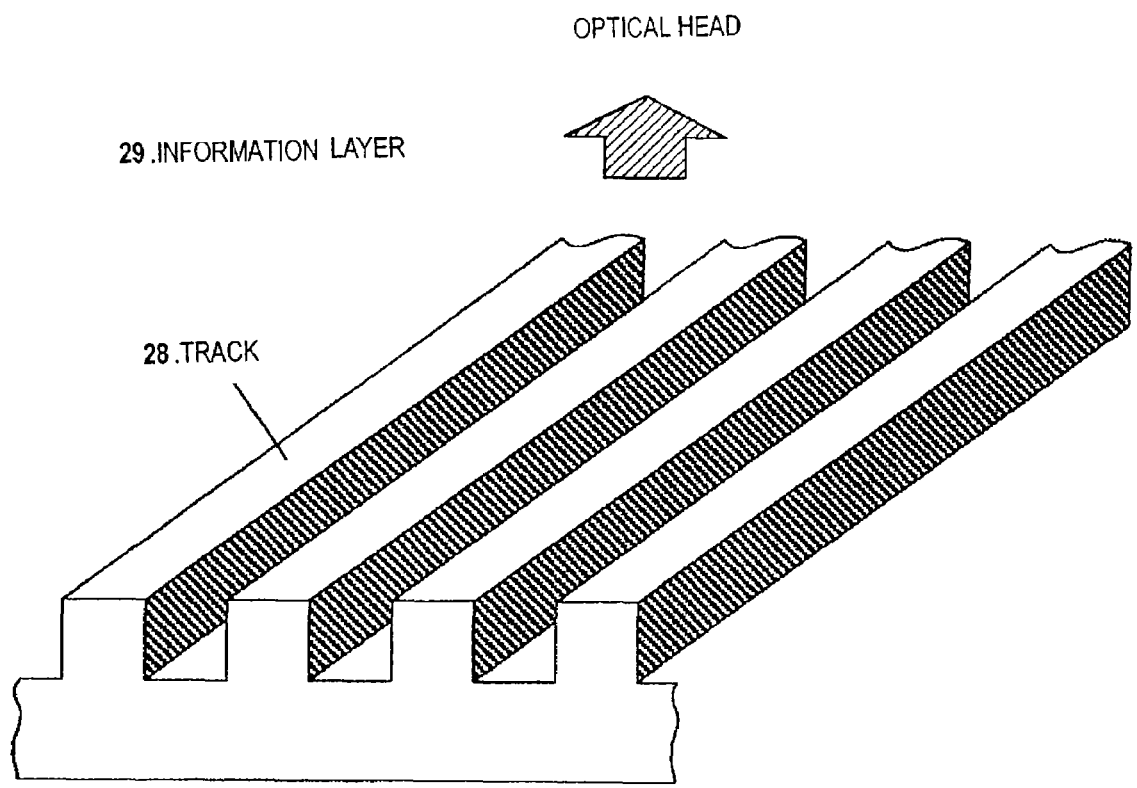
FIG. 2 is a schematic diagram having an enlarger information layer of the optical disc.

In a state in which focus control is performed, a light beam emitted from the optical head 5 is refracted by a substrate 21 of the optical disc 20 as shown in FIG. 2, and an outer peripheral light beam is focused on a focal point B and an inner peripheral light beam is focused on a focal point C.

When spherical aberration does not occur on the information recording surface of the optical disc 20, the focal point B of the outer peripheral light beam and the focal point C of the inner peripheral light beam are both coincident with a focal point A. However, as the influence of spherical aberration increases, the focal point B and the focal point C are separated from each other, and the two focuses are both placed in a defocus state with respect to the information recording surface where a light beam should converge.

As shown in FIG. 11, a spherical aberration detector 31 serving as spherical aberration detecting means detects an influence amount of spherical aberration on the outer peripheral light beam (a defocus amount on the focal point B) and an influence amount of spherical aberration on the inner peripheral light beam (a defocus amount on the focal point C). Then, the spherical aberration detector 31 detects a signal according to an amount of spherical aberration occurring on the converging position of the light beam. To be specific, a difference is calculated between the outer peripheral focus error signal and the inner peripheral focus error signal, which are the output signals of the outer peripheral focus error signal generator 44 and the inner peripheral focus error signal generator 45, so that a spherical aberration detection signal is generated according to an amount of spherical aberration occurring on the converging position of the light beam.

The spherical aberration detection signal serving as an output signal of the spherical aberration detector 31 is inputted to the microcomputer 8, a filtering operation such as phase compensation and gain compensation is performed on the signal, and thus a spherical aberration correction signal for correcting spherical aberration is generated. The microcomputer 8, which is focus control means and acts as spherical aberration control means, performs frequency separation on the spherical aberration correction signal after the filtering operation. The beam expander rough driving circuit 32 responding to a DC component of the spherical aberration correction signal transmits to the stepping motor a driving signal for moving the spherical aberration correction lens unit 15 to a position where the spherical aberration correction signal has a DC component of almost 0 (see FIG. 12(*b*)). The stepping motor 35 having received the driving signal moves the spherical aberration correction lens unit 15 (time t1) and performs correction so that the DC component of spherical aberration is almost 0.

Then, the microcomputer 8 outputs to the beam expander precise driving circuit 33 a driving signal for moving the spherical aberration correction lens unit 15 to a position where an AC component included in a spherical aberration correction signal, which cannot be corrected by the stepping motor 35, is almost 0 as shown in FIG. 12(*c*) (time t2). The spherical aberration correction actuator 34 having received the driving signal moves the spherical aberration correction lens unit 15 and performs correction control so that spherical aberration is almost 0, that is, the focal point B and the focal point C are coincident with each other (in other words, the focal point B and the focal point C are both close to the focal point A).

To be specific, a filtering operation is performed on the spherical aberration detection signal, which is an output signal of the spherical aberration detector 31, by the microcomputer 8. With the DC component of the spherical aberration detection signal after a filtering operation, correction control is performed so that the focuses A, B, and C are made coincident with one another by the spherical aberration correction lens unit 15 driven by the beam expander rough driving circuit 32 and the stepping motor 35. Further, with the AC component, correction control is performed so that the focuses A, B, and C are made coincident with one another by the spherical aberration correction lens unit 15 driven by the beam expander precise driving circuit 33 and the spherical aberration correction actuator 34.

In the present embodiment, regarding the DC component of the spherical aberration correction signal, the beam expander rough driving circuit 32 transmits a driving signal for setting the DC component at almost 0 to the stepping motor 35, so that the stepping motor 35 moves the spherical aberration correction lens unit 15 and spherical aberration correction is performed for the DC component. Regarding the AC component of the spherical aberration correction signal, the beam expander precise driving circuit 33 transmits a driving signal for setting the AC component at almost 0 to the spherical aberration correction actuator 34, so that the spherical aberration correction actuator 34 moves the spherical aberration correction lens unit 15 and spherical aberration correction is performed for the AC component. Thus, even when an objective lens with an NA larger than that of the conventional objective lens (e.g., an NA of 0.8 or higher and 0.85 or higher) is used to increase the recording density of the optical disc 20, high responsivity is achieved and spherical aberration correction is controlled over a wide range.

Further, in the control of the stepping motor 35 based on the beam expander rough driving signal, the spherical aberration correction signal of the AC component lower than the rotational frequency of the optical disc 20 and the spherical aberration correction signal of the DC signal are transmitted to the beam expander rough driving circuit 32, and the spherical aberration correction signal of the AC component higher than the rotational frequency of the optical disc 20 is transmitted to the beam expander precise driving circuit 33. With this configuration, the stepping motor 35 with a low tracking speed can follow a change in thickness along the radius direction of the substrate without causing transient response due to the influence of the uneven thickness of the substrate 21 for one rotation, increase accuracy for controlling spherical aberration correction, and further improve responsivity for spherical aberration correction.

Embodiment 2

Figure 13:
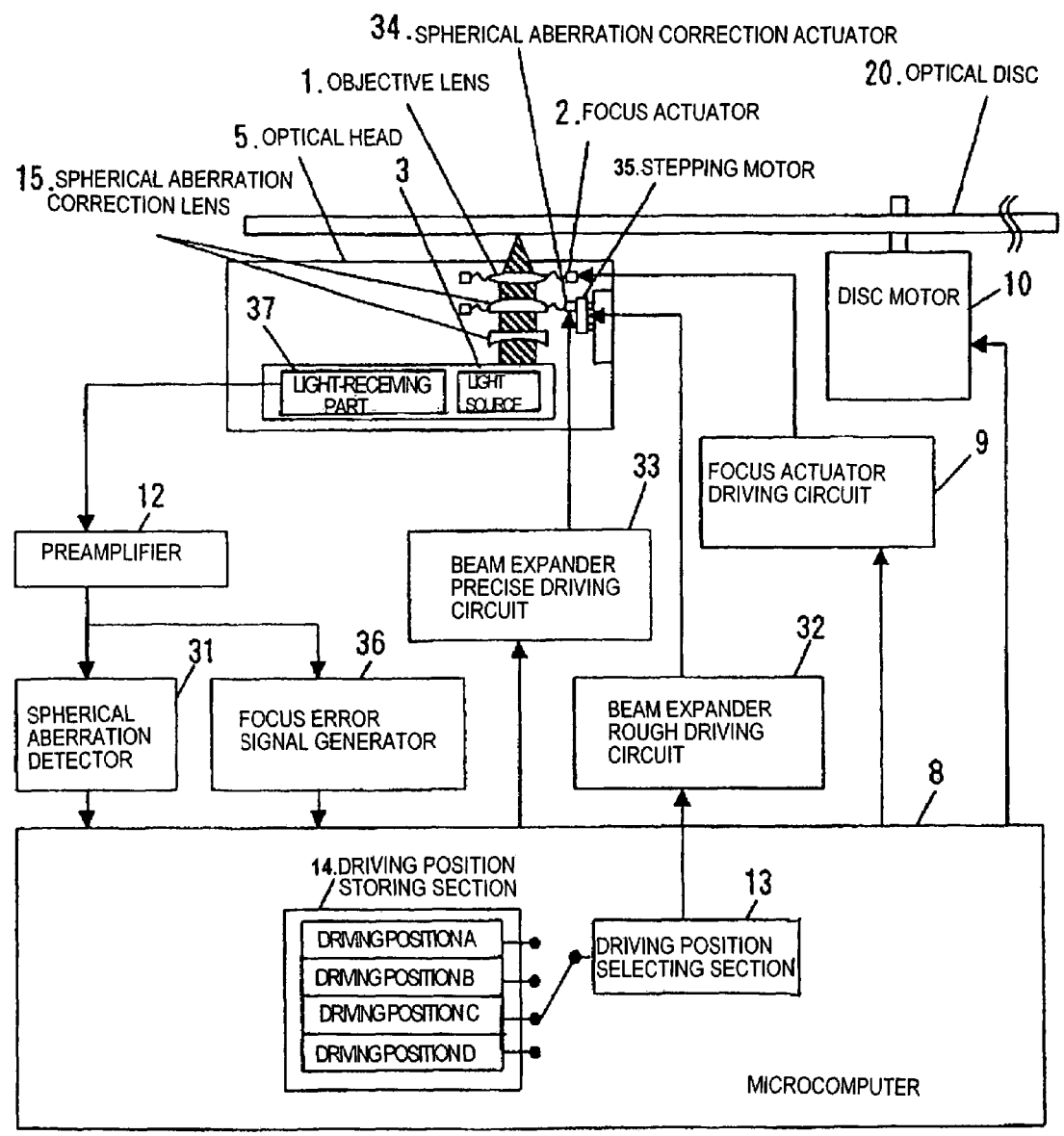
FIG. 13 is a block diagram showing the configuration of an optical disc device according to Embodiment 2 of the present invention.
Figure 15:
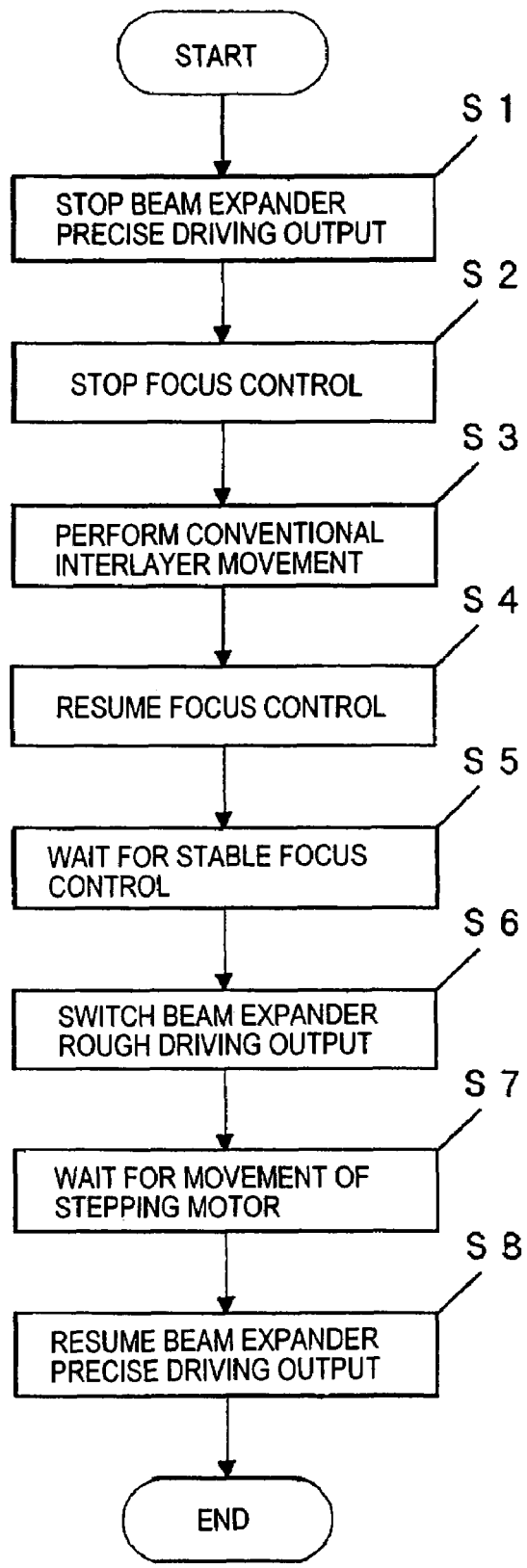
FIG. 15 is a flowchart showing the sequence of spherical aberration correction during interlayer movement according to Embodiment 2.

FIG. 13 is a block diagram showing the configuration of an optical disc device according to Embodiment 2. FIG. 14 is a waveform chart showing driving signals for correcting spherical aberration during the interlayer movement of the present embodiment. FIG. 15 is a flowchart showing the sequence of spherical aberration correction during the interlayer movement of the present embodiment. In these drawings, the same members and components as those of the conventional art and Embodiment 1 are indicated by the same reference numerals and the explanation thereof is omitted.

A microcomputer 8 and a focus actuator driving circuit 9 constitute interlayer moving means for driving a focus actuator. In FIG. 13, a driving position selecting section 13 retrieves a target driving position from a driving position storing section 14 and outputs the driving position to a beam expander rough driving circuit 32.

Further, as Embodiment 1, focus control and spherical aberration control are performed based on a focus error signal, which is an added signal of an outer peripheral focus error signal and an inner peripheral focus error signal, and a spherical aberration detection signal, which is a difference signal of the outer peripheral focus error signal and the inner peripheral focus error signal.

Referring to FIGS. 13 to 15, the following will describe spherical aberration correction control during the interlayer movement of Embodiment 2 configured thus.

As shown in FIGS. 14(c) and 14(d), during the interlayer movement, the microcomputer 8 firstly stops an output to a beam expander precise driving circuit 33 at time t1, the output being based on an output signal from a spherical aberration detector 31, and the microcomputer 8 stops an output to the focus actuator driving circuit 9, the output corresponding to an output from a focus error signal generator 36, so that correction control and focus control for spherical aberration are made inoperative, that is, the control is stopped (S1 and S2 of FIG. 15).

Subsequently, as shown in FIG. 14(d), a driving command for interlayer movement is outputted to the focus actuator driving circuit 9 until time t2 according to steps similar to those of a conventional art (S3 of FIG. 15). When a driving command for interlayer movement is completed at the time t2, the microcomputer 8 simultaneously cancels the stop of the output to the focus actuator driving circuit 9, the output being based on an output from the focus error signal generator 36. Then as shown in FIG. 14(d), the microcomputer 8 resumes focus control (S4 of FIG. 15).

Subsequently, after waiting for stable focus control until time t3 (S5 of FIG. 15), the microcomputer 8 retrieves information about the driving position of a spherical aberration correction lens unit 15, the position being suitable for an information recording surface at a destination, from a driving position storing section 14 which stores the information and is shown in FIG. 13 by using a driving position selecting section. As shown in FIG. 14(b), the microcomputer 8 outputs to the stepping motor 35 a driving signal (offset signal) for moving the spherical aberration correction lens unit 15 to the driving position with respect to the beam expander coarse driving circuit 32. Thus, the stepping motor 35 is driven and a DC component of a spherical aberration detection signal is set at almost 0 as shown in FIG. 14(a) (S6 and S7 of FIG. 15).

Finally, the microcomputer 8 cancels the stop of an output to the beam expander precise driving circuit 33 at time t4, and it outputs a correction signal (that is, the AC component of the spherical aberration correction signal in the present embodiment) having not been corrected by the stepping motor 35 (S8 of FIG. 15) as is shown in FIG. 14(c). Then correction control for spherical aberration is resumed through a spherical aberration correction actuator 34.

Moreover, the timing of stopping focus control and spherical aberration control and the timing of outputting a driving signal to the beam expander rough driving circuit are set as below, so that faster access can be made between layers.

Figure 16:
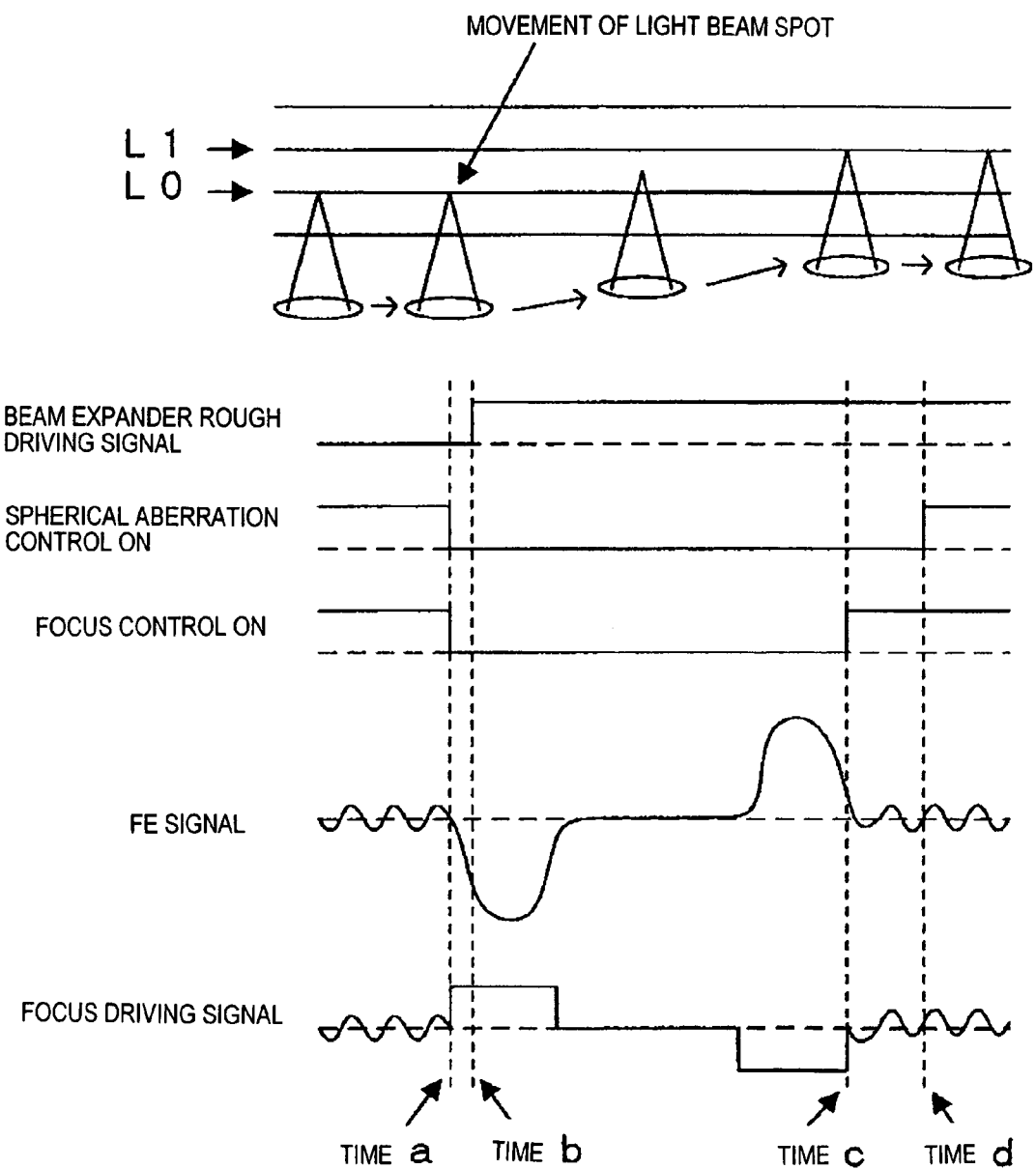
FIG. 16 is a waveform chart showing signals and the positions of a converging lens and information layers L0 and L1 during interlayer movement according to Embodiment 2.

FIG. 16 shows the positions of a converging lens and information layers L0 and L1 during the interlayer movement of a double-layer disc and shows a waveform chart of signals. The following refers to FIG. 16.

It is assumed that a light beam scans a given track on the information layer L0. In this state, when data on the information layer L1 is reproduced, focus control and spherical aberration correction control are firstly made inoperative, that is, the control is stopped (time a). Then, after a driving command is issued to the focus actuator driving circuit 9, information about a driving position for correcting spherical aberration is retrieved by the driving position selecting section 13 from the driving position storing section 14, which stores the information and is shown in FIG. 13, the driving position being suitable for another information layer serving as a target layer (the information layer L1 in the present embodiment). A driving signal for moving the spherical aberration correction lens unit 15 to the retrieved position is outputted to the beam expander rough driving circuit 32 (time b).

Hence, as the focus of the objective lens 1 is closer to the information layer L1 from the information layer L0, the stepping motor 35 moves so as to minimize spherical aberration caused by the movement, that is, a spherical aberration correction amount becomes closer to the reference amount of the information layer L1. Thus, an FE signal and a total quantity of light reflected from the optical disc 20 are less affected and the stability of focus jump is not interrupted due to a large change in spherical aberration during focus jump. After the movement to the information layer L1, even when spherical aberration control is turned on immediately after focus control having been inoperative is turned on (time c), spherical aberration control is not stabilized unless focus control is stabilized. For example, when an FE signal is converged within a predetermined range during the observation of the FE signal, it is decided that focus control is stabilized and spherical aberration control having been inoperative is turned on (time d).

With this configuration, the stepping motor 35 (particularly the spherical aberration correction lens unit 15) is moved so as to reduce a change in spherical aberration occurring during interlayer movement. Thus, it is possible to stably switch spherical aberration control for each layer with a great effect.

As described above, for a change in the DC component of spherical aberration occurring during interlayer movement, correction is performed by using a rough driving system (stepping motor 35), so that spherical aberration correction is controlled over a wide range not only on a double-layer disc but also a multi-layer disc.

Embodiment 3

Figure 17:
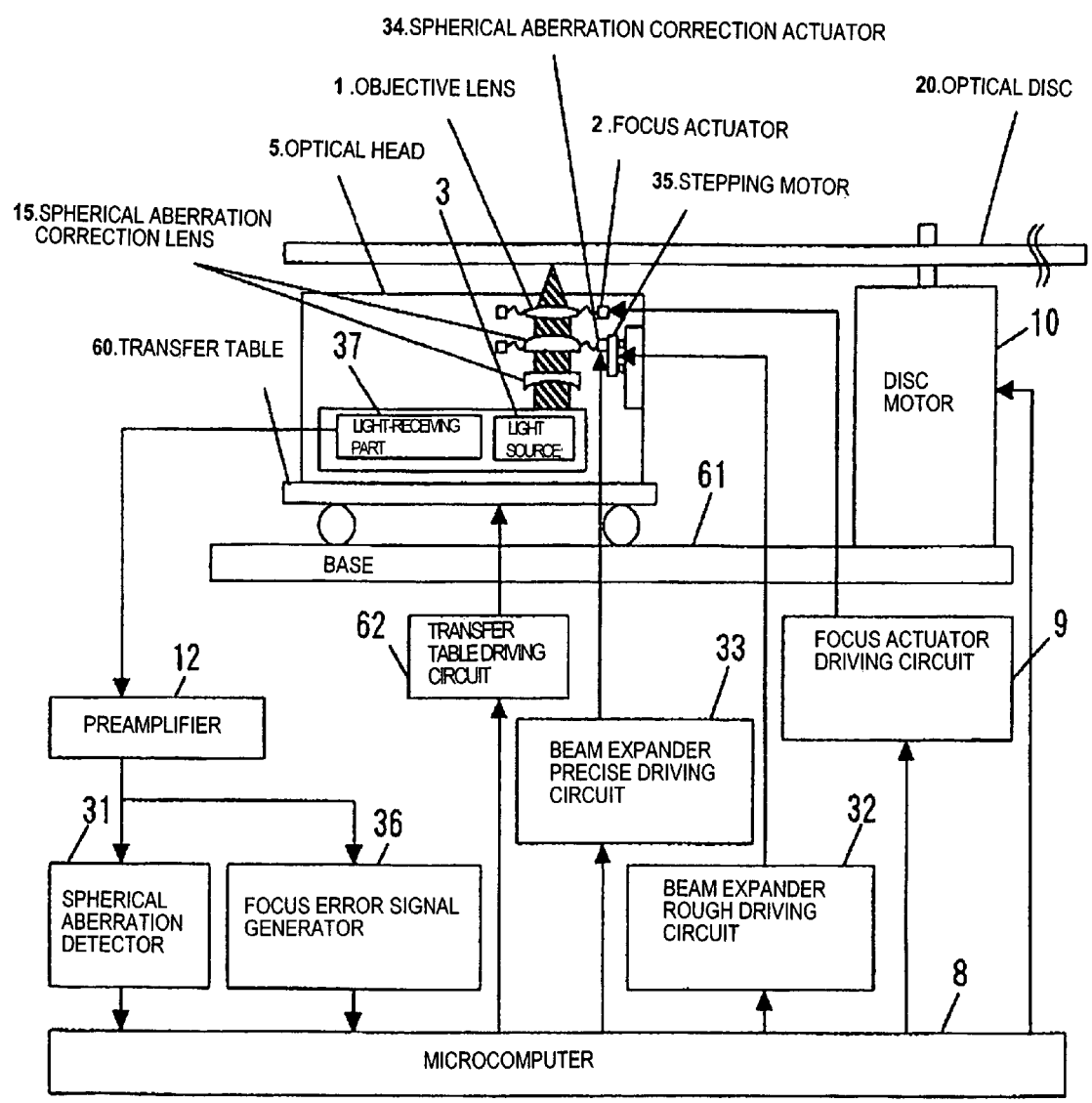
FIG. 17 is a block diagram showing the configuration of an optical disc device according to Embodiment 3 of the present invention.
Figure 19:
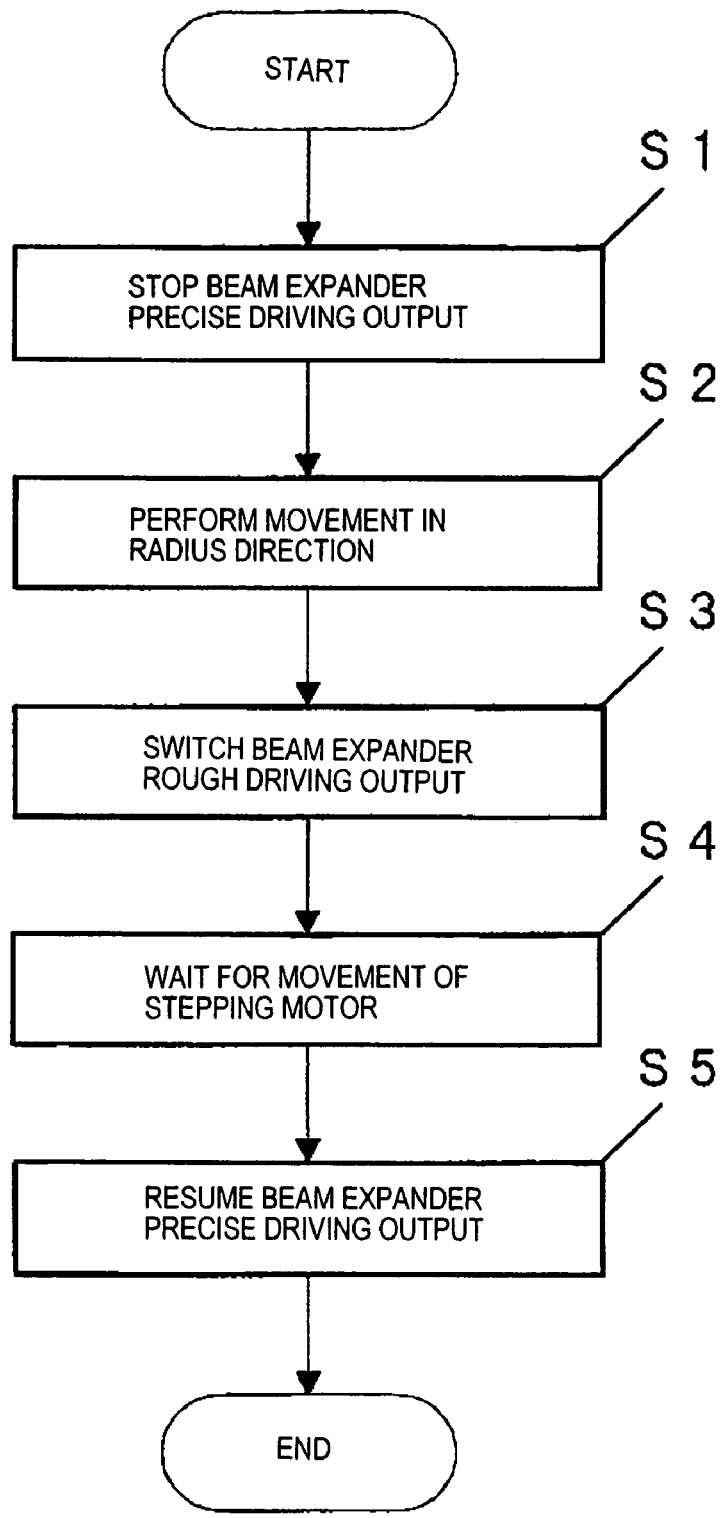
FIG. 19 is a flowchart showing the sequence of spherical aberration correction during movement in the radius direction according to Embodiment 3.

FIG. 17 is a block diagram showing the configuration of an optical disc device according to Embodiment 3. FIG. 18 is a waveform chart showing driving signals for spherical aberration control when movement is performed along the radius direction according to Embodiment 3. FIG. 19 is a flowchart showing the sequence of spherical aberration correction when movement is performed along the radius direction according to Embodiment 3. In these drawings, the same members and components as those of the conventional art and Embodiment 1 are indicated by the same reference numerals and the explanation thereof is omitted.

In the present embodiment, an optical head 5 stores, as one unit, a light source 3 acting as light beam irradiating means for emitting a light beam, an objective lens 1 acting as converging means for converging a light beam on an optical disc 20 serving as an information storage medium, a focus actuator 2 acting as a first actuator for moving the objective lens 1 substantially perpendicularly to an information layer of the optical disc 20 in order to change the converging position of a light beam, a spherical aberration correction lens unit 15 acting as spherical aberration changing means for changing spherical aberration occurring on the converging position of a light beam converged by the objective lens 1, a stepping motor 35 for moving a spherical aberration correction actuator 34, the spherical aberration correction actuator 34 for moving the spherical aberration correction lens unit 15, and a light-receiving part 37 for receiving reflected light of a light beam from the optical disc 20.

The optical head 5 can be moved in the radius direction of the optical disc 20 by a transfer table 60 acting as searching means. Moreover, the transfer table 60 is driven by an output signal (driving signal) from a transfer table driving circuit 62.

Further, as with Embodiment 1, focus control and spherical aberration control are performed based on a focus error signal (a signal outputted from a focus error signal generator 36), which is an added signal of an outer peripheral focus error signal and an inner peripheral focus error signal, and a spherical aberration detection signal (a signal outputted from a spherical aberration detector 31), which is a difference signal of the outer peripheral focus error signal and the inner peripheral focus error signal.

Referring to FIGS. 17, 18, and 19, the following will describe spherical aberration correction control during movement performed in the radius direction according to Embodiment 3 configured thus. As shown in FIG. 18(c), in the case of movement for retrieval and so on along the radius direction, the microcomputer 8 firstly stops an output to a beam expander precise driving circuit 33, the output being based on an output of the spherical aberration detector 31, at time t1 at which tracking control is not performed, and the microcomputer 8 makes the spherical aberration correction actuator 34 inoperative, so that correction control for spherical aberration is stopped (S1 of FIG. 19). As shown in FIG. 18(d), the microcomputer 8 outputs a transfer table driving signal to a transfer table driving circuit 62 until output time t2 (S2 of FIG. 19).

The transfer table driving circuit 62 moves the transfer table 60, which is loaded with the optical head 5, in the radius direction of the optical disc 20 based on the transfer table driving signal transmitted from the microcomputer 8. Then, as shown in FIG. 18(b), the microcomputer 8 outputs, to the beam expander rough driving circuit 32 at time t3, a driving signal for setting the DC component of the spherical aberration detection signal at almost 0. The stepping motor 35 is driven based on a driving signal transmitted from the beam expander rough driving circuit 32, and the microcomputer 8 waits for the movement of the stepping motor 35 to a predetermined position (S3 and S4 of FIG. 19).

Subsequently, the microcomputer 8 cancels the stop of an output to the beam expander precise driving circuit 33 at time t4, the output corresponding to the output of a spherical aberration detector 31, outputs as shown in FIG. 18(c) a correction signal (that is, the AC component of the spherical aberration correction signal) having not been corrected by the stepping motor 35 to the beam expander precise driving circuit 33 (S5 of FIG. 19), and resumes correction control for spherical aberration that have been made inoperative by the spherical aberration actuator 34.

Moreover, the timing of stopping spherical aberration control and the timing of outputting a driving signal to the beam expander rough driving circuit 32 are set as below, so that faster access can be made in the radius direction.

Figure 20:
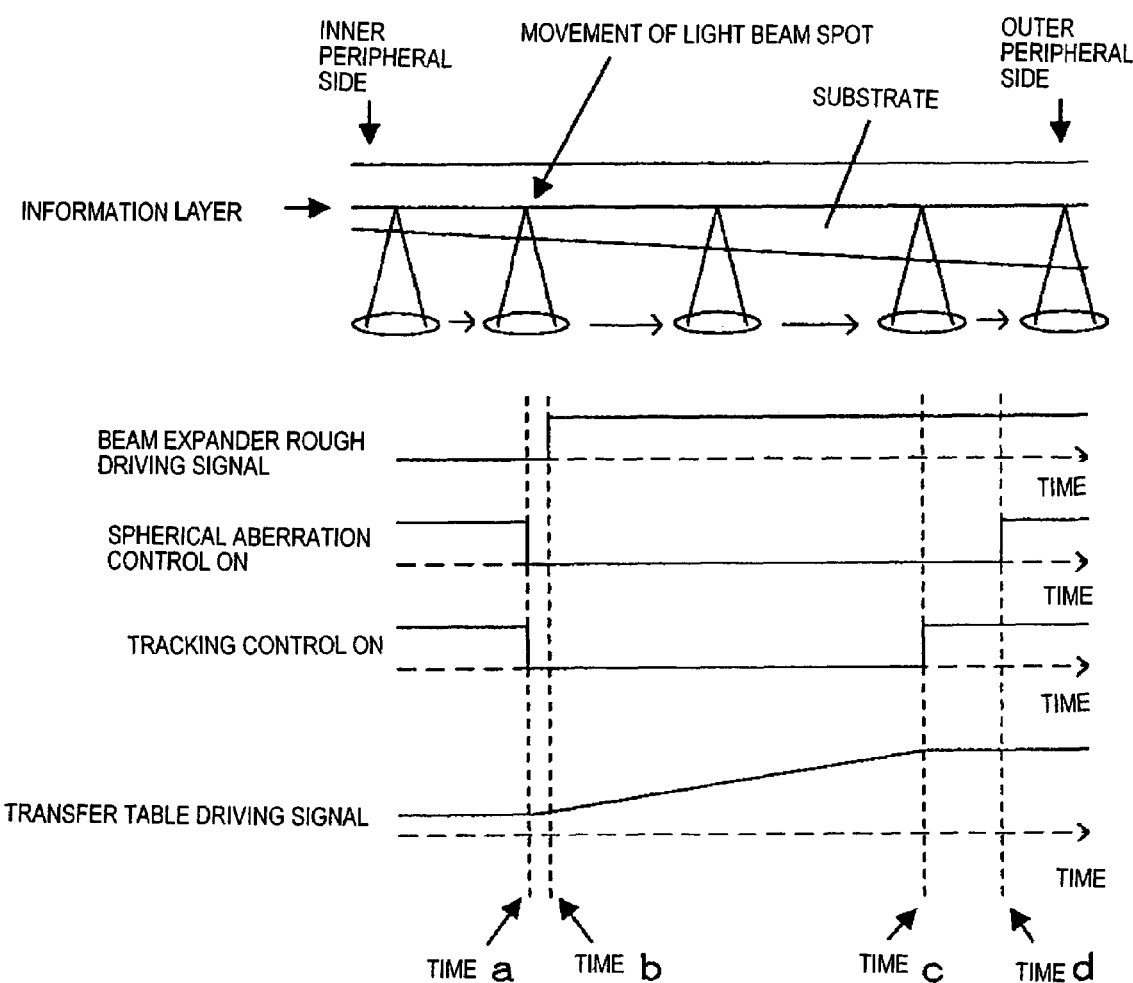
FIG. 20 is a waveform chart showing signals, a converging lens, and a change in the pressure of the substrate in a disc during movement in the radius direction according to Embodiment 3.

FIG. 20 shows a change in the substrate pressure of the objective lens 1 and the optical disc 20 during movement in the radius direction and shows a waveform chart of signals. The following refers to FIG. 20. It is assumed that a light beam scans a given track on the inner periphery of the optical disc 20. In this state, when data on the outer periphery is reproduced, the microcomputer 8 firstly makes inoperative tracking control and spherical aberration correction, that is, stops the tracking control and the spherical aberration correction control (time a). Then, after a driving command is issued to the transfer table driving circuit 62, the microcomputer 8 transmits a spherical aberration correction signal to the beam expander rough driving circuit 32 in order to make a movement to a driving position of the spherical aberration correction lens unit 15, the driving position being suitable for a substrate pressure on a target radius position, and the beam expander rough driving circuit 32 outputs a driving signal (offset signal) corresponding to the transmitted spherical aberration correction signal (time b).

Hence, as the transfer table 60 is closer to the outer periphery from the inner periphery, the stepping motor 35 moves so as to minimize spherical aberration caused by the movement, that is, a spherical aberration correction amount becomes closer to the reference amount on the target outer peripheral position. Thus, it is possible to reduce influence upon an FE signal and a tracking error signal caused by a large change in spherical aberration during movement in the radius direction, and the stability of a drawing operation of the tracking control is not interrupted immediately after movement in the radius direction.

Even when the stop of tracking control (time c) and the stop of spherical aberration control are successively cancelled and are turned on after movement to the target outer peripheral position, if tracking control is not stabilized, the tracking control may become more unstable. Thus, for example when a tracking error signal is converged within a predetermined range while a tracking error signal is observed, the microcomputer 8 decides that tracking control is stable, cancels the stop of spherical aberration control, and turns on the control (time d). With this configuration, it is possible to more stably switch spherical aberration control for each radius during movement in the radius direction, achieving a great effect.

As described above, for a change in the DC component of spherical aberration occurring during movement in the radius direction, correction is performed by using a rough driving system (stepping motor 35), so that spherical aberration correction is controlled over a wide range absorbing an uneven thickness and uneven joining on the optical disc 20.

Embodiment 4

Figure 21:
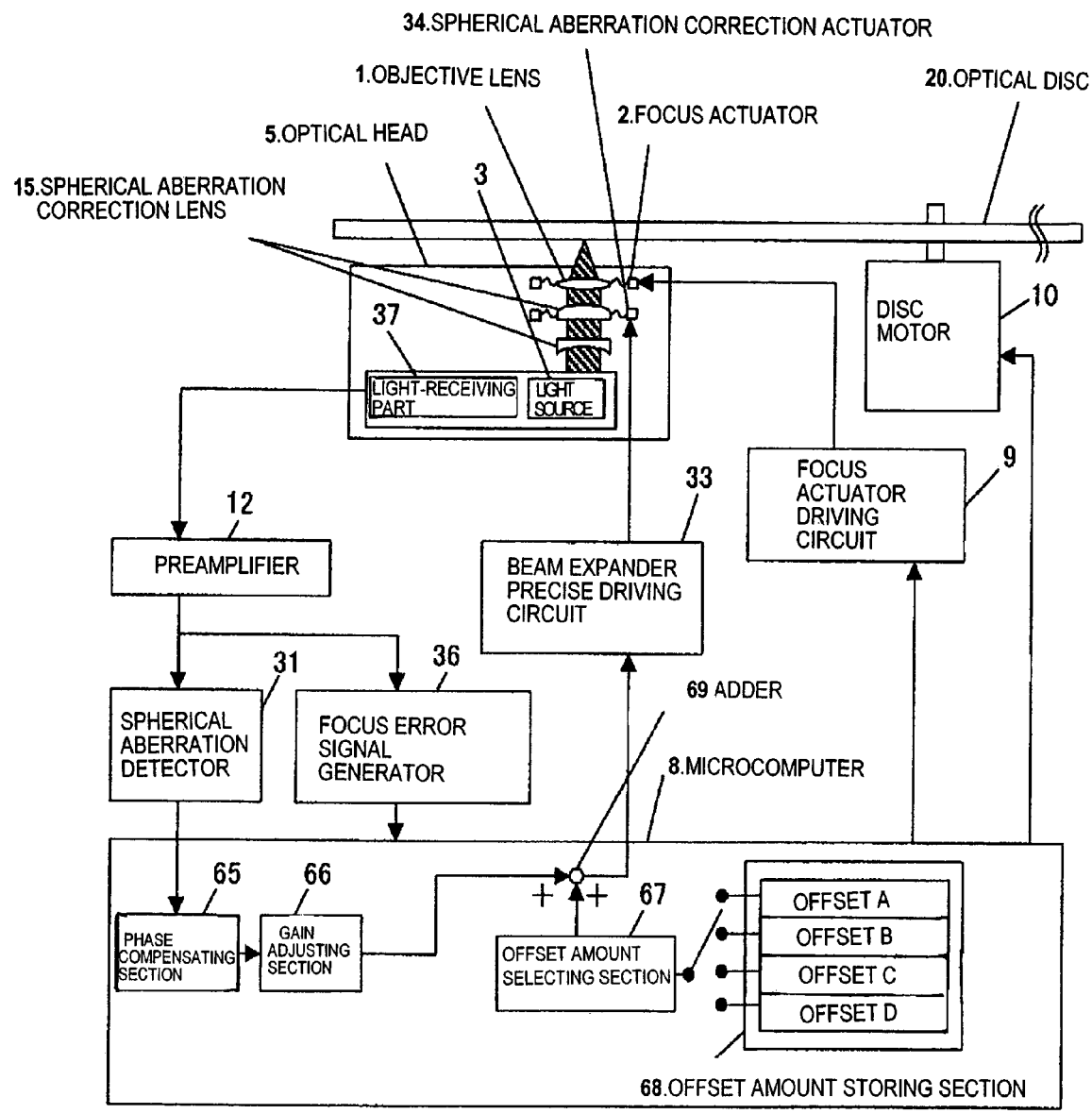
FIG. 21 is a block diagram showing the configuration of an optical disc device according to Embodiment 4 of the present invention.
Figure 23:
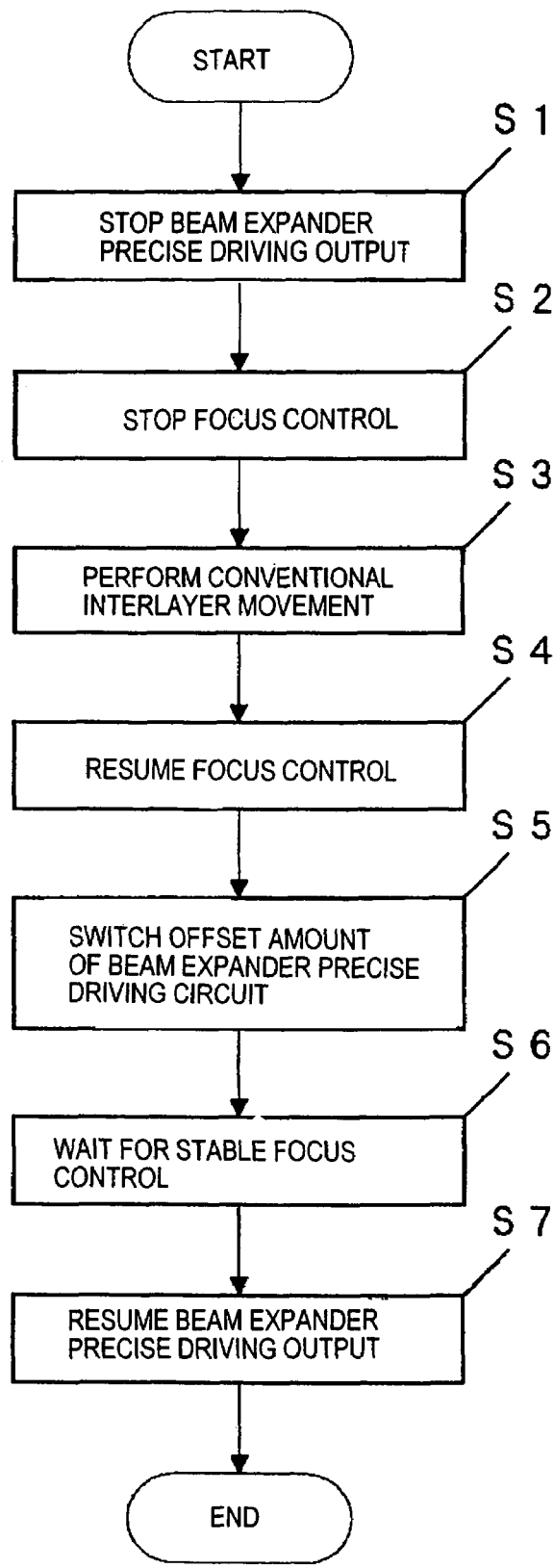
FIG. 23 is a flowchart showing the sequence of spherical aberration correction during interlayer movement according to Embodiment 4.

FIG. 21 is a block diagram showing the configuration of an optical disc device according to Embodiment 4. FIG. 22 is a waveform chart showing driving signals for correcting spherical aberration during the interlayer movement of Embodiment 4. FIG. 23 is a flowchart showing the sequence of spherical aberration correction during the interlayer movement of Embodiment 4. In these drawings, the same members and components as those of the conventional art and Embodiment 1 are indicated by the same reference numerals and the explanation thereof is omitted.

A microcomputer 8 comprises an offset amount storing section 68 for storing an offset amount according to the information layers of an optical disc 20 and an offset amount selecting section 67, which is offset applying means and acts as offset switching means. By using the offset amount selecting section 67, the microcomputer 8 retrieves, from the offset amount storing section 68, a desired storage value corresponding to each of the information layers of the optical disc 20, and the microcomputer 8 performs switching to the retrieved offset amount. After the switched offset amount and a spherical aberration correction signal are added by an adder 69, the result is used as a driving signal to a beam expander precise driving circuit 33, so that an offset is applied to a spherical aberration correction lens unit 15.

A spherical aberration correction actuator 34 is driven by the beam expander precise driving circuit 33 for performing current amplification on control output from the microcomputer 8. An elastic body such as a plate spring is mounted on the spherical aberration correction lens unit 15 and force corresponding to a signal applied to the spherical aberration correction actuator 34 is exerted to the plate spring. As described above, force according to an offset amount corresponding to each of the information layers is applied to the plate spring for supporting the spherical aberration correction lens unit 15. Thus, the spherical aberration correction lens unit 15 can be moved finely.

Further, as with Embodiment 1, a focus error signal is generated from an added signal of an outer peripheral focus error signal and an inner peripheral focus error signal, and a spherical aberration detection signal is generated from a difference signal of the outer peripheral focus error signal and the inner peripheral focus error signal.

Referring to FIGS. 21 to 23, the following will describe spherical aberration correction control during interlayer movement according to Embodiment 4 configured thus.

In the present embodiment, a spherical aberration detection signal outputted from a spherical aberration detector 31 is inputted to the microcomputer 8 just like Embodiment 1 while focus control is performed, and a filtering operation such as phase compensation and gain compensation is performed in the microcomputer 8.

The microcomputer 8 selects, by using the offset amount selecting section 67, an offset amount corresponding to the information layer at a destination from offset amounts stored in the offset amount storing section 68, and the microcomputer 8 performs switching. Thereafter, the microcomputer 8 adds, by using an adder 69, the switched offset amount and a spherical aberration correction signal obtained after the filtering operation, and outputs the added signal to the beam expander precise driving circuit 33. The beam expander precise driving circuit 33 performs correction control for spherical aberration based on a spherical aberration correction signal obtained after offset addition.

During interlayer movement, as shown in FIGS. 22(b) and 22(d), the microcomputer 8 firstly makes inoperative focus control and correction control for spherical aberration at time t1, that is, stops the focus control and correction control for spherical aberration (S1 and S2 of FIG. 23). As shown in FIG. 22(d), the microcomputer 8 outputs a command to a focus actuator driving circuit 9 until t2 according to steps similar to those of the conventional art (S3 of FIG. 23). When interlayer movement similar to that of the conventional art is completed, focus control having been made inoperative is simultaneously resumed (S4 of FIG. 23). As shown in FIG. 22(c), the offset amount selecting section 67 of the microcomputer 8 simultaneously retrieves an offset amount for the information recording surface at a destination from the offset amount storing section 68 with respect to the beam expander precise driving circuit 33. As shown in FIG. 22(b), the offset amount is added to a beam expander precise driving signal.

Thus, the beam expander precise driving circuit 33 drives the spherical aberration correction actuator 34 based on the beam expander precise driving signal and set the DC component of the spherical aberration detection signal at almost 0 (S5 of FIG. 23). After waiting for stable focus control (S6 of FIG. 23), as shown in FIG. 22(b), the microcomputer 8 outputs, to the beam expander precise driving circuit 33 at time t3, a spherical aberration correction signal having not been corrected only by an offset amount, cancels the stop of the spherical aberration correction actuator 34, and resumes correction control for spherical aberration (S7 of FIG. 23).

As described above, regarding the DC component of spherical aberration occurring during interlayer movement, an offset is added to a precise driving system (spherical aberration actuator 34), achieving stable correction control for spherical aberration with high correcting accuracy.

Further, the DC component of the spherical aberration detection signal is measured at predetermined time and an average value of the DC component is added to an offset amount of the offset amount storing section 68, the offset amount being currently selected by the offset amount selecting section 67, so that the most proper target position is obtained for spherical aberration correction and tracking accuracy is further improved.

Embodiment 5

Figure 24:
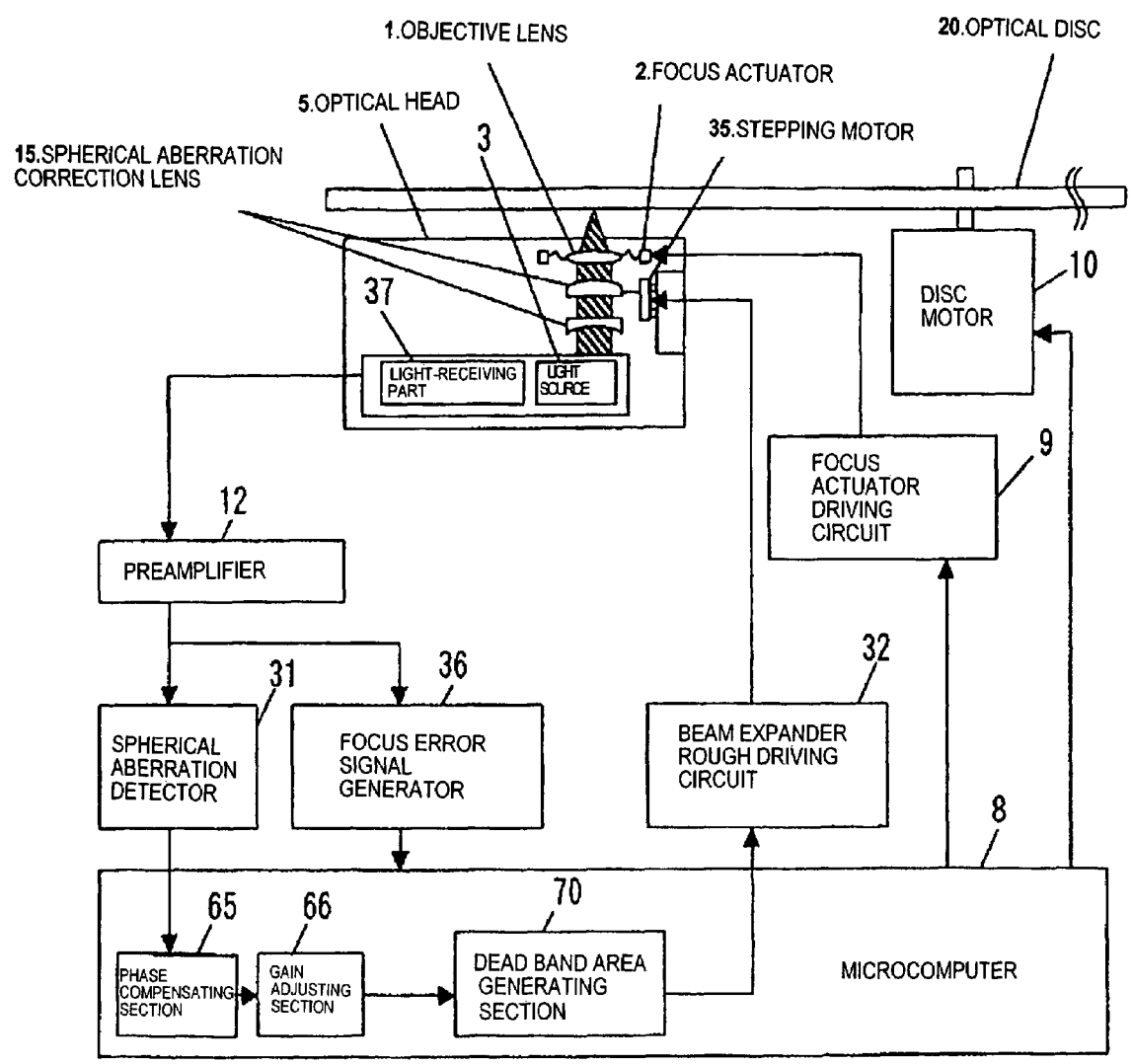
FIG. 24 is a block diagram showing the configuration of an optical disc device according to Embodiment 5 of the present invention.

FIG. 24 is a block diagram showing the configuration of an optical disc device according to Embodiment 5. FIGS. 25(*a*) to 25(*d*) are waveform charts showing driving signals and so on for spherical aberration correction during interlayer movement according to Embodiment 5. In these drawings, the same members and components as those of the conventional art and Embodiment 1 are indicated by the same reference numerals and the explanation thereof is omitted.

As shown in FIG. 24, a microcomputer 8 of the present embodiment comprises a dead band area generating section 70. The dead band area generating section 70 receives a signal outputted from a gain adjusting section 66. The dead band area generating section 70 operates so that the signal is interrupted and is not transmitted to a beam expander rough driving circuit 32 when the signal has an absolute value equal to or smaller than a predetermined value.

A stepping motor 35 is driven by the beam expander rough driving circuit 32 for performing current amplification on control output from the microcomputer 8.

A spherical aberration correction lens unit 15 can be moved by the stepping motor 35 over a wide range. Further, as with Embodiment 1, a focus error signal is generated from an added signal of an outer peripheral focus error signal and an inner peripheral focus error signal, and a spherical aberration detection signal is generated from a difference signal of the outer peripheral focus error signal and the inner peripheral focus error signal.

Referring to FIGS. 24 and 25, the following will describe correction control for spherical aberration according to Embodiment 5 configured thus.

In the present embodiment, a spherical aberration detection signal outputted from a spherical aberration detector 31 is inputted to the microcomputer 8 just like Embodiment 1 while focus control is performed, and a filtering operation such as phase compensation and gain compensation is performed in the microcomputer 8. The dead band area generating section 70 in the microcomputer 8 receives from the gain adjusting section 66 a spherical aberration correction signal obtained after the filtering operation. When the signal has an absolute value exceeding the predetermined value, the microcomputer 8 outputs the signal to a beam expander rough driving circuit 32. When the signal has an absolute value equal to or smaller than the predetermined value, the microcomputer 8 interrupts the output of the signal.

As will be described later, since the stepping motor is driven at time t1, the spherical aberration correction signal obtained after the filtering operation has a waveform shown in FIG. 25(*a*). It is understood that the spherical aberration detection signal is reduced by the driving of the stepping motor at time t1 and time t2.

FIG. 25(*d*) shows the output of the dead band area generating section 70 (spherical aberration detection signal after a dead-band processing). The spherical aberration detection signal is outputted to the beam expander rough driving circuit 32. The beam expander rough driving circuit 32 outputs a signal of FIG. 25(*b*) based on the spherical aberration correction signal obtained after the dead-band processing, and performs correction control for spherical aberration.

As shown in FIG. 25(*c*), the stepping motor 35 is driven by the beam expander rough driving circuit at time t1 and t2 in such a manner as to correct spherical aberration. However, after time t2, the spherical aberration correction signal has an absolute value equal to or smaller than the predetermined value as shown in FIG. 25(*d*) and the output is interrupted. Thus, as shown in FIG. 25(*c*), correction is not performed by the stepping motor 35.

In this way, it is possible to reduce a transient error caused by the transient response of the stepping motor 35 when the spherical aberration correction signal (or spherical aberration detection signal) is slightly changed. Particularly when the thickness of the disc is slowly changed in a spiral operation and spherical aberration is changed at a low frequency, smooth tracking can be performed with a great effect.

Embodiment 6

Figure 26:
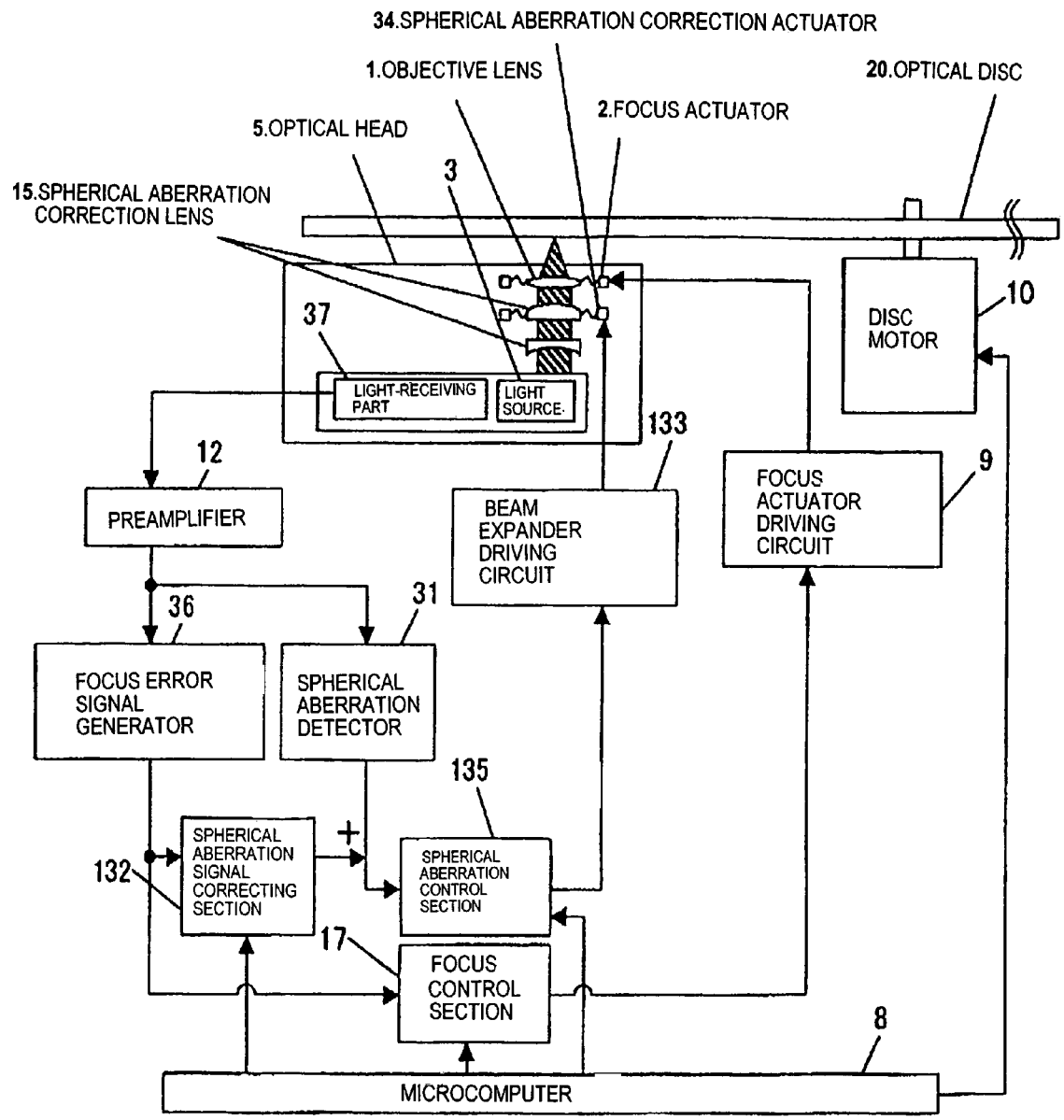
FIG. 26 is a block diagram showing the configuration of an optical disc device according to Embodiment 6 of the present invention.

FIG. 26 is a block diagram showing the configuration of an optical disc device according to Embodiment 6. FIG. 27 is a sectional view showing a light beam to explain the spherical aberration detection of the present embodiment. In the optical disc device of the present embodiment, a light-receiving part 37 and a preamplifier 12 are configured as shown in FIG. 10 and FIG. 11 just like Embodiment 1.

In FIG. 26, reflected light received by the light-receiving part 37 from an optical disc 20 is detected as photocurrent corresponding to a quantity of received light and is transmitted to the preamplifier 12. The preamplifier 12 performs current-voltage conversion and transmits voltage output corresponding to the photocurrent to a focus error signal generator 36 and a spherical aberration detector 31.

Based on a signal from the light-receiving part 37 acting as light-receiving means, the focus error signal generator 36 acting as converging state detecting means detects a signal corresponding to the converging state of a light beam on an information layer 29 of the optical disc 20. To be specific, a signal corresponding to a converging state is detected based on an output signal of the preamplifier 12, and an error signal of the optical disc 20 and a light beam spot, which is outputted from an optical head 5 and is focused, is generated with respect to the vertical direction.

The spherical aberration correction actuator 34 drives a spherical aberration correction lens unit 15 acting as spherical aberration changing means. To be specific, a distance is adjusted between a pair of lenses constituting the spherical aberration correction lens unit 15, so that the spherical aberration of a light beam spot can be changed.

In the present embodiment and later, the spherical aberration correction lens unit 15 is used as spherical aberration changing means. The spherical aberration changing means is not limited in the present invention. An element may be applicable in which an optical distance (optical path) is changed by a liquid crystal or the like and thus spherical aberration is corrected. This kind of spherical aberration changing means is driven by a circuit for applying a proper voltage to a liquid crystal.

The spherical aberration detector 31 acting as spherical aberration detecting means detects a state of spherical aberration occurring on a light beam spot generated on the information layer 29 of the optical disc 20 based on a signal from the light-receiving part 37 acting as light-receiving means, and the spherical aberration detector 31 outputs a signal corresponding to the state of spherical aberration (hereinafter, referred to as a spherical aberration signal).

Incidentally a focus control system and a spherical aberration control system interfere with each other. To be specific, a detection error corresponding to defocus appears on a spherical aberration signal, and a distance from an objective lens to the focus is changed according to a correction amount of spherical aberration in an FE signal. Thus, the FE signal is multiplied by a predetermined multiple in a spherical aberration signal correcting section 132 and is added to a spherical aberration signal, so that the influence of defocus on the spherical aberration signal is eliminated. Hence, it is possible to cut off an interruption loop of a focus control system and a spherical aberration control system.

The spherical aberration signal corrected based on the FE signal is transmitted to a beam expander driving circuit 133 via a spherical aberration control section 135. Therefore, a spherical aberration correction actuator 34 is controlled according to the spherical aberration signal having been corrected based on the FE signal. Besides, the spherical aberration control section 135 has a filter for phase compensation, gain compensation, and so on and stabilizes the spherical aberration control system. Further, the beam expander driving circuit 133 is a driving circuit of the spherical aberration correction actuator 34.

Referring to FIG. 10, a method of generating the FE signal will be described below.

A detection lens 46 converges a light beam, which is light reflected from the optical disc 20. A polarized beam splitter 47 divides a light beam, which is reflected light, into two. A first light shielding plate 48 shields the light beam inside a predetermined radius of the light beam, which is reflected light. An outer peripheral light-receiving part 40 receives a light beam having passed through the first light shielding plate 48, and converts the received light beam into photocurrent. A second light shielding plate 49 shields a light beam outside the predetermined radius of the light beam, which is reflected light. An inner peripheral light-receiving part 41 receives the light beam having passed through the second light shielding plate 49, and converts the received light beam into photocurrent.

To be specific, as shown in FIG. 10, in the light-receiving part 37, the polarized beam splitter 47 divides a light beam serving as reflected light having passed through a detection lens 46 from the optical disc 20. While the first light shielding plate 48 retrieves only an outer peripheral light beam, the second light shielding plate 49 retrieves only an inner peripheral light beam. Light quantities are detected by an outer peripheral light-receiving part 40 and an inner peripheral light-receiving part 41, respectively.

The light-receiving part 37, the focus error signal generator 36, the spherical aberration detector 31, and the preamplifier 12 of the present embodiment are configured as FIG. 11.

The outer peripheral light-receiving part 40 and the inner peripheral light-receiving part 41 in FIG. 11 are each divided into four areas A, B, C, and D. Each of the areas generates photocurrent according to a detected light quantity and outputs the photocurrent to corresponding I/V converters 42a to 42d and I/V converters 43a to 43d that are included in the preamplifier 12. Signals converted from current to voltage by the I/V converters 42a to 42d and the I/V converters 43a to 43d are each transmitted to an outer peripheral focus error signal generator 44 and an inner peripheral focus error signal generator 45.

An information track longitudinal direction is the tangential direction of a track 28 of the optical disc 20, and an optical disc radius direction is a direction perpendicular to the track 28 of the optical disc 20. Therefore, the sum of the I/V converter 42b and the I/V converter 42d is subtracted from the sum of the I/V converter 42a and the I/V converter 42c in the outer peripheral focus error signal generator 44, so that an outer peripheral focus error signal serving as an FE signal is obtained by the astigmatic method, and the sum of the I/V converter 43b and the I/V converter 43d is subtracted from the sum of the I/V converter 43a and the I/V converter 43c in the inner peripheral focus error signal generator 45, so that an inner peripheral focus error signal serving as an FE signal is obtained by the astigmatic method.

A focus error signal actually used for focus control in the present embodiment is a signal obtained by adding the outer peripheral focus error signal and the inner peripheral focus error signal in the focus error signal generator 36. Namely, the sum of (the I/V converter 42a+the I/V converter 42c)−(the I/V converter 42b+the I/V converter 42d) and (the I/V converter 43a+the I/V converter 43c)−(the I/V converter 43b+the I/V converter 43d) can be rewritten to ((the I/V converter 42a+the I/V converter 43a)+(the I/V converter 42c+the I/V converter 43c))−((the I/V converter 42b+the I/V converter 43b)+(the I/V converter 42d+the I/V converter 43d)).

Therefore, the method of generating the focus error signal according to the present embodiment is somewhat different from a conventional method of generating a focus error signal according to the astigmatic method. However, the characteristics are the same.

Hence, the FE signal serving as an output signal of the focus error signal generator 36 is used, so that a light beam spot is controlled so as to have a predetermined converging state on the information layer 29 of the optical disc 20 as in a conventional device.

Subsequently, the following will describe a generating method (detecting method) of a spherical aberration signal.

A spherical aberration signal is a signal obtained by subtracting the inner peripheral focus error signal from the outer peripheral focus error signal in the spherical aberration detector 31.

Referring to FIG. 27, the spherical aberration signal will be discussed below. FIG. 27(*a*) shows that a distance is proper between the surface of the disc and the information layer and causes no spherical aberration on the information layer. FIG. 27(*b*) shows that the distance is small and causes spherical aberration on the information layer.

In a state in which the focus control is performed, a light beam emitted from the optical head 5 is refracted by a substrate 21 of the optical disc 20 as shown in FIG. 27(*a*), and an outer peripheral light beam is focused on a focal point B and an inner peripheral light beam is focused on a focal point C. A position A is present on a straight line connecting the focal point B and the focal point C on the information layer 29. Since spherical aberration does not occur on the information layer 29 of the optical disc 20, the focal point B of the outer peripheral light beam and the focal point C of the inner peripheral light beam are both coincident with the position A. Namely, an equidistant surface from the position A and the wavefront of the light beam are coincident with each other.

As shown in FIG. 27(b), when the thickness of a substrate 21 is reduced, the influence of spherical aberration is increased, the thickness corresponding to a distance from the surface of the disc to the information layer. Namely, the focal point B and the focal point C are separated from each other and the two focuses are placed into a defocus state with respect to the position A of the information layer 29 where a light beam should converge. However, focus control is performed so that the focus error signal (the output signal of the focus error generator 36) is almost 0, the signal being obtained by adding the outer peripheral focus error signal and the inner peripheral focus error signal. Therefore, the position A is coincident with the information layer 29. At this point, the wavefront of the light beam is not coincident with the equidistant surface from the position A. In this drawing, solid lines indicate inner peripheral and outer peripheral light beams when spherical aberration occurs, and broken lines show inner peripheral and outer peripheral light beams when spherical aberration does not occur. Further, when a thickness between the surface of the disc and the information layer becomes larger than that of FIG. 27(a), the focal point B and the focal point C are similarly separated from each other, and the two focuses are placed in the defocus state with respect to the position A of the information layer 29 where a light beam should converge.

As shown in FIG. 11, the spherical aberration detector 31 acting as spherical aberration detecting means detects an influence amount of spherical aberration on the outer peripheral light beam (a defocus amount on the focal point B) and an influence amount of spherical aberration on the inner peripheral light beam (a defocus amount on the focal point C). Then, the spherical aberration detector 31 detects, based on the influence amounts, a signal according to an amount of spherical aberration occurring on the converging position of the light beam. To be specific, a difference is calculated between the outer peripheral focus error signal and the inner peripheral focus error signal, which are the output signals of the outer peripheral focus error signal generator 44 and the inner peripheral focus error signal generator 45, so that a spherical aberration detection signal is generated according to an amount of spherical aberration occurring on the converging position of the light beam.

In FIG. 26, the spherical aberration signal is subjected to a filtering operation such as phase compensation and gain compensation in the spherical aberration control section 135. Thereafter, the spherical aberration control section 135 outputs a driving signal for moving the spherical aberration correction lens unit 15 to the beam expander driving circuit 133, and the spherical aberration correction actuator 34 having received the driving signal moves the spherical aberration correction lens unit 15. Namely, correction control is performed so that spherical aberration is almost 0, that is the focal point B and the focal point C are coincident with each other. In other words, correction control is performed so that the focal point B and the focal point C are both brought closer to the position A. However, the focus control system and the spherical aberration control system interfere with each other, resulting in instability in the control systems.

Referring to the waveform charts of FIGS. 49 and 50, the interference of the focus control system and the spherical aberration control system will be described. The following will firstly describe the influence of the focus control system on the spherical aberration signal. It is assumed that the spherical aberration control system is not operated. FIG. 49(a) shows that a received light beam is divided at the 50% radius position of the received light beam by adjusting the first light shielding plate 48 and the second light shielding plate 49. FIG. 49(b) shows the outer peripheral focus error signal, FIG. 49(c) shows the inner peripheral focus error signal, FIG. 49(d) shows the focus error signal, and FIG. 49(e) shows the spherical aberration detection signal. Additionally, as described above, a signal obtained by subtracting the inner peripheral focus error signal of FIG. 49(c) from the outer peripheral focus error signal of FIG. 49(b) is the spherical aberration detection signal of FIG. 49(e). Vertical axes represent voltages of the signals and horizontal axes represent defocus.

FIG. 50(a) shows that a received light beam is divided at the 75% radius position of the received light beam by adjusting the first light shielding plate 48 and the second light shielding plate 49. FIG. 50(b) shows the outer peripheral focus error signal, FIG. 50(c) shows the inner peripheral focus error signal, FIG. 50(d) shows the focus error signal, and FIG. 50(e) shows the spherical aberration detection signal. Vertical axes represent voltages of the signals and horizontal axes represent defocus.

As shown in FIG. 49(a), when the received light beam is divided on the 50% radius position of the received light beam, since the outer periphery is larger in light quantity than the inner periphery, the outer peripheral focus error signal of FIG. 49(b) is larger in amplitude than the inner peripheral focus error signal of FIG. 49(c). As a result, even though spherical aberration has a constant displacement, the spherical aberration detection signal is changed by defocus. Besides, the spherical aberration signal is in the same polarity (delay of 0° from the phase of the FE signal) as the focus error signal of FIG. 49(d) due to defocus.

Meanwhile, as shown in FIG. 50(a), when the received light beam is divided on the 75% radius position of the received light beam, since the outer periphery is smaller in light quantity than the inner periphery, the outer peripheral focus error signal of FIG. 50(b) is smaller in amplitude than the inner peripheral focus error signal of FIG. 50(c). As a result, even though spherical aberration has a constant displacement, the spherical aberration detection signal is changed by defocus. Besides, the spherical aberration signal is opposite in polarity (delay of 180° from the phase of the FE signal) to the focus error signal of FIG. 50(d) due to defocus.

The displacement of the spherical aberration signal that is caused by the above defocus acts as disturbance in the spherical aberration control system.

Figure 53:
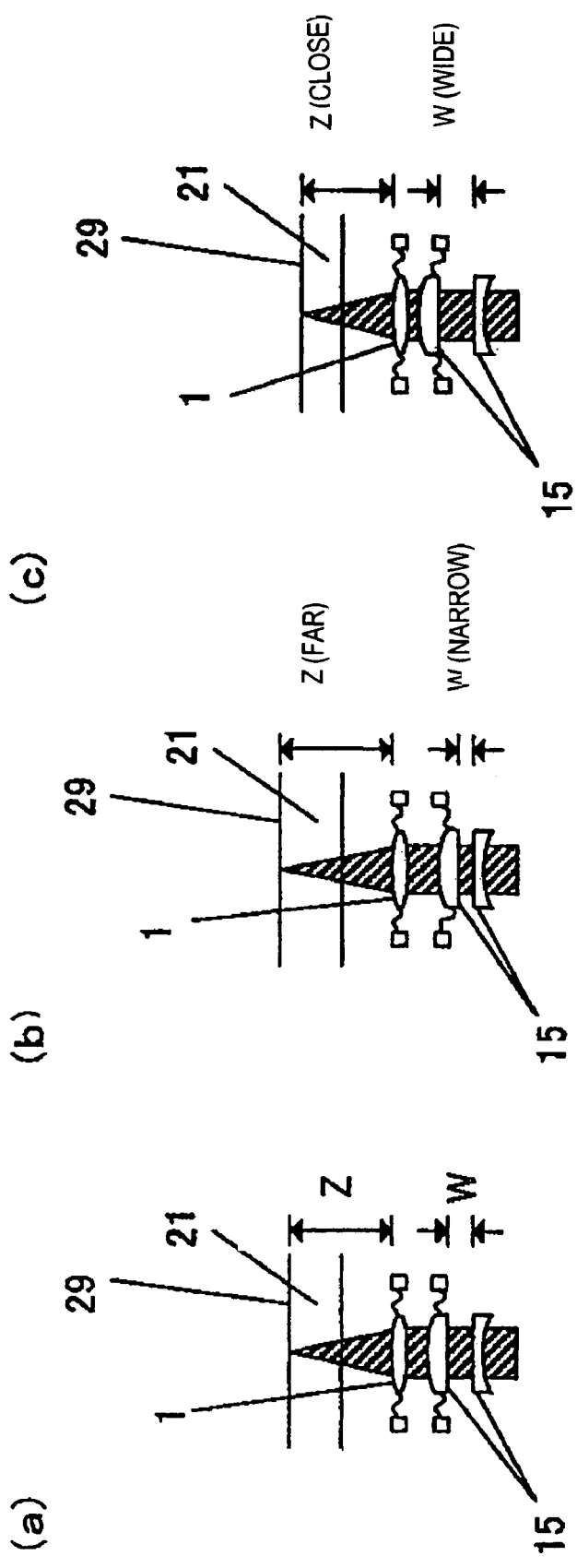
FIGS. 53(a) to 53(c) are schematic diagrams showing the influence of the position of the spherical aberration correction lens upon a distance from an objective lens to a focus.

Referring to FIG. 53, the following will specifically describe that the movement of the spherical aberration correction lens unit 15 acts as disturbance in the focus control system. FIG. 53 is a schematic drawing showing the influence of the position of the spherical aberration correction lens on a distance from an objective lens to the focus. FIG. 53(a) shows that an optimum thickness is set between the surface of the disc and the information layer and no spherical aberration occurs on the information layer. Similarly FIG. 53(b) shows a larger thickness. Besides, FIG. 53(b) shows that the focus control system is normally operated and spherical aberration occurring on the information layer is corrected by the spherical aberration correction lens unit 15. FIG. 53(c) shows a smaller thickness. FIG. 53(c) shows that spherical aberration occurring on the information layer is corrected by the spherical aberration correction lens unit 15 as FIG. 53(b).

As shown in FIG. 53(b), as the substrate is increased in thickness, an interval W of the spherical aberration correction lens unit 15 is reduced. Further, a distance Z from the objective lens 1 to the focus is increased.

Further, as shown in FIG. 53(c), as the substrate is reduced in thickness, the interval W is increased and the distance Z is reduced. The distance Z is changed according to a change in the interval W of the spherical aberration correction lens unit 15. Namely, the change in the distance Z acts as disturbance in the focus control system.

Figure 28:
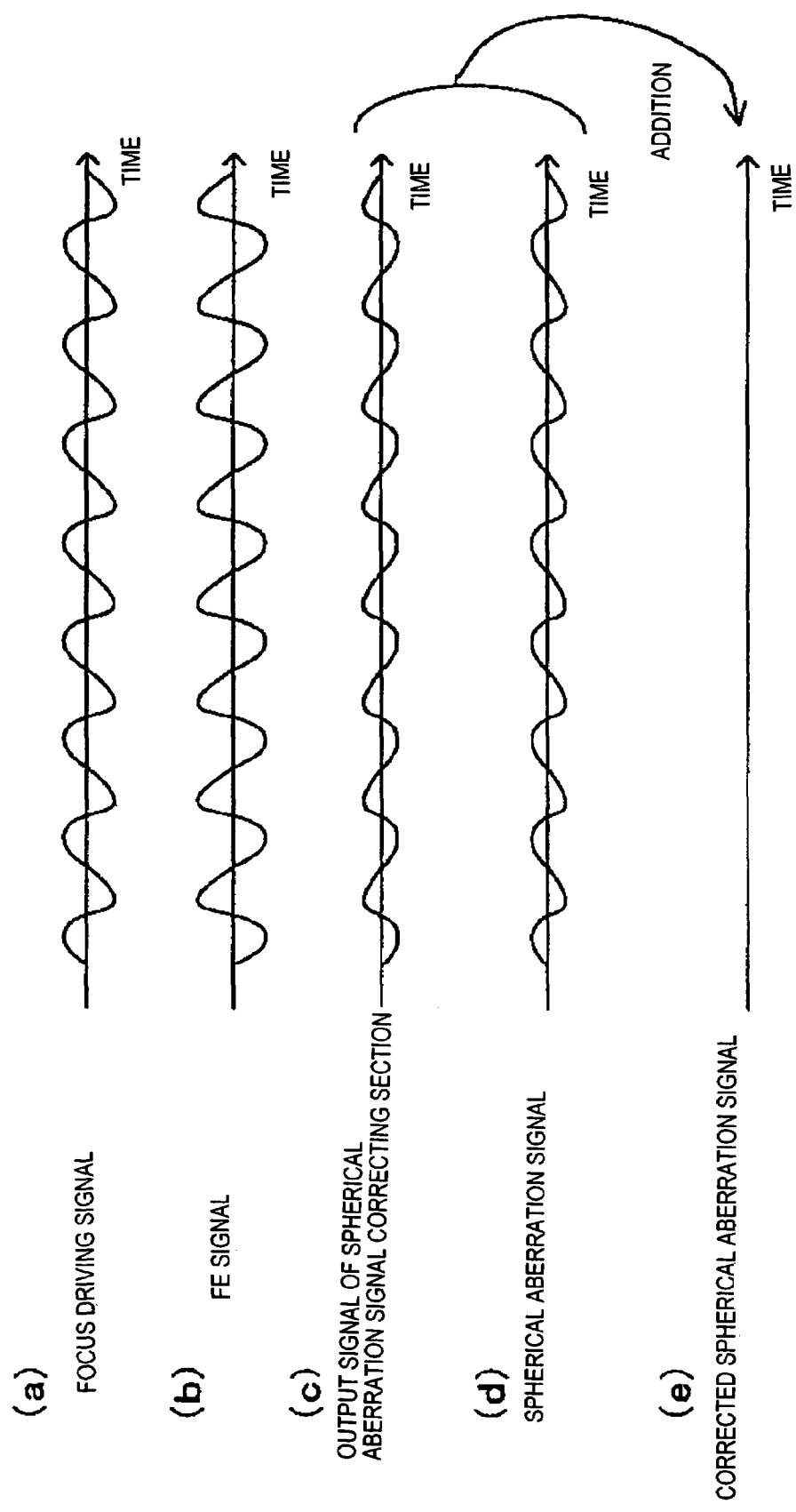
FIGS. 28(a) to 28(e) are waveform charts for explaining the correction of a spherical aberration detection signal according to Embodiment 6.

The following will describe a method of removing the influence of the focus control system on the spherical aberration signal. Besides, the spherical aberration signal correcting section 132 is a block for removing the influence. Referring to FIG. 28, the operation of the spherical aberration signal correcting section 13 will be described below. FIG. 28(a) shows the output of the focus actuator driving circuit 9. FIG. 28(b) shows the output of the focus error signal generator 36, FIG. 28(c) shows the output of the spherical aberration signal correcting section 132, FIG. 28(d) shows the output of the spherical aberration detector 31, and FIG. 28(e) shows the spherical aberration signal after correction.

Additionally, the drawings show that disturbance with a higher frequency than the band of the focus control system is applied to the focus control system. The output of the focus actuator driving circuit 9 serves as a focus driving signal according to disturbance applied as FIG. 28(a). Further, a defocus amount has the waveform of FIG. 28(a). The spherical aberration signal changes its level according to a defocus amount as described above and has the waveform of FIG. 28(d). FIG. 28(d) shows disturbance applied by the focus control system to the spherical aberration signal. The microcomputer 8 multiplies the FE signal by a predetermined number (K) in the spherical aberration signal correcting section 132 during focus control and adds the result to spherical aberration signal, so that the influence of defocus upon the spherical aberration signal is removed as shown in FIG. 28(e).

Figure 1:
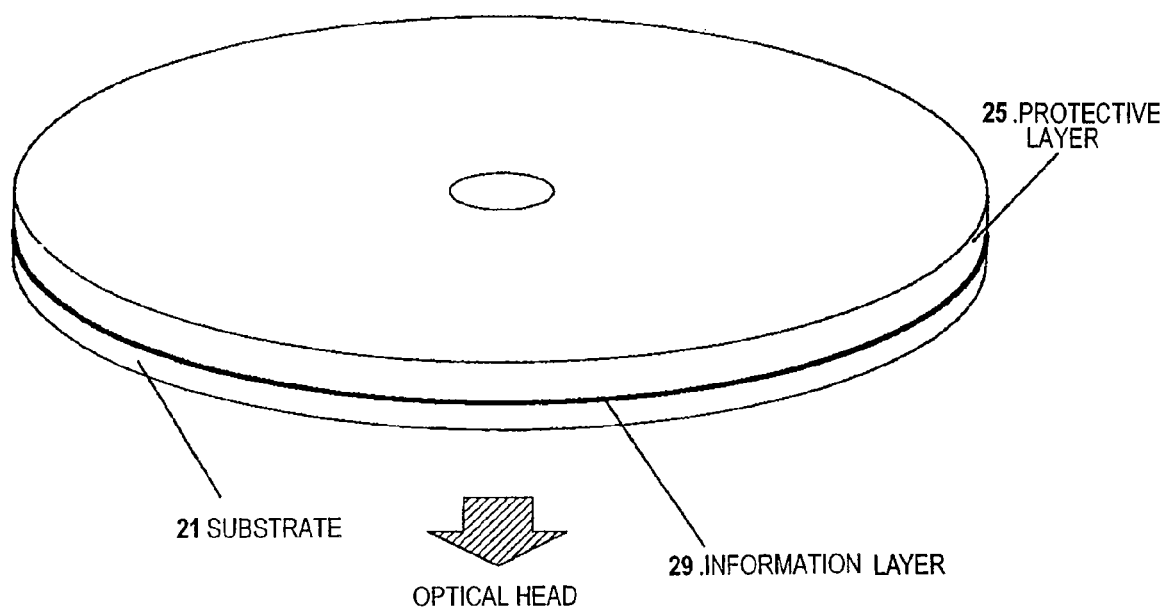
FIG. 1 is a schematic diagram showing an optical disc.
Figure 29:
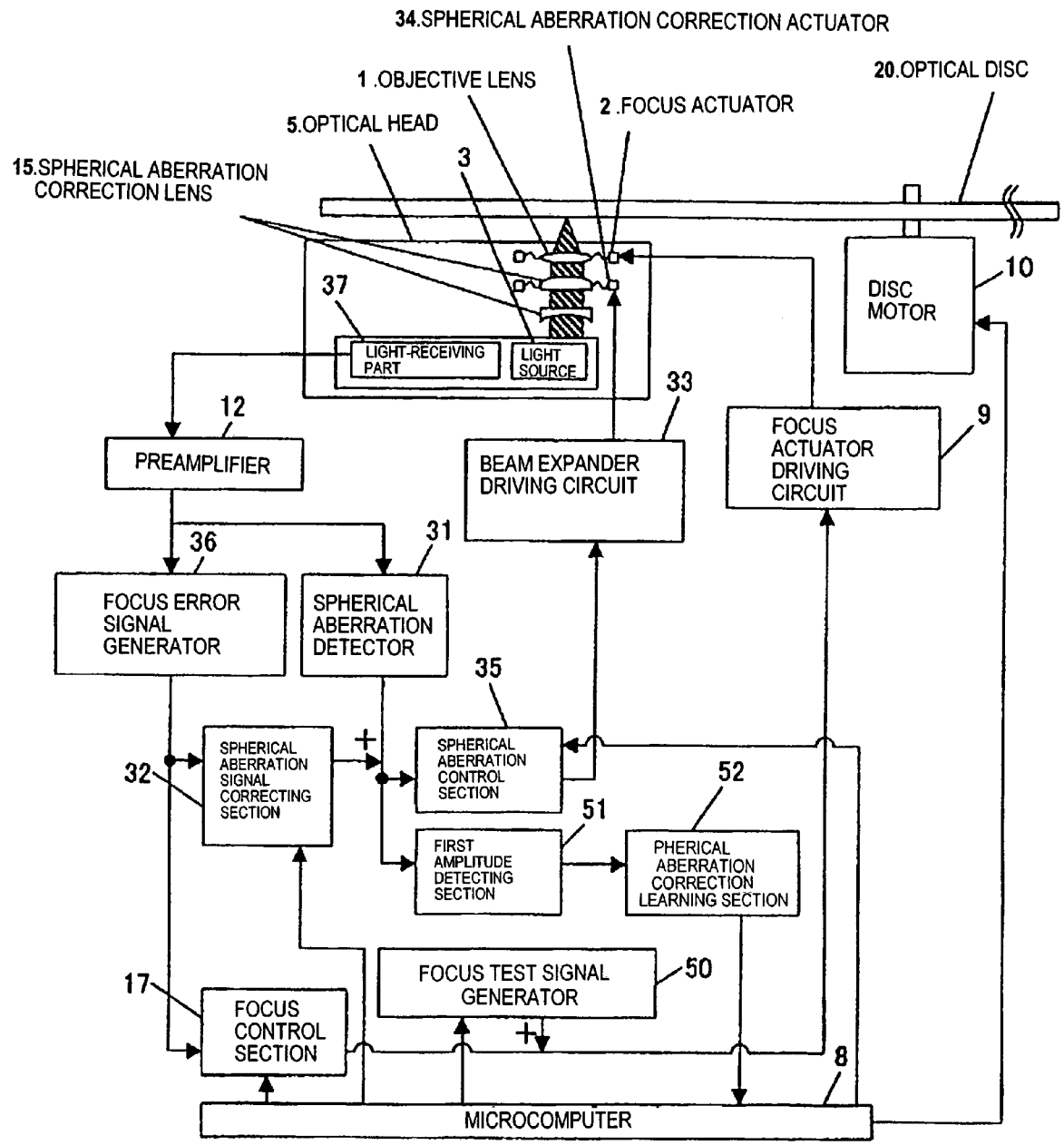
FIG. 29 is a block diagram showing the configuration of an optical disc device to explain a method of learning an amplification factor of a spherical aberration signal correcting section according to Embodiment 6.

The following will describe a method of determining an amplification factor K of the spherical aberration signal correcting section 132. FIG. 29 is a block diagram showing the configuration of an optical disc device to explain the method of learning an amplification factor in the spherical aberration signal correcting section according to the present embodiment. The optical disc device of FIG. 29 is formed by adding a block for learning an amplification factor K to the optical disc device of FIG. 1. Therefore, a block denoted by the same reference numeral as FIG. 29 is the same block as that of FIG. 1. The focus test signal generator 50 adds a test signal to a focus driving signal outputted from a focus control section 17. A first amplitude detecting section 51 detects the amplitude of the spherical aberration signal. A spherical aberration correction learning section 52 searches for an amplification factor of the spherical aberration signal correcting section 132 that causes the first amplitude detecting section 51 to have a minimum amplitude detection signal.

Figure 30:
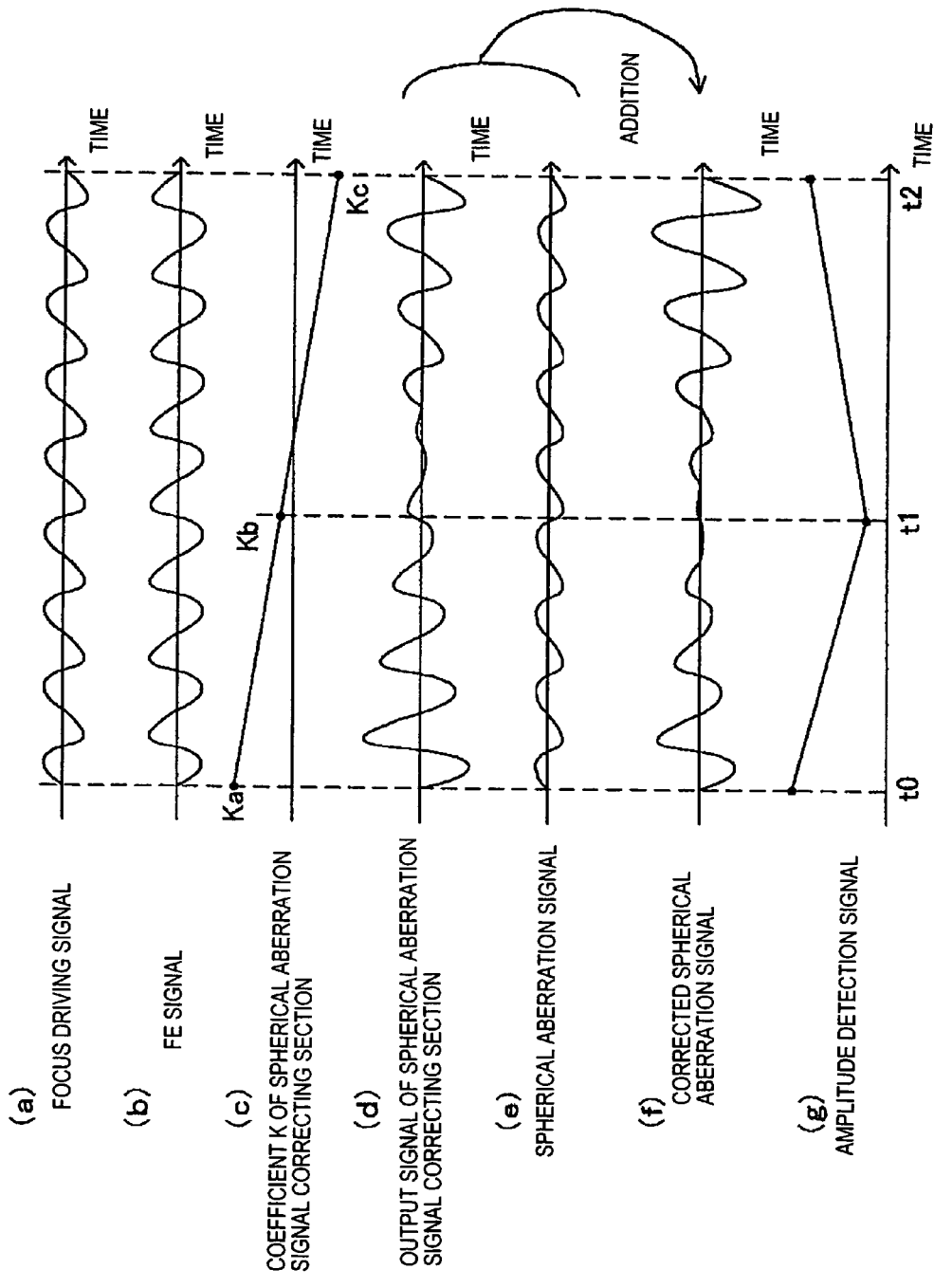
FIGS. 30(a) to 30(g) are waveform charts for explaining the learning of a spherical aberration signal correcting section according to Embodiment 6.

Referring to the waveform of FIG. 30, the operation will be discussed below. FIG. 30(a) shows the output of the focus actuator driving circuit 9. Similarly FIG. 30(b) shows the output of the focus error signal generator 36, FIG. 30(c) shows the amplification factor of the spherical aberration signal correcting section 132, FIG. 30(d) shows the output of the spherical aberration signal correcting section 132, FIG. 30(e) shows the output of the spherical aberration detector 31, FIG. 30(f) shows a spherical aberration signal after correction, and FIG. 30(g) shows the output of the first amplitude detecting section 51. Besides, as shown in FIG. 50(a), a received light beam is divided at the 75% radius of the light beam. A vertical axis represents a voltage of a signal and a horizontal axis represents time. The spherical aberration correction learning section 52 sets Ka as an amplification factor of the spherical aberration signal correcting section 132, that is, a coefficient K at initial time t0.

The focus test signal generator 50 adds the test signal of FIG. 30(a) to the focus driving signal, which is the output of the focus control section 17, when focus control is performed and spherical aberration control is not performed. Since the focus error signal generator 36 is opposite in polarity to the focus driving signal, the output of the focus error signal generator 36 has the signal of FIG. 30(b) that has a phase shift of 180° from the phase of FIG. 30(a). In this state, since the amplitude of the spherical aberration signal is proportionate to the focus error signal, the spherical aberration signal has the waveform of FIG. 30(e). However, as shown in FIG. 50(a), the spherical aberration signal is opposite in polarity to the FE signal.

While the spherical aberration correction learning section 52 gradually changes the coefficient K of the spherical aberration signal correcting section 132 via the microcomputer 8, the spherical aberration correction learning section 52 measures the amplitude of the spherical aberration signal obtained after correction. Time t1 has a coefficient of Kb and time t2 has a coefficient of Kc. Additionally, the amplitude of the spherical aberration signal after correction is measured by the first amplitude detecting section 51. In FIG. 30, when the coefficient K is Ka and Kc, the signal of the spherical aberration signal after correction does not have a minimum signal, but when the coefficient K is Kb, the amplitude is minimum. Therefore, as shown in FIG. 30(g), the spherical aberration signal after correction has the minimum amplitude at an amplification factor Kb, which is determined as an amplification factor of the spherical aberration signal correcting section 132.

Figure 31:
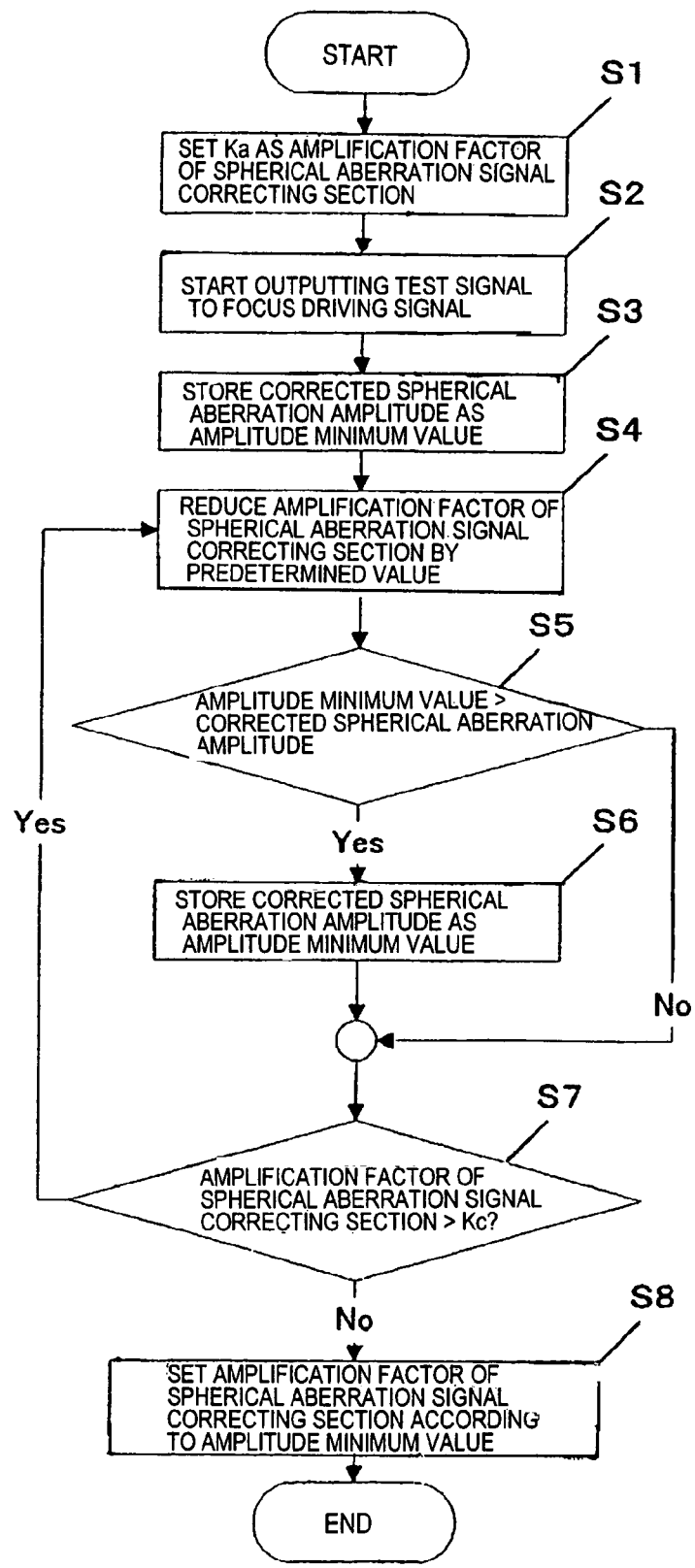
FIG. 31 is a flowchart showing the learning sequence of the spherical aberration signal correcting section according to Embodiment 6.

Referring to the flowchart of FIG. 31, an operation for determining the amplification factor K of the spherical aberration signal correcting section 132 will be described below. First, the spherical aberration correction leaning section 52 sets the initial value Ka as an amplification factor of the spherical aberration signal correcting section 132 via the microcomputer 8 in step S1.

In step S2, the focus test signal generator 50 starts adding a test signal to the focus driving signal of the focus control section 17 when the focus control is performed and spherical aberration control is not performed. In step S3, the amplitude of the spherical aberration signal having been corrected by the spherical aberration signal correcting section 132 is acquired from the first amplitude detecting section 51 and is stored as the amplitude minimum value. In step S4, a predetermined value is subtracted from the amplification factor of the spherical aberration signal correcting section 132.

In step S5, a comparison is performed to decide whether or not the amplitude of the corrected spherical aberration signal detected by the first amplitude detecting section 51 is smaller than the amplitude minimum value. When the corrected spherical aberration signal has smaller amplitude than the stored amplitude minimum value, the amplitude of the corrected spherical aberration signal is newly stored as the amplitude minimum value in step S6, and the operation proceeds to step S7. When the amplitude of the corrected spherical aberration signal is not smaller than the stored amplitude minimum value, the operation proceeds to step S7. In step S7, a comparison is performed to decide whether or not the amplification factor of the spherical aberration signal correcting section 132 is larger than Kc. When the amplification factor is larger than Kc, the operation returns to step S4. When the amplification is not larger, the operation proceeds to step S8. In step S8, an amplification factor of the spherical aberration signal correcting section 132 is set so as to correspond to the stored amplitude minimum value, and thus the operation is completed.

Subsequently, the following will describe that the amplification factor K of the spherical aberration signal correcting section 132 is switched for each layer when information is recorded or reproduced on the optical disc 20 having a plurality of information layers in a laminated structure.

Figure 5:
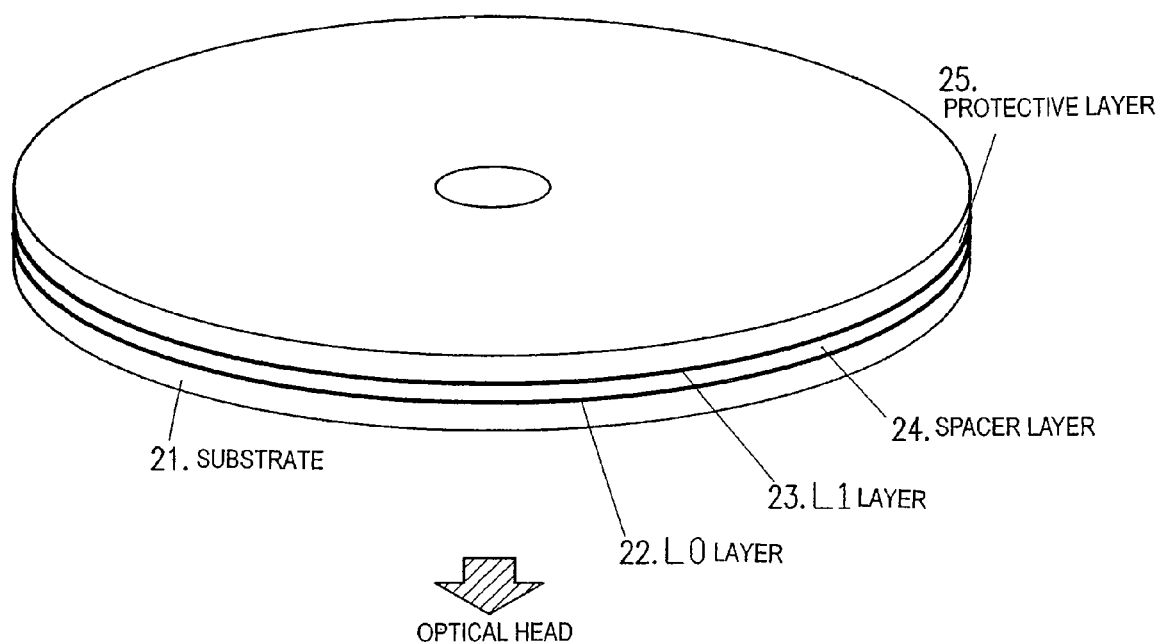
FIG. 5 is a schematic diagram showing an optical disc having a plurality of information layers.

The following will discuss recording/reproduction on the optical disc 20 shown in FIG. 5. In a double-layer disc, defocus described with reference to FIGS. 49 and 50 affects a spherical aberration signal differently for each of the different information layers. This point will be discussed below in accordance with the waveform charts of FIGS. 51 and 52.

FIG. 51(*a*) shows a division made by the first light shielding plate 48 and the second light shielding plate 49 when recording or reproduction is performed on an information layer L0. FIG. 51(*b*) shows an outer peripheral focus error signal, FIG. 51(*c*) shows an inner peripheral focus error signal, FIG. 51(*d*) shows a focus error signal, and FIG. 51(*e*) shows a spherical aberration detection signal. Vertical axes represent voltages of the signals and horizontal axes represent defocus.

FIG. 52(*a*) shows a division made by the first light shielding plate 48 and the second light shielding plate 49 when a focus is obtained on an information layer L1. FIG. 51(*b*) shows the outer peripheral focus error signal, FIG. 51(*c*) shows the inner peripheral focus error signal, FIG. 51(*d*) shows the focus error signal, and FIG. 51(*e*) shows the spherical aberration detection signal. Vertical axes represent voltages of the signals and horizontal axes represent defocus.

As shown in FIG. 51(*a*), it is assumed that a light beam received with the focus on the information layer L0 is divided at the 50% radius of the received light beam. Therefore, FIGS. 51(*b*), 51(*c*), 51(*d*), and 51(*e*) have the same waveforms as FIG. 49.

On the other hand, as shown in FIG. 52(*b*) with the focus on the information layer L1, the interval W of the spherical aberration correction lens unit 15 is smaller as compared with the focus on the information layer L0, so that the light beam incident on the objective lens 1 becomes diverging light. Therefore, return light has a smaller radius. The return light is reflected from the information layer, passes through the spherical aberration correction lens unit 15, and is incident on the light-receiving part. For example, although the first light shielding plate 48 and the second light shielding plate 49 are equal in adjustment amount, since the light beam is reduced in radius, an actual dividing position is larger than the 50% radius. In FIG. 52(*a*), the division is made at the 75% radius. Thus, the outer periphery is smaller in light quantity than the inner periphery, so that the outer peripheral focus error signal of FIG. 52(*b*) is smaller in amplitude than the inner peripheral focus error signal of FIG. 53(*c*).

As a result, the spherical aberration detection signal of FIG. 53(*e*) that is a difference signal of the outer peripheral focus error signal and the inner peripheral focus error signal is opposite in polarity due to defocus (delay of 180° from the phase of the FE signal) to the focus error signal of FIG. 53(*d*) that is an added signal of the outer peripheral focus error signal and the inner peripheral focus error signal. As described above, for each of the different information layers on which recording or reproduction is performed, the spherical aberration detector 31 affects the spherical aberration signal differently according to the movement of the objective lens 1. Hence, it is necessary to switch the amplification factor of the spherical aberration signal correcting section 132 for removing the influence.

Figure 32:
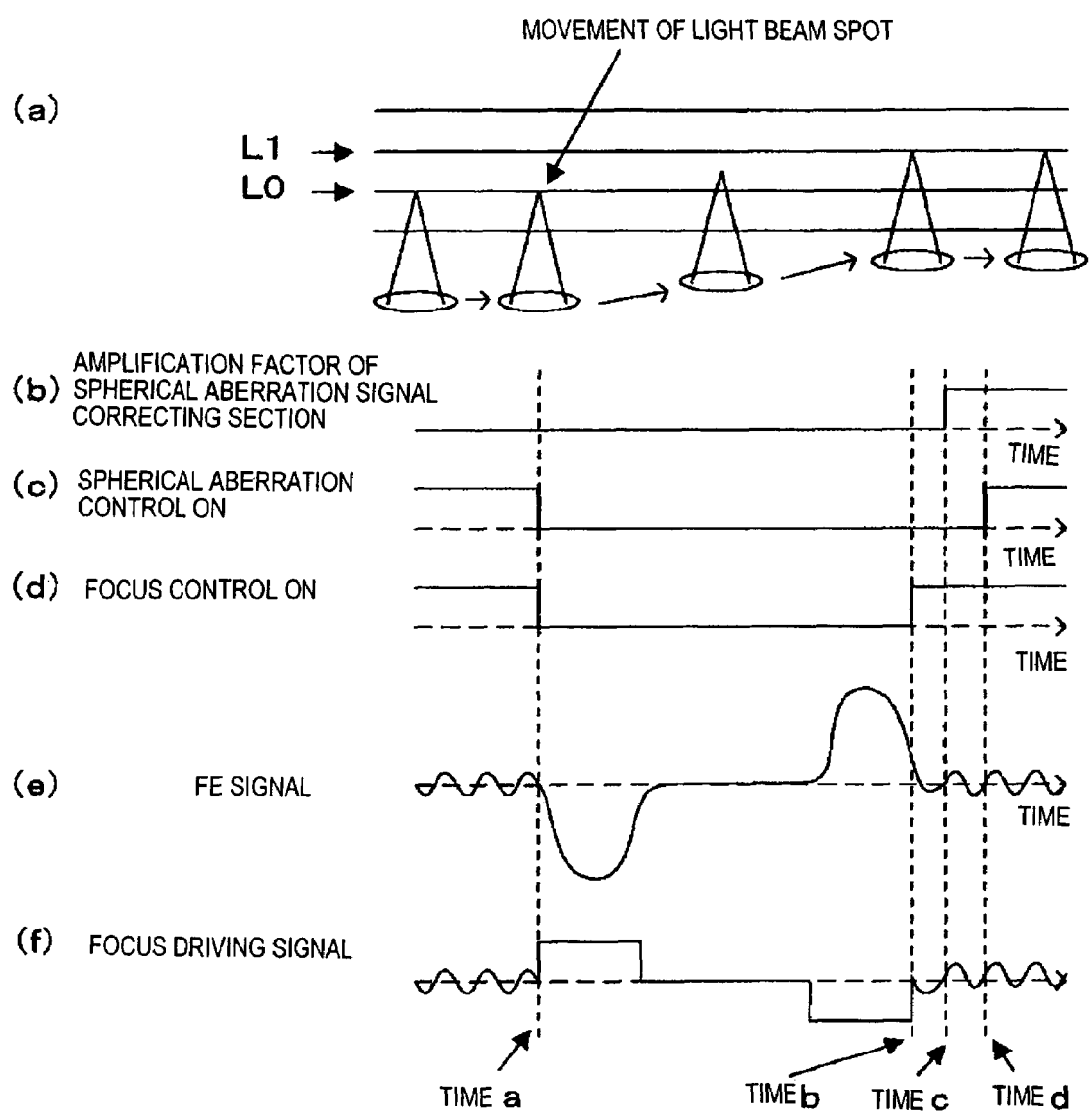
FIGS. 32(a) to 32(f) are waveform charts showing the switching of an amplification factor of the spherical aberration signal correcting section during interlayer movement according to Embodiment 6.

Referring to FIG. 32, the following will discuss the switching of the amplification factor of the spherical aberration correcting section during the interlayer movement of the laminated disc. FIG. 32(*a*) shows the movement of a light beam spot during interlayer movement. FIG. 32(*b*) shows an amplification factor of the spherical aberration signal correcting section. A vertical axis represents voltages of signals and a horizontal axis represents time. FIG. 32(*c*) represents ON/OFF of spherical aberration control. FIG. 32(*d*) shows ON/OFF of focus control. A vertical axis represents ON/OFF of control, reference character H represents ON, reference numeral L represents OFF, and a horizontal axis represents time. FIG. 32(*e*) shows an FE signal, and FIG. 32(*f*) shows a focus driving signal. A vertical axis represents voltages of the signals and a horizontal axis represents time.

There are provided: an added gain storing section for storing an amplification factor of the spherical aberration signal correcting section 132 for each layer, an added gain switching section which retrieves a desired amplification factor of the spherical aberration signal correcting section 132 from the added gain storing section and newly sets the amplification factor, and the microcomputer 8. It is assumed that a light beam firstly scans a given track on the L0. The following will describe an operation of reproducing data of the L1. First, the microcomputer 8 stores the amplification factor of the spherical aberration signal correcting section 132 for the L0 in the added gain storing section and makes focus control and spherical aberration control inoperative, that is, stops the control (time a).

Then, a predetermined acceleration/deceleration driving pulse command is given to the focus actuator driving circuit 9. After movement to the L1, the spherical aberration control is turned on immediately after the focus control having been made inoperative is turned on (time b). However, the spherical aberration control is not stabilized unless the focus control is stable. When the FE signal converges within a predetermined range while the FE signal is observed, it is decided that the focus control is stabilized and switching is made to the amplification factor of the spherical aberration signal correcting section 132 for the L1 by the added gain switching section (time c). Thereafter, the spherical aberration control having been made inoperative may be turned on (time d). Hence, it is possible to accurately and quickly remove the influence of the spherical aberration detector 31 upon the spherical aberration signal relative to a travel amount of the objective lens 1 that is different in each layer without the necessity for relearning in each interlayer movement, achieving a great effect.

Moreover, after the influence of the focus control system upon the spherical aberration signal is removed, the gain compensation of the focus control section 17 or the spherical aberration control section 135 is adjusted during focus control and spherical aberration control, so that a gain characteristic displaced by the interference of the focus control and the spherical aberration control can be also adjusted, achieving an adjustment with higher accuracy.

Additionally, gain compensation is adjusted by, for example, adding a test signal to the control system and using quadrature homodyne detection.

Embodiment 7

Figure 33:
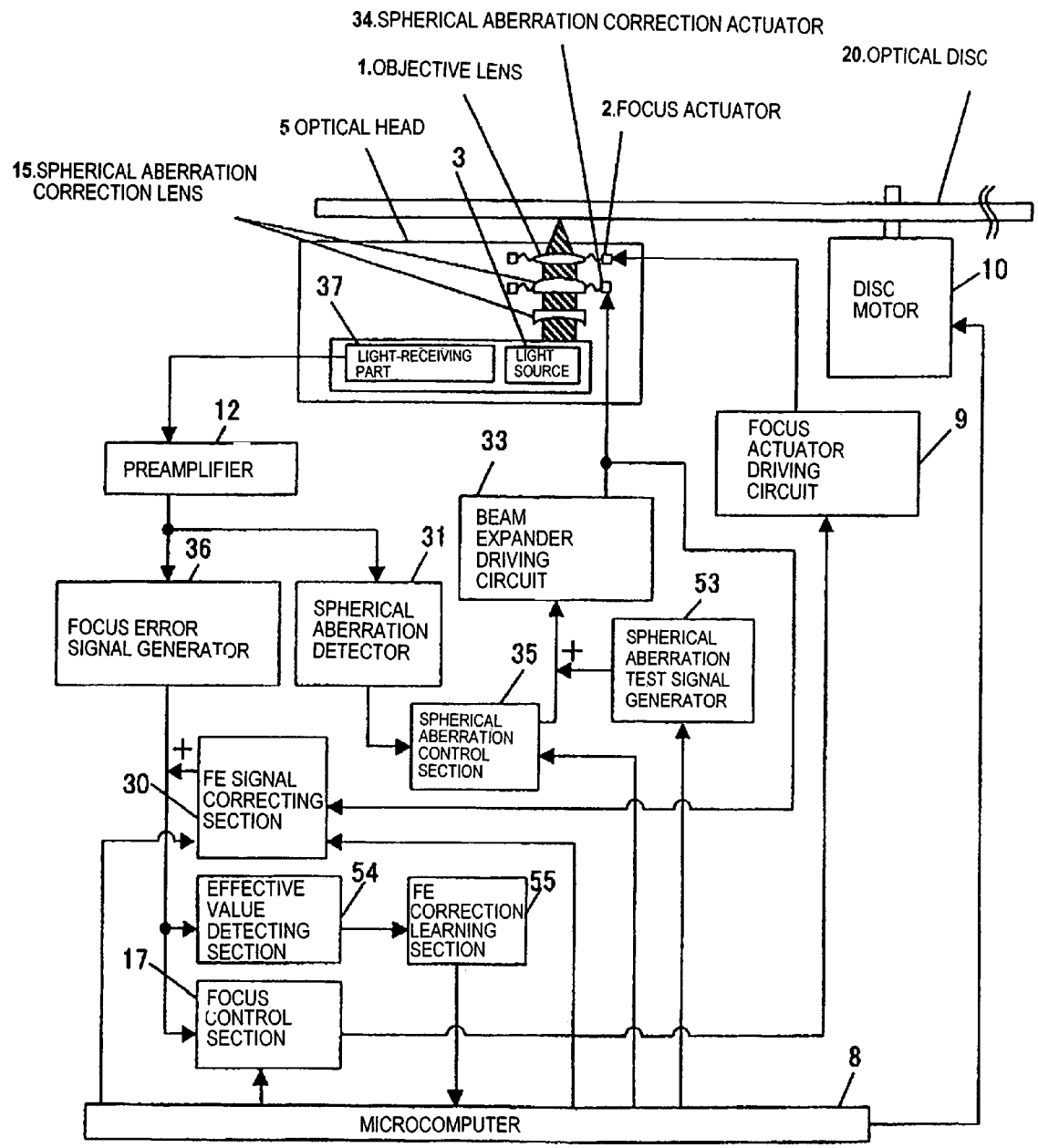
FIG. 33 is a block diagram showing the configuration of an optical disc device according to Embodiment 7 of the present invention.
Figure 34:
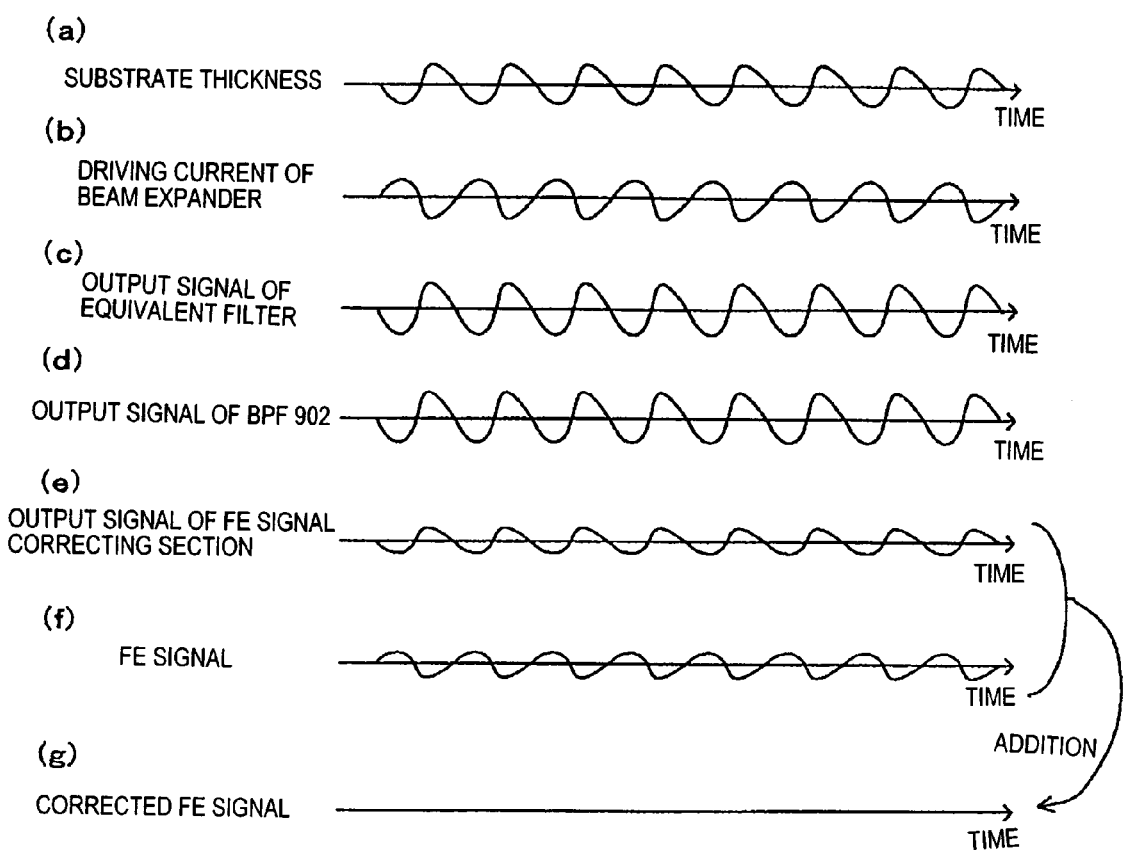
FIGS. 34(a) to 34(g) are waveform charts for explaining the correction of an FE signal according to Embodiment 7.

FIG. 33 is a block diagram showing the configuration of an optical disc device according to Embodiment 7. FIG. 34 is a waveform chart for explaining the correction of an FE signal according to Embodiment 7. In these drawings, the same members and components as those of the conventional art and Embodiment 6 are indicated by the same reference numerals and the explanation thereof is omitted.

Also in the present embodiment, focus control is performed based on a focus error signal, which is an added signal of an outer peripheral focus error signal and an inner peripheral focus error signal, as in Embodiment 6. A spherical aberration signal is generated from a difference signal of the outer peripheral focus error signal and the inner peripheral focus error signal.

An FE signal correcting section 30 processes an output signal of a beam expander driving circuit 133 and adds the output signal to an FE signal. The FE signal correcting section 30 has a filter having the same characteristic as a spherical aberration correction actuator 34 (hereinafter, referred to as an "equivalent filter") and a band-pass filter. The two filters are connected in series, multiply the outputs of the filters by a predetermined value, and output the results. The pass band of the band-pass filter is set within a frequency range higher than the band of a focus control system and lower than the band of a spherical aberration control system. Besides, in Embodiment 7, the band of the focus control system is set lower than that of the spherical aberration control system. Therefore, a frequency component which is included in a change in the interval of the spherical aberration correction lens, is higher than the band of the focus control system, and is lower than the band of the spherical aberration control system is multiplied by the predetermined multiple, and the result is added to the FE signal. The influence of the spherical aberration control system upon the focus control system will be described below.

Disturbance is applied to the focus control system according to a spherical aberration correction amount in the spherical aberration control system, that is, an interval of the spherical aberration correction lens. The disturbance is a change in distance from an objective lens to a focus.

Referring to FIG. 53, the following will specifically explain that a distance from the objective lens to the focus is changed according to a change in the interval of the spherical aberration correction lens unit 15. FIG. 53 is a schematic diagram showing the influence of the interval of the spherical aberration correction lens upon a distance from the objective lens to the focus.

FIG. 53(*a*) shows that an optimum thickness is set between a surface of the disc to an information layer and no spherical aberration occurs on the information layer. Similarly FIG. 53(*b*) shows a large thickness. Additionally, FIG. 53(*b*) shows that the focus control system is normally operated and spherical aberration occurring on the information layer is corrected by the spherical aberration correction lens unit 15. FIG. 53(*c*) shows a small thickness. FIG. 53(*c*) shows that spherical aberration occurring on the information layer is corrected by the spherical aberration correction lens unit 15 as in FIG. 53(*b*).

As shown in FIG. 53(*b*), as a substrate is increased in thickness, an interval W of the spherical aberration correction lens unit 15 is reduced. Further, a distance Z from an objective lens 1 to the focus is increased. Further, as shown in FIG. 53(*c*), as the substrate is reduced in thickness, the interval W is increased and the distance Z is reduced. The distance Z is changed according to a change in the interval W of the spherical aberration correction lens unit 15. Namely, the change in the distance Z acts as disturbance to the focus control system.

In this way, a distance from the objective lens to the focus is changed according to an interval of the spherical aberration correction lens, and thus the disturbance has the same characteristic as the surface wobbling of an optical disc 20. The focus control system has to keep track of the disturbance. However, a frequency component of the disturbance that is higher than the band of the focus control system is just applied to a focus actuator 2 and increases the temperature of the focus actuator 2, so that tracking cannot be performed.

Hence, in the FE signal correcting section 30, a frequency component which is included in a change in the interval of the spherical aberration correction lens, is higher than the band of the focus control system, and is lower than the band of the spherical aberration control system is multiplied by a coefficient L and is added to an FE signal, so that the influence of a spherical aberration correction amount upon the FE signal is removed. Thus, the influence of an uneven thickness of the substrate of the optical disc can be removed from the focus control system, the uneven thickness affecting more than the band of the focus control system, and the heat of the focus actuator can be reduced.

An effective value detecting section 54 and an FE correction learning section 55 are blocks for determining the above coefficient L. The effective value detecting section 54 detects, from frequency components included in a corrected FE signal, an effective value of a component higher than the band of the focus control system and lower than the band of the spherical aberration control system, and outputs it. The FE correction learning section 55 leans a coefficient L at which the effective value detecting section 54 has the minimum output. Further, the microcomputer 8 sets the value of the coefficient L for the FE signal correcting section 30.

Figure 35:
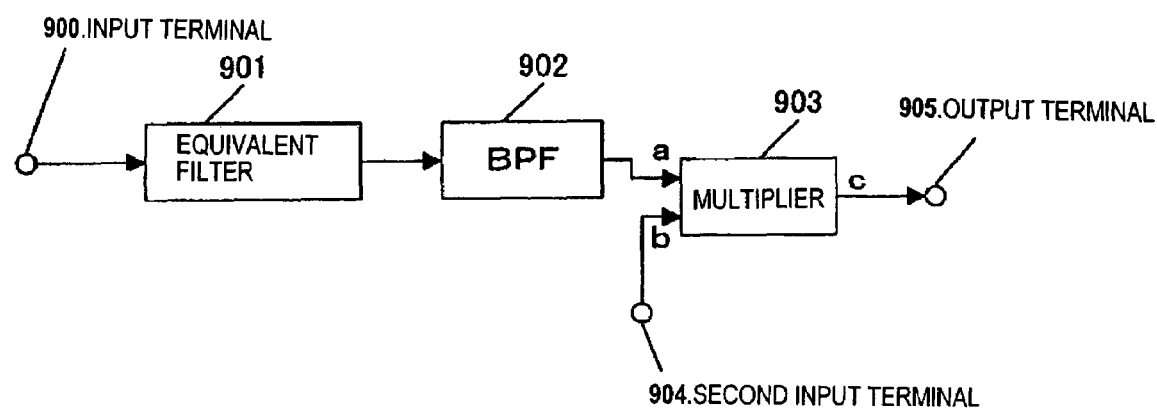
FIG. 35 is a block diagram showing an FE signal correcting section 30 of Embodiment 7.

Referring to FIG. 35, the FE signal correcting section 30 will be described in detail. FIG. 35 is a block diagram showing the FE signal correcting section 30. An input terminal 900 is connected to the output of the beam expander driving circuit 133. On a second input terminal 904, an output signal of the FE correction learning section 55 is connected via the microcomputer 8. A signal outputted from an output terminal 905 is added to an FE signal which is the output of the focus error signal generator 36.

A signal inputted to the input terminal 900 is transmitted to an equivalent filter 901. As described above, the equivalent filter 901 is a filter having the same characteristic as the spherical aberration correction actuator 34. The output of the equivalent filter 901 is transmitted to a band-pass filter 902. In the following explanation, the band-pass filter will be referred to as a BPF. As described above, the pass band of the BPF 902 is a frequency range which is higher than the band of the focus control system and is lower than the band of the spherical aberration control system. The output of the BPF 902 is transmitted to a multiplier 903. The multiplier 903 multiplies the signals of a terminal a and a terminal b and outputs the signals from a terminal c. The terminal c is sent to the output terminal 905. The terminal b is connected to the second input terminal 904.

Since the output of the beam-expander driving circuit 133 is connected to the input terminal 900, the output of the equivalent filter 901 indicates an interval of the spherical aberration correction lens. The BPF 902 extracts a frequency component which is included in a change in the interval of the spherical aberration correction lens, is higher than the band of the focus control system, and is lower than the band of the spherical aberration control system. An extracted signal and a predetermined value L, which is set by the FE correction learning section 55, are multiplied by the multiplier 903 and are outputted from the output terminal 905.

This operation will be described in accordance with FIG. 34. Additionally, it is assumed that an uneven thickness of the substrate is changed at a frequency higher than the band of the focus control system and a frequency lower than the band of the spherical aberration control system. FIG. 34(a) shows the uneven thickness of the substrate. FIG. 34(b) shows the output of the beam expander driving circuit 133, FIG. 34(c) shows the output of the equivalent filter 901, FIG. 34(d) shows the output of the BPF 902, and FIG. 34(e) shows the output of the FE signal correcting section 30, FIG. 34(f) shows the output of the focus error signal generator 36, and FIG. 34(g) shows an FE signal after correction. The vertical axis of FIG. 34(b) represents current, the vertical axes of the other waveforms represent voltage, and horizontal axes represent time.

Beam expander driving current has the waveform of FIG. 34(b) to follow a change in the thickness of the substrate of FIG. 34(a). Besides, the relationship between the driving current of the spherical aberration correction actuator 34 and the interval of the correction lens has a characteristic of a secondary oscillatory element. Therefore, at a higher frequency than each natural frequency, the interval of the correction lens relative to driving current has a phase lag of 180°. For this reason, the waveform of FIG. 34(a) and the waveform of FIG. 34(b) have a phase difference of 180°. When the driving signal of the beam expander in FIG. 34(b) is inputted to the equivalent filter 901 of FIG. 35, the output has the waveform of FIG. 34(c). Since a change in the thickness of the substrate has a frequency component lower than the band of the spherical aberration control system, the waveform of FIG. 34(a) and the waveform of FIG. 34(c) are coincident in phase with each other for the above reason.

Since a change in the thickness of the substrate has a frequency component within the pass band of the BPF 902, the output of the BPF 902 has the same waveform of FIG. 34(d) as that of the output of the equivalent filter 901. The output of the FE signal correcting section 30 has the waveform of FIG. 34(e) that is obtained by multiplying the output of the BPF 902 by a predetermined value.

Since a change in the thickness of the substrate has a frequency component higher than the band of the focus control system, the focus control system cannot keep track of the disturbance caused by a change in the interval of the spherical aberration correction lens. Therefore, the FE signal has the waveform of FIG. 34(f). The predetermined value L set for the second input terminal 904 is adjusted by the FE correction learning section 55, so that the output signal amplitude of the FE signal correcting section 30 is adjusted and the corrected FE signal has the waveform of FIG. 34(g) where an AC component is removed. Therefore, driving current caused by a change in the thickness of the substrate of FIG. 34 is not applied to the focus actuator 9.

Additionally, when spherical aberration control is not performed, the spherical aberration correction lens unit 15 is stopped and the influence on the FE signal is eliminated. Therefore, addition is stopped to the FE signal of the spherical aberration signal multiplied by a predetermined multiple by the FE signal correcting section 30. Thus, stable focus control can be performed.

The following will describe a method of determining the coefficient L. A predetermined uneven thickness is required to calculate the coefficient L. Namely, it is necessary to set an uneven thickness changing at a frequency higher than the band of the focus control system and a frequency lower than the band of the spherical aberration control system. However, in an actual disc, such an uneven thickness cannot be expected all the time. Thus, the interval of the spherical aberration correction lens is changed at a frequency higher than the band of the focus control system and a frequency lower than the band of the spherical aberration control system, so that a state equivalent to the presence of the predetermined uneven thickness can be obtained.

Figure 54:
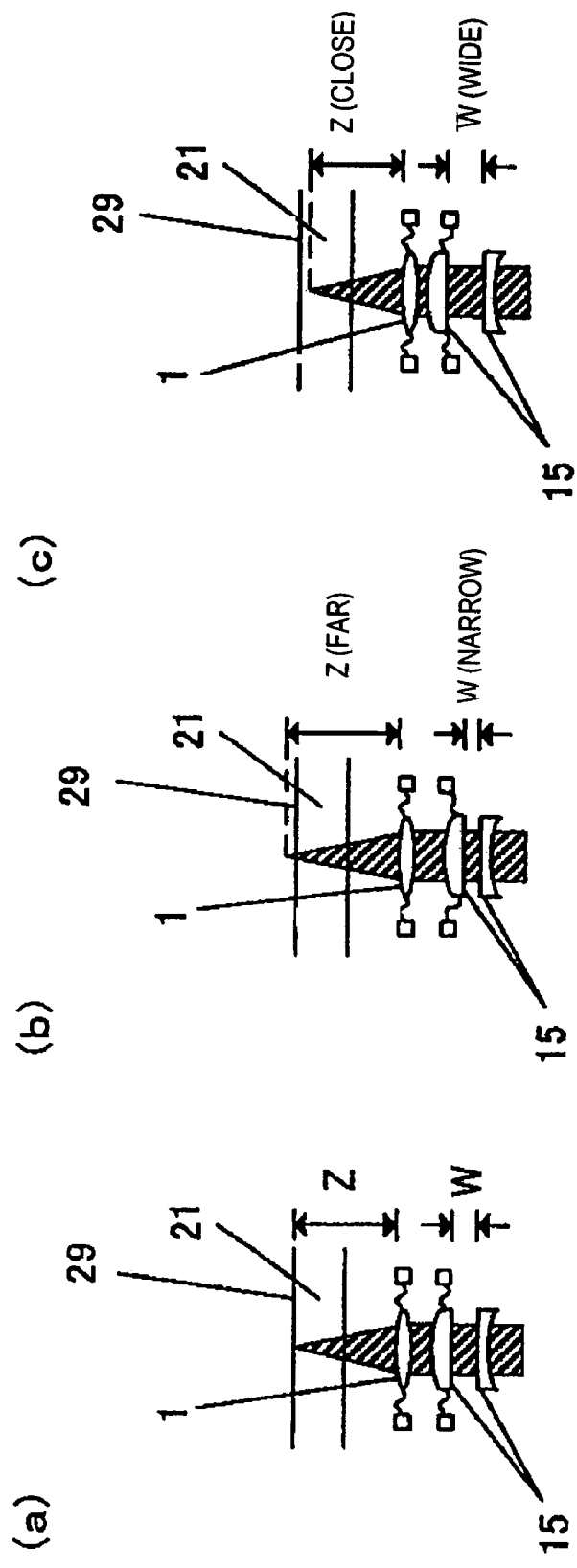
FIGS. 54(a) to 54(c) are schematic diagrams showing the influence of the position of the spherical aberration correction lens upon a distance from the objective lens to the focus.

Referring to FIG. 54, the following will describe a state in which the interval of the spherical aberration correction lens is changed at a frequency higher than the band of the focus control system and a frequency lower than the band of the spherical aberration control system. FIG. 54 is a schematic diagram showing the influence of the position of the spherical aberration correction lens upon a distance from the objective lens to the focus. FIG. 54 is identical to foregoing FIG. 53, except that the substrate of the optical disc has an even thickness in FIGS. 54(a) to 54(c).

FIG. 54(a) shows that an optimum thickness is set between the surface of the disc and the information layer and no spherical aberration occurs on the information layer. Similarly FIG. 54(b) shows an optimum state when the substrate originally has a large thickness. Further, FIG. 54(b) shows that the spherical aberration correction lens unit 15 is operated with a frequency component higher than the band of focus control and the focus control system does not normally perform tracking and spherical aberration occurring on the information layer is not corrected. FIG. 54(c) shows an optimum state when the substrate originally has a small thickness. As with FIG. 54(b), FIG. 54(c) shows that focus control on the information layer and spherical aberration occurring on the information layer are not corrected. As with FIG. 53, when the interval W of the spherical aberration correction lens unit 15 is reduced, the distance Z from the objective lens 1 to the focus is increased as shown in FIG. 54(b). Moreover, as shown in FIG. 54(c), as the interval W is increased, the distance Z is reduced.

The distance Z is changed by changing the interval W of the spherical aberration correction lens unit 15. Namely, a change in the distance Z acts as disturbance to the focus control system. A ratio of a change in Z to a change in the interval W of the spherical aberration correction lens unit 15 is almost equal to a radio of a change in Z to a change in the interval W of the spherical aberration correction lens unit 15 that is described in accordance with FIG. 53.

Additionally, the state in which the spherical aberration correction lens unit 15 is operated at a frequency higher than the band of focus control, the focus control system cannot normally perform tracking, and spherical aberration occurring on the information layer is not corrected is realized by changing an interval of the spherical aberration correction lens at a frequency higher than the band of the focus control system and a frequency lower than the band of the spherical aberration control system while the operation of the spherical aberration control system is stopped.

Figure 36:
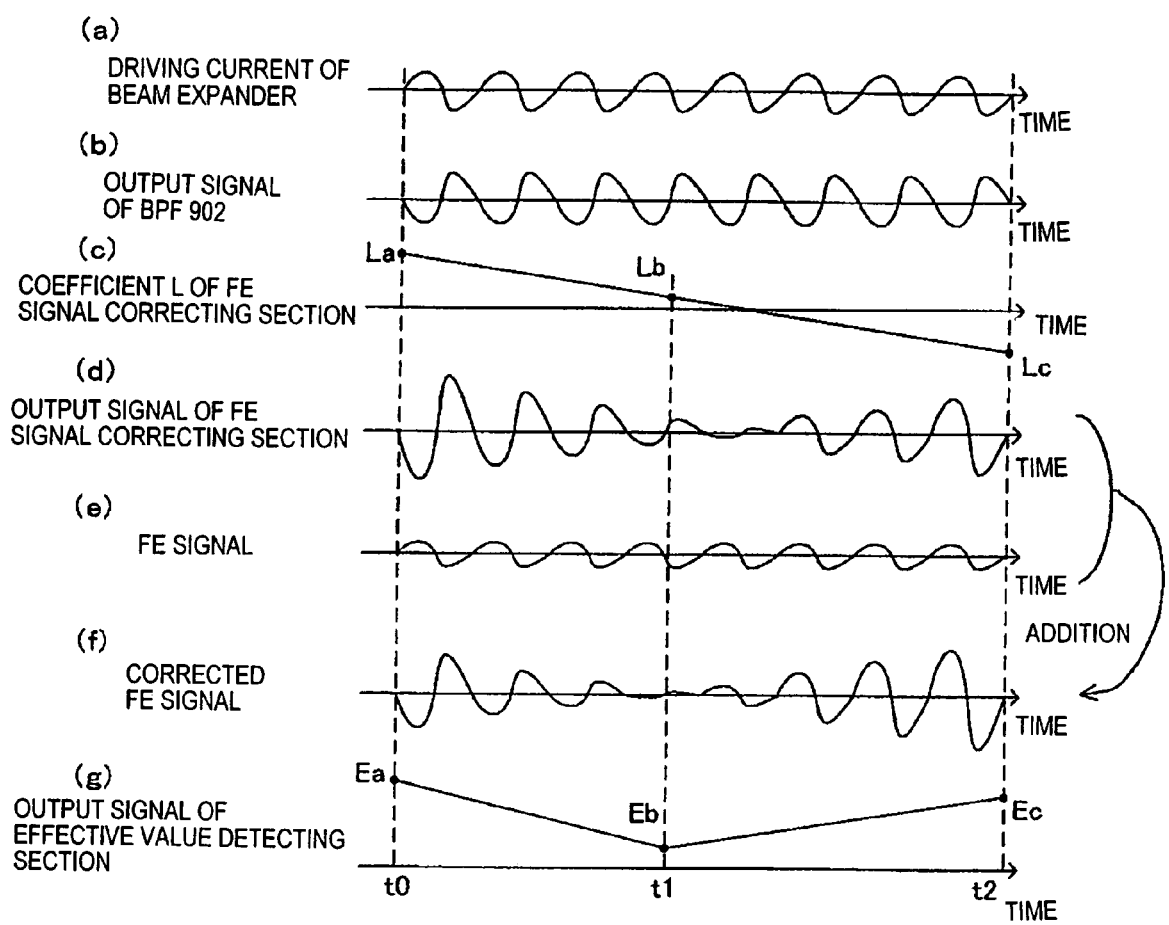
FIGS. 36(a) to 36(g) are waveform charts for explaining the learning of an FE signal correcting section according to Embodiment 7.

Therefore, it is possible to achieve a state equal to a state with the presence of a predetermined uneven thickness by changing an interval of the spherical aberration correction lens at a frequency higher than the band of the focus control system and a frequency lower than the band of the spherical aberration control system. This operation will be described in accordance with the waveform of FIG. 36. FIG. 36(a) shows the output of the beam expander driving circuit 133. Similarly FIG. 36(b) shows the output of the BPF 902 of the FE signal correcting section 30, FIG. 36(c) shows the coefficient L outputted by the FE correction learning section 55 to the FE signal correcting section 30, FIG. 36(d) shows the output of the FE signal correcting section 30, FIG. 36(e) shows the FE signal which is the output of the focus error signal generator 36, FIG. 36(f) shows the FE signal after correction, and FIG. 36(g) shows the output of the effective value detecting section 54. The vertical axis of FIG. 36(b) shows current. The vertical axes of the other waveforms represent voltages of the signals and the horizontal axes thereof represent time.

Besides, it is assumed that spherical aberration control is stopped during the learning of the predetermined value L, the driving signal of the beam expander is outputted according to the output signal of the spherical aberration test signal generator 53, and the frequency band of the signal has the same waveform as FIG. 34(a). Namely, the output signal of the test signal generator 53 is changed at a frequency higher than the band of the focus control system and a frequency lower than the band of the spherical aberration control system. The FE correction learning section 55 sets La as the coefficient L of the FE signal correcting section 30 at initial value time t0.

At this point, spherical aberration control is stopped and the beam expander driving circuit 133 operates according to the output signal of the spherical aberration test signal generator 53, so that the beam expander driving current has the waveform of FIG. 34(a). Therefore, the output of the BPF 902 of the FE signal correcting section 30 has the waveform of FIG. 34(b). The output of the FE signal correcting section 30 has a waveform obtained by multiplying the waveform of FIG. 34(b) by the coefficient La. Since the FE signal of FIG. 34(e) has a phase shift of 180° from the output of the FE signal correcting section 30 shown in FIG. 34(d), the corrected FE signal is a signal of large amplitude as shown in FIG. 34(f). In this state, the output of the effective value detecting section 54 is Ea shown in FIG. 34(g).

The FE correction learning section 55 measures the level of the effective value detecting section 54 while gradually changing the coefficient L of the FE signal correcting section 30 via the microcomputer 8. The time t1 has a coefficient Lb and the time t2 has a coefficient Lc. In FIG. 36, the effective value detecting section 54 does not have the minimum output level at the coefficients La and Lc but has the minimum level when the coefficient L is Lb.

Therefore, as shown in FIG. 34(g), the effective value detecting section 54 has the minimum output level at the time t1 at which the coefficient Lb is set. Namely, the corrected FE signal has the minimum amplitude at the coefficient Lb. Thus, the FE learning correcting section 55 sets Lb as the optimum coefficient L of the FE signal correcting section 30. Besides, as described in FIGS. 53 and 54, the coefficient Lb similarly operates when the spherical aberration correction lens unit 15 is actually moved according to a thickness of the substrate of the disc by the spherical aberration control.

Figure 37:
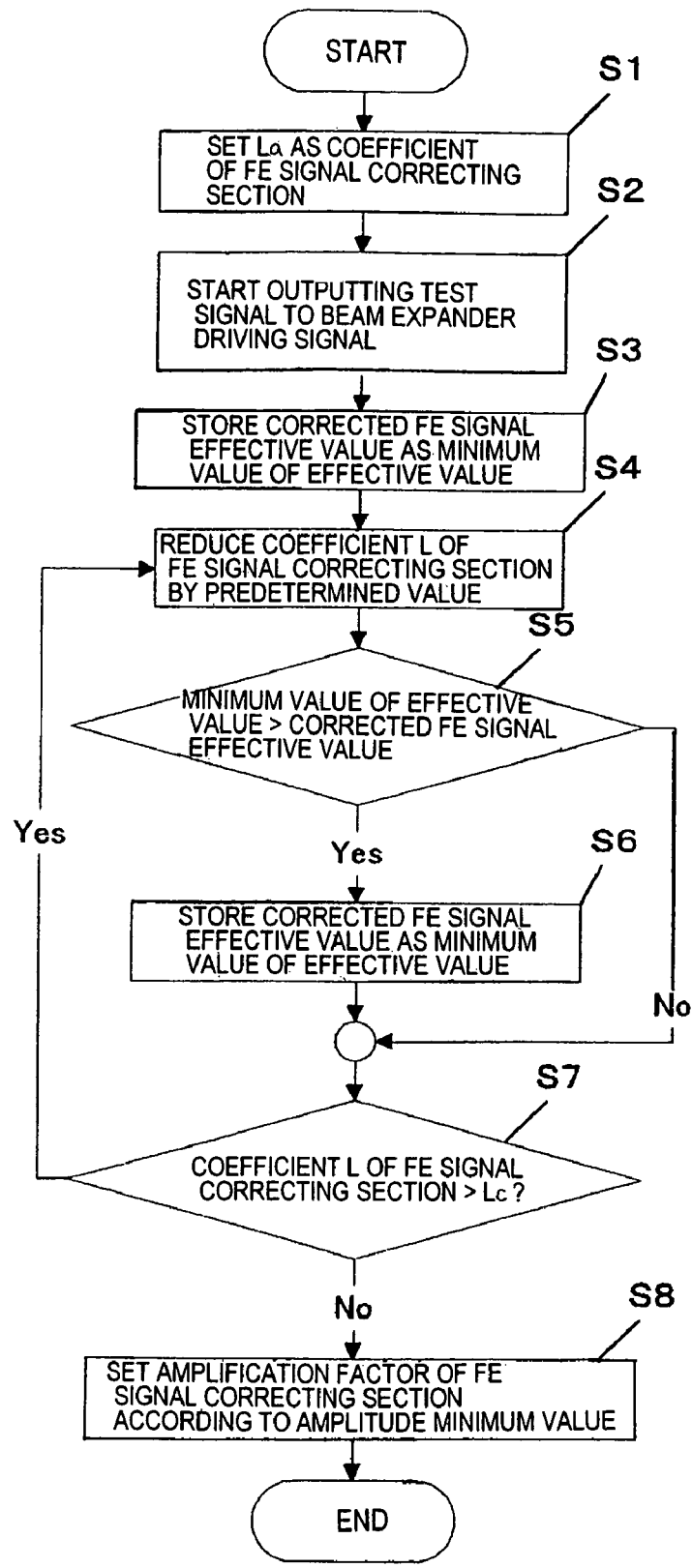
FIG. 37 is a flowchart showing the learning sequence of the FE signal correcting section according to Embodiment 7.

Referring to the flowchart of FIG. 37, an operation for determining the coefficient L of the FE signal correcting section 30 will be described below. First, FE correction learning section 55 sets the initial value La as a coefficient of the FE signal correcting section 30 via the microcomputer 8 in step S1. In step S2, the spherical aberration test signal generator 53 starts adding a test signal to the beam expander driving signal of the spherical aberration control section 135 when focus control is performed and spherical aberration control is not performed. In step S3, the effective value of the FE signal corrected by the FE signal correcting section 30 is obtained from the effective value detecting section 54 and is stored as the minimum value of the effective value. In step S4, a predetermined value is subtracted from the coefficient L of the FE signal correcting section 30.

In step S5, a comparison is performed to decide whether or not the effective value of the corrected FE signal that is detected by the effective value detecting section 54 is smaller than the minimum value of the stored effective value. When the effective value of the corrected FE signal is smaller than the minimum value of the stored effective value, the effective value of the corrected FE signal is newly stored as the minimum value of the effective value in step S6 and the operation proceeds to step S7. When the effective value of the corrected FE signal is not smaller than the minimum value of the stored effective value, the operation proceeds to step S7. In step S7, a comparison is performed to decide whether or not the coefficient L of the FE signal correcting section 30 is larger than Lc. When the coefficient L is larger, the operation returns to step S4. When the coefficient L is not larger, the operation proceeds to step S8. In step S8, the coefficient L of the FE signal correcting section 30 is set which correspond to the minimum value of the stored effective value, and the operation is completed.

Further, the gain compensation of the focus control section 17 or the spherical aberration control section 135 is adjusted while the focus control and the spherical aberration control are performed, so that it is possible to make an adjustment including a gain characteristic of a displacement caused by the interference of the focus control and the spherical aberration control, achieving an adjustment with a higher accuracy.

Embodiment 8

Figure 38:
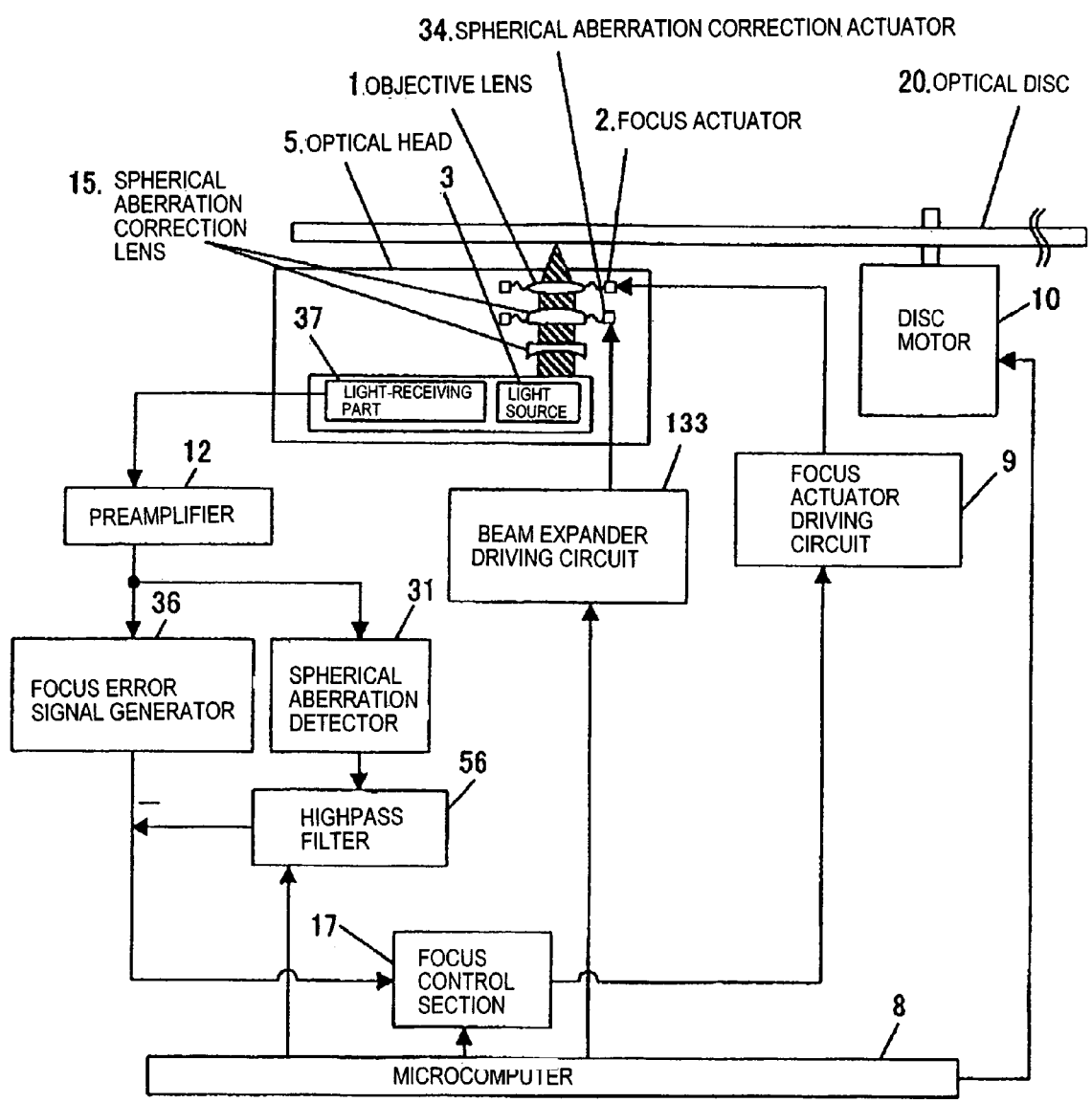
FIG. 38 is a block diagram showing the configuration of an optical disc device according to Embodiment 8 of the present invention.
Figure 39:
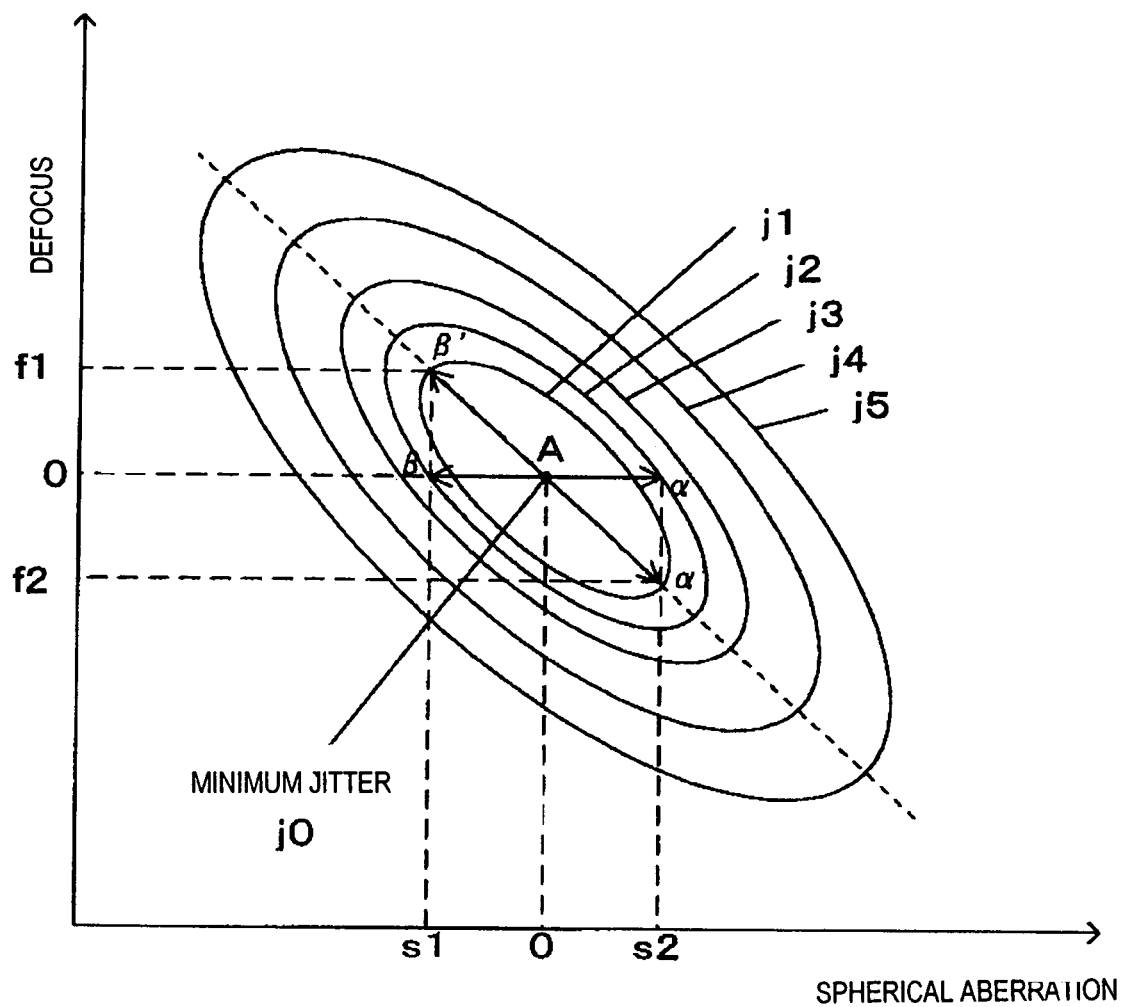
FIG. 39 is a characteristic diagram for explaining jitter relative to spherical aberration and focus offset.

FIG. 38 is a block diagram showing the configuration of an optical disc device according to Embodiment 8. FIG. 39 is a characteristic diagram for explaining jitter on spherical aberration and focus offset. In these drawings, the same members and components as those of the conventional art and Embodiment 6 are indicated by the same reference numerals and the explanation thereof is omitted. Moreover, as Embodiment 6, focus control is performed based on a focus error signal which is an added signal of an outer peripheral focus error signal and an inner peripheral focus error signal, and a spherical aberration signal is generated by a difference signal of the outer peripheral focus error signal and the inner peripheral focus error signal.

A highpass filter 56 retrieves an AC component equal to or higher than the rotational frequency of a disc motor 10 that is included in a spherical aberration signal.

An optical disc 20 locally has an uneven thickness, which causes high-frequency spherical aberration during recording and reproduction. Thus, when the band of a spherical aberration control system is the DC of the optical disc, spherical aberration remains due to the local uneven thickness. The spherical aberration increases, for example, jitter on a reproduction signal.

According to the present invention, the influence of spherical aberration remaining as increased jitter or the like of the reproduction signal is reduced by changing a target position of a focus control system, that is, performing defocusing on purpose. The influence of spherical aberration having a small effective value of about 20 mλrms can be reduced by defocus of about 0.1 μm. When the control band of the focus control system is higher than the control band of the spherical aberration control system, it is possible to reduce the influence of high-frequency spherical aberration which cannot be followed by the spherical aberration control system.

Referring to FIG. 38, the following will firstly describe spherical aberration correction. A microcomputer 8 outputs a driving signal of a predetermined value to a beam expander driving circuit 133. The beam expander driving circuit 133 drives a spherical aberration correction lens unit 15 according to the driving signal by using the spherical aberration correction actuator 34, so that correction is performed on a DC component of spherical aberration on a light beam spot formed on the information layer of the optical disc 20.

A highpass filter 56 extracts a high-frequency component of a spherical aberration detection signal which is the output of a spherical aberration detector 31. The extracted signal is multiplied by M and the result is added to an FE signal which is the output of a focus error signal generator 36. The extracted component has a higher frequency than the control band of the spherical aberration control system. In the present embodiment, since the control band of the spherical aberration control system is DC, the highpass filter 56 removes the DC component and outputs the result.

In the AC band, a target position of the focus control system is changed according to the spherical aberration detection signal, that is, defocus occurs in the focus control system.

Referring to FIG. 39, the following will describe a typical relationship among remaining spherical aberration, defocus, and jitter. The y axis represents defocus, the x axis represents spherical aberration, and contour lines represent jitter in FIG. 39. The innermost contour line represents jitter j1 and the following contour lines represent jitter j2, jitter j3, jitter j4, and jitter j5 from the inside to the outside. Besides, the relationship of j1<j2<j3<j4<j5 is established.

When defocus is 0 and spherical aberration is 0, that is, at point A, the best performance to read information on the optical disc 20 is achieved. Namely the jitter indicating the reading capability has the minimum value j0. However, the optical disc 20 actually has an uneven thickness of a high frequency in one rotation. Thus, high-frequency spherical aberration occurs accordingly. Occurring spherical aberration will be referred to as s1 and s2. Therefore, spherical aberration occurs between point a and point β, increasing jitter. Additionally, the point a has spherical aberration of s2 and the point β has spherical aberration of s1. Jitter varies within a range from j0 to j2. However, when defocus is changed according to spherical aberration, jitter varies within a range from j0 to j1. Namely when defocus is set at f1 at the point α and defocus is set at f2 at the point β, jitter is set at j1. Therefore, jitter is reduced by defocusing according to spherical aberration. Hence, a coefficient M of the above highpass filter 56 is expressed by the equation below.

$$M=(f2-f1)/(s2-s1)$$

Figure 40:
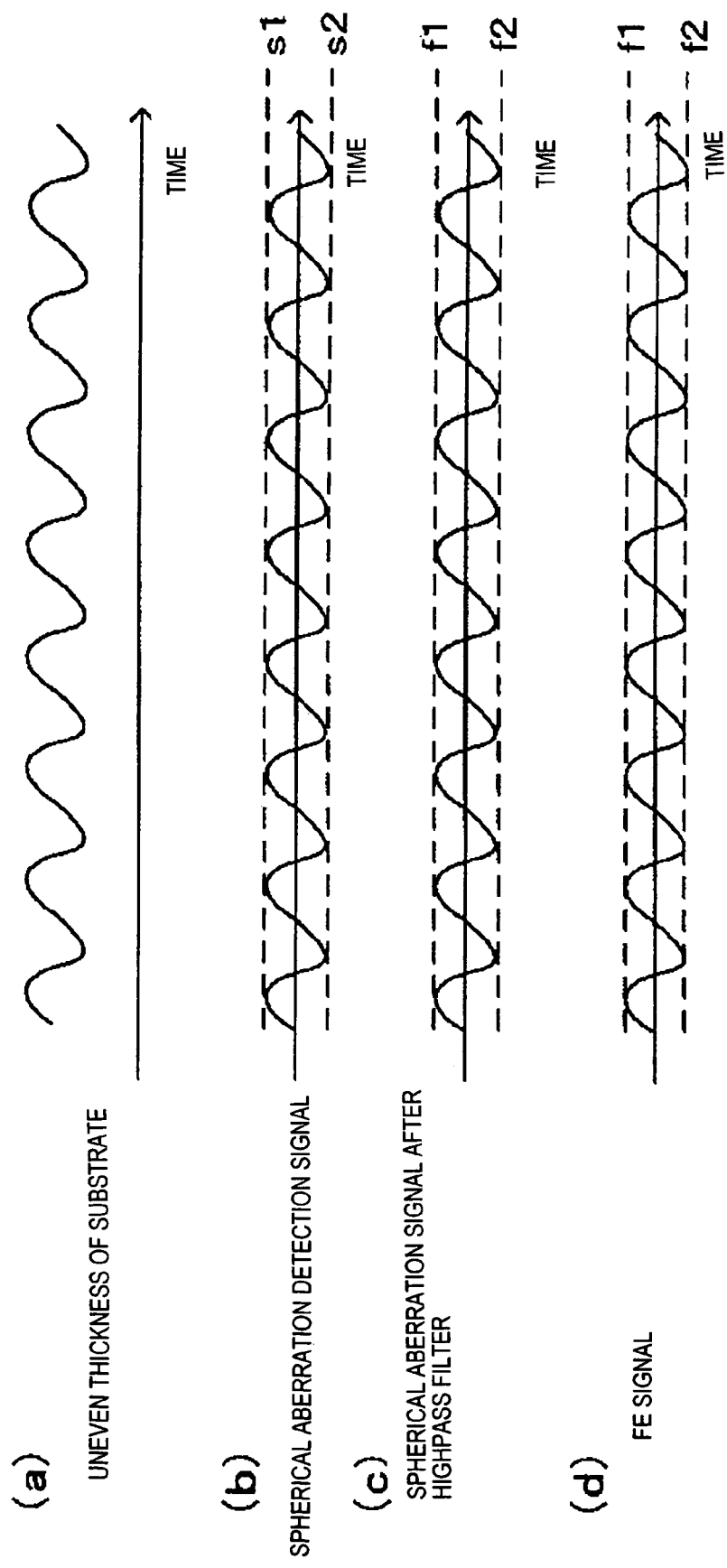
FIGS. 40(a) to 40(d) are waveform charts for explaining a method of correcting the influence of remaining spherical aberration by defocusing according to Embodiment 8.

Referring to FIG. 40, the following will describe a method of correcting the influence of remaining spherical aberration by defocusing. FIG. 40 shows that spherical aberration of the DC component is corrected, the spherical aberration being caused by an uneven thickness of the substrate. The waveform of FIG. 40(a) indicates the uneven thickness of a substrate. FIG. 40(b) indicates the output of the spherical aberration detector 31. FIG. 40(c) indicates the output of the highpass filter 56. FIG. 40(d) indicates the output of the focus error signal generator 36. A vertical axis represents voltages of the signals and a horizontal axis represents time.

As shown in FIG. 40(a), the uneven thickness of the substrate has a local uneven thickness of an AC component and uneven thickness of a DC component on the optical disc 20. Since the microcomputer 8 corrects spherical aberration of a DC component by controlling the spherical aberration correction actuator 34, the spherical aberration detection signal has only an AC component and is provided as a signal shown in FIG. 40(b). Besides, s1 and s2 correspond to s1 and s2 of FIG. 39. The highpass filter 56 acquires the AC component of FIG. 40(b) from the spherical aberration detection signal and multiplies the AC component by M. Therefore, the highpass filter 56 has the output of FIG. 40(c). Additionally, f1 and f2 correspond to f1 and f2 of FIG. 39. The output signal of the highpass filter 56 is subtracted from the FE signal and the focus control system is operated so as to set the subtracted signal at 0. Thus, the FE signal has the waveform of FIG. 40(d). Therefore, defocus occurs according to spherical aberration and an increase in jitter is suppressed.

Embodiment 9

Figure 41:
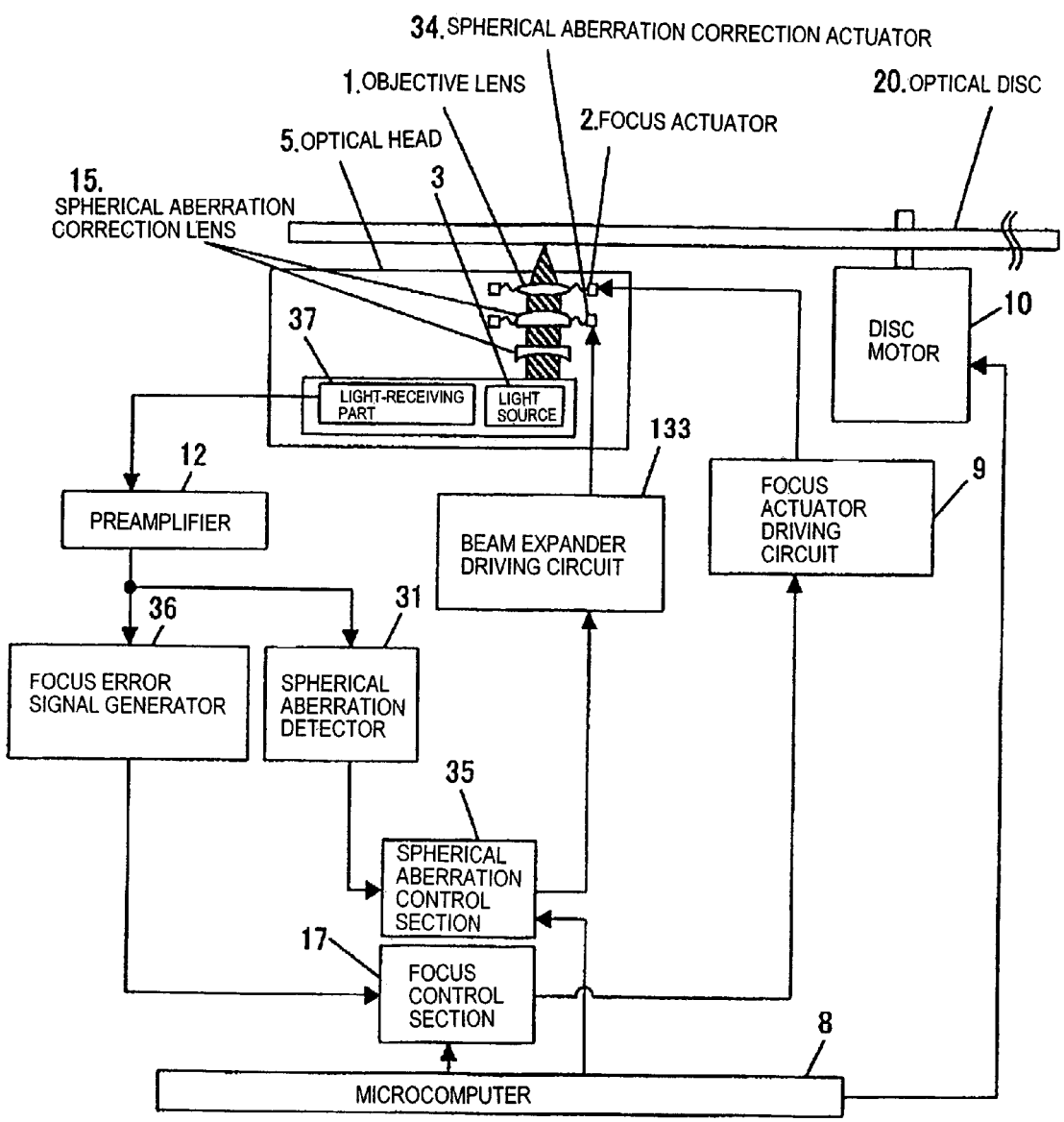
FIG. 41 is a block diagram showing the configuration of an optical disc device according to Embodiment 9 of the present invention.

FIG. 41 is a block diagram showing the configuration of an optical disc device according to Embodiment 9. In these drawings, the same members and components as those of the conventional art and Embodiment 6 are indicated by the same reference numerals and the explanation thereof is omitted. Further, as Embodiment 6, focus control is performed based on a focus error signal which is an added signal of an outer peripheral focus error signal and an inner peripheral focus error signal, and a spherical aberration detection signal is generated based on a difference signal of the outer peripheral focus error signal and the inner peripheral focus error signal.

In the present embodiment, the position of an objective lens 1 is controlled so that an FE signal serving as the output of a focus generator 36 is set at 0. Moreover, the interval of a spherical aberration correction lens unit 15 is controlled so that a spherical aberration detection signal serving as the output of a spherical aberration detector 31 is set at 0. The present embodiment does not have a block shown in Embodiment 6 for correcting a spherical aberration detection signal based on an FE signal.

Figure 43:
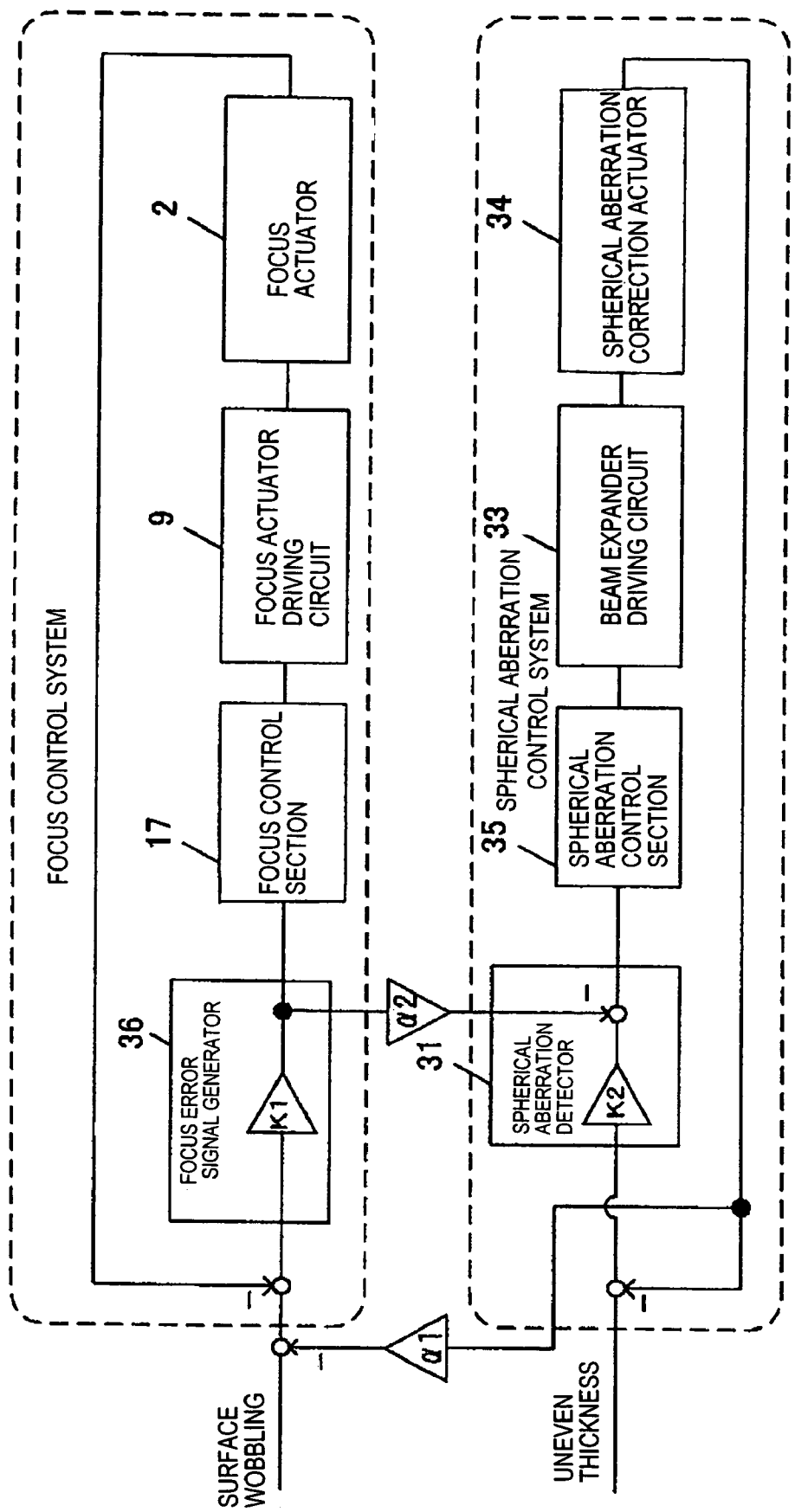
FIG. 43 is a block diagram for explaining the control band and the influence of interference according to Embodiment 9.

Referring to the block diagram of FIG. 43, the following will describe the mutual interference of focus control and spherical aberration control. FIG. 43 is a block diagram for explaining the influence of control band and the influence of interference according to Embodiment 9. In these drawings, the same members and components as those of the conventional art and Embodiment 6 are indicated by the same reference numerals and the explanation thereof is omitted. A system of α1 indicates the interference of a spherical aberration control system with a focus control system. α1 indicates a ratio of a distance between an objective lens and a focus to a beam expander driving value. A system of α2 indicates the interference of the focus control system with the spherical aberration control system. α2 indicates a ratio of an error of a spherical aberration detection signal to defocus. K1 indicates the detectivity of the focus error signal generator 36. K2 indicates the detectivity of the spherical aberration detector 31.

As described in Embodiment 6, focus control and spherical aberration control interfere with each other. To be specific, when a defocus amount is f3, a detecting error corresponding to defocus is K1×α2×f3. Further, when a spherical aberration correction amount is b1, a distance from the objective lens to the focus is changed to α1×b1 and turns into disturbance to the focus control system. Embodiment 6 described the configuration for removing a detecting error of a spherical aberration detection signal occurring according to defocus. In the present embodiment, by setting the control band of focus control at ten times or larger than the band of spherical aberration control, stable focus control and spherical aberration control can be achieved even in the event of a detecting error of the spherical aberration detection signal occurring according to defocus.

FIGS. 42A to 42D are characteristic diagrams for explaining the control bands and the influence of interference according to Embodiment 9. FIGS. 44A to 44D are characteristic diagrams for explaining the characteristics of a control section, a driving circuit, and an actuator according to Embodiment 9. Hereinafter, the characteristics will be described as examples in accordance with these drawings.

Figure 44A:
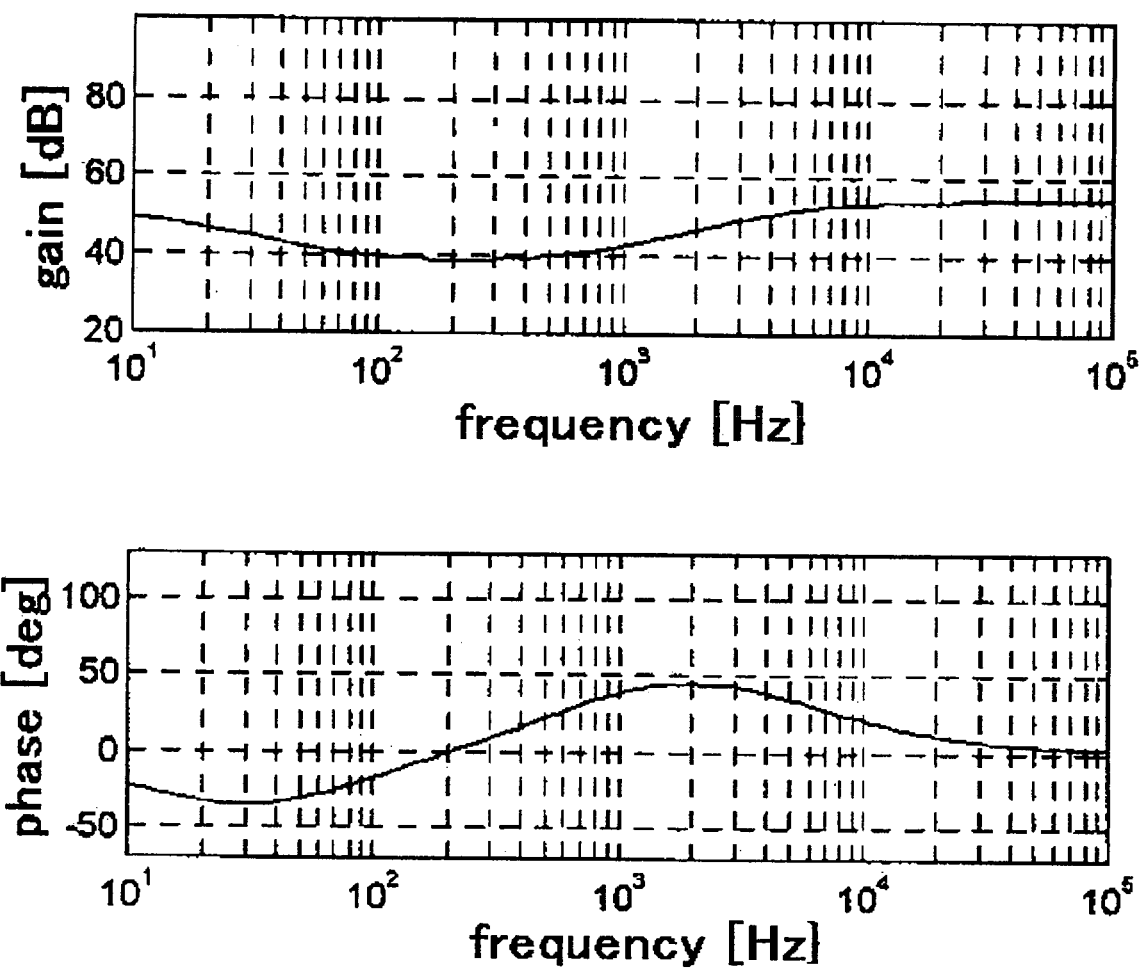
FIGS. 44A to 44D are characteristic diagrams for explaining the characteristics of a control section, a driving circuit, and an actuator according to Embodiment 9.
Figure 44B:
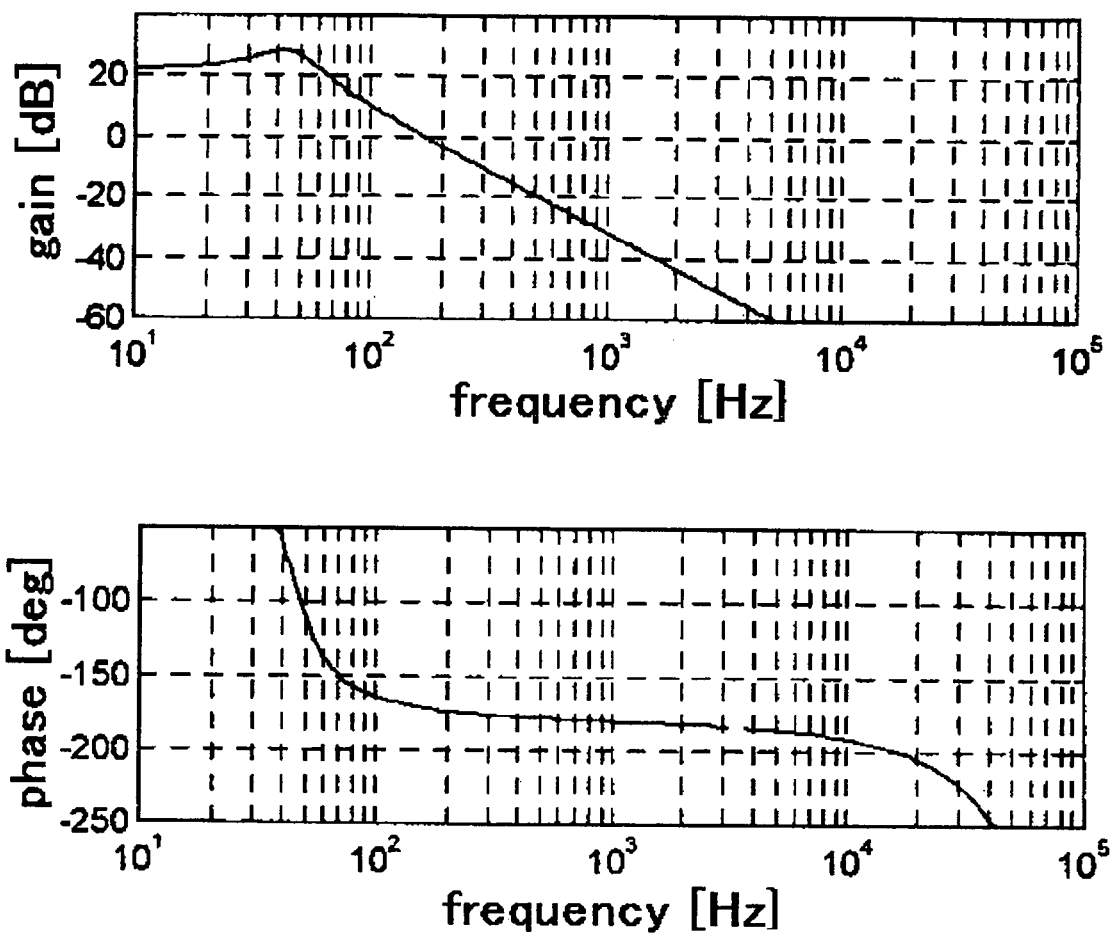
Figure 44C:
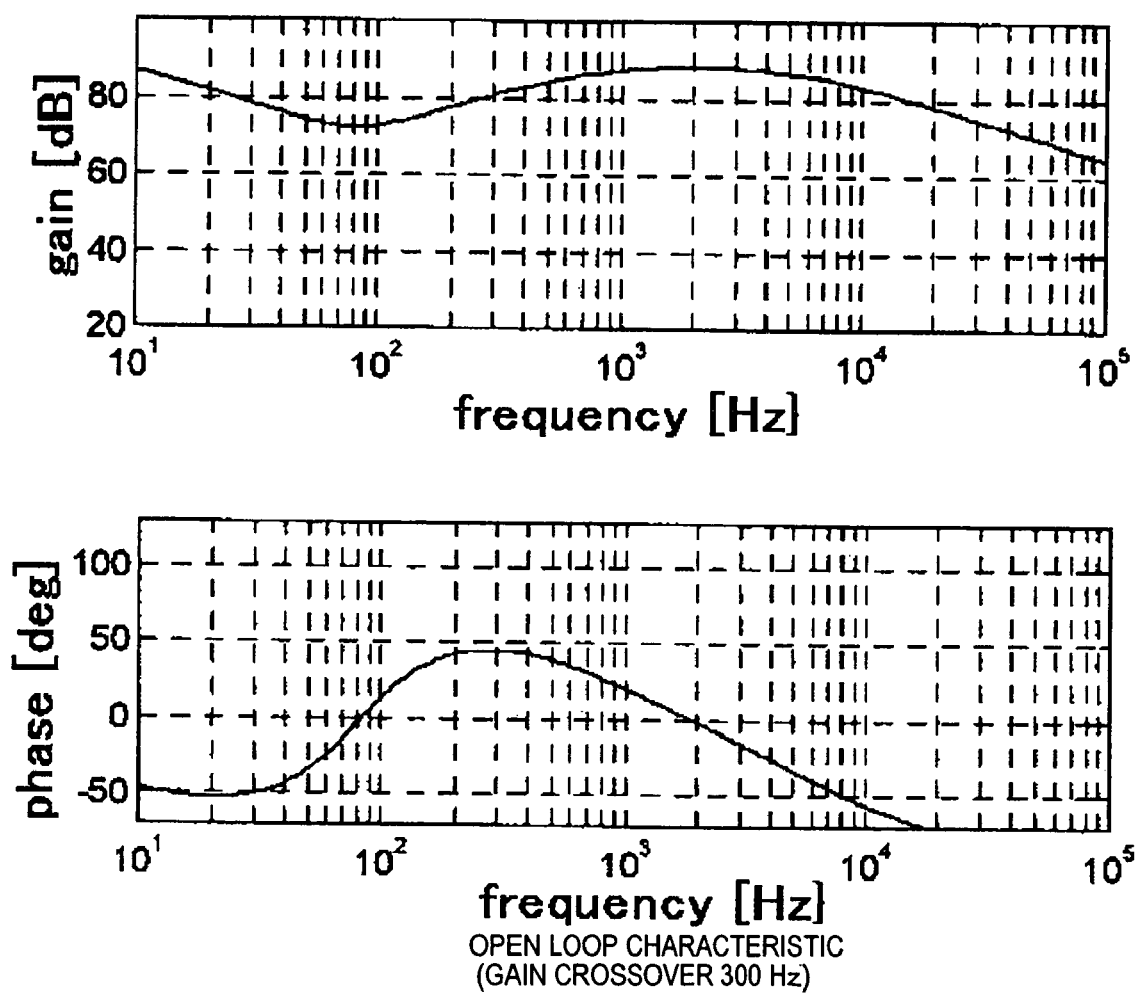
Figure 44D:
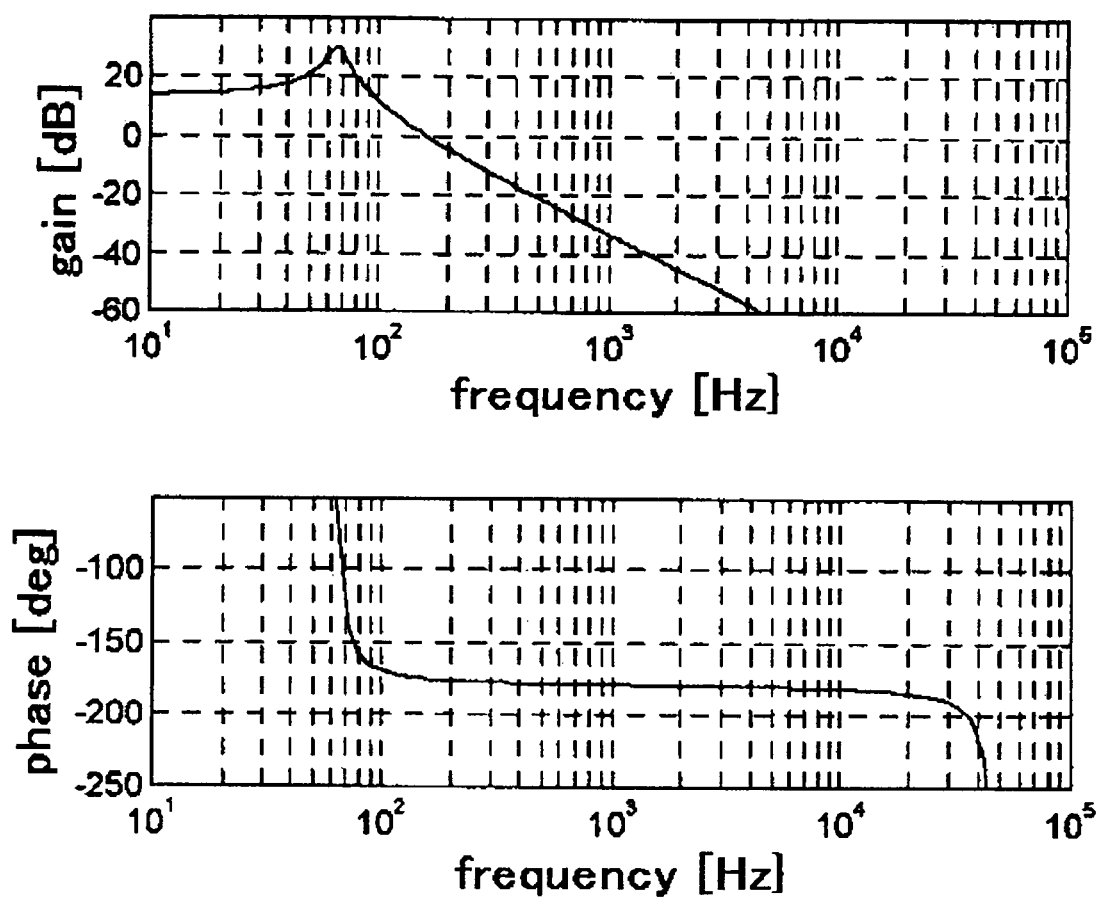

Referring to FIGS. 44A to 44D, the characteristics of the control section, the driving circuit, and the actuator will be firstly discussed. FIG. 44A shows a characteristic from a focus control section 17 to a focus actuator driving circuit 9. FIG. 44B shows the characteristic of a focus actuator 2. FIG. 44C shows a characteristic from a spherical aberration control section 135 to a beam expander driving circuit 133. FIG. 44D shows the characteristic of a spherical aberration correction actuator 34. The upper diagrams show gain characteristics. A vertical axis represents gain and a horizontal axis represents a frequency. The lower diagrams show phase characteristics. A vertical axis represents a phase and a horizontal axis represents a frequency.

As shown in FIG. 44A, the phase compensation of focus control is performed in the focus control section 17. A phase of 2 KHz which is the gain crossover of the focus is increased by about 45 degrees. As shown in FIG. 44B, the focus actuator 2 has a primary resonance frequency of about 46 Hz, and the band equal to or higher than the primary resonance frequency has inclination of −40 dB/dec. As shown in FIG. 44C, the phase compensation of spherical aberration control is similarly performed in the spherical aberration control section 135, and a phase of 300 Hz which is the gain crossover of spherical aberration control is increased by about 45 degrees. As shown in FIG. 44D, the spherical aberration correction actuator 34 has a primary resonance frequency of about 66 Hz, and the band equal to or higher than the primary resonance frequency has inclination of −40 dB/dec.

Referring to FIG. 42, the mutual interference of focus control and spherical aberration control will be described. FIG. 42A shows an open loop characteristic of the focus affected by interference of the 2 KHz control band of the focus and the 300 Hz control band of spherical aberration correction. Similarly FIG. 42B shows an open loop characteristic of spherical aberration control. FIG. 42C shows an open loop characteristic of a focus affected by interference of the 5 KHz control band of the focus and the 300 Hz control band of spherical aberration correction. Similarly FIG. 42D shows an open loop characteristic of spherical aberration control. The upper diagrams show gain characteristics. Vertical axes represent gain and horizontal axes represent frequencies. The lower diagrams show phase characteristics. Vertical axes represent phases and horizontal axes represent frequencies.

Figure 42A:
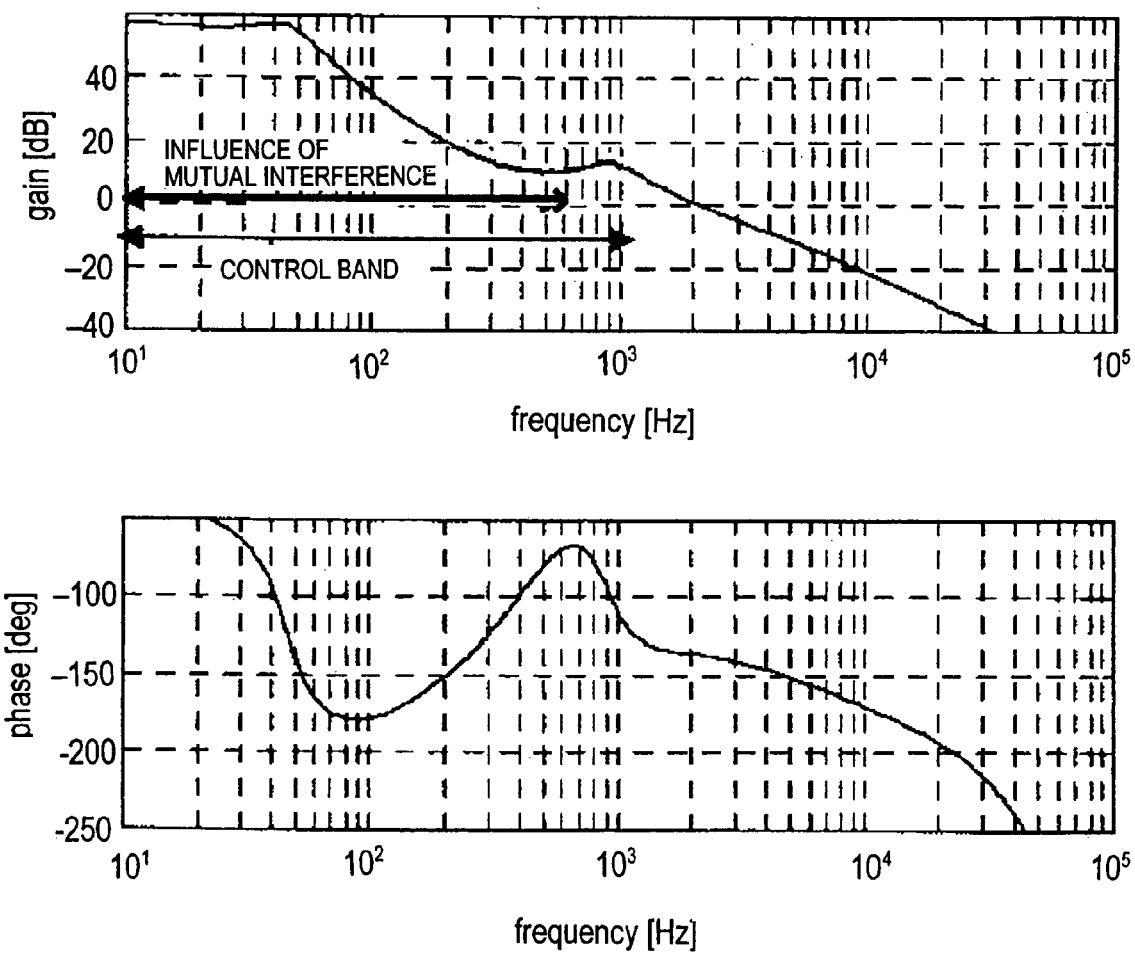
FIGS. 42A to 42D are characteristic diagrams for explaining a control band and the influence of interference according to Embodiment 9.
Figure 42B:
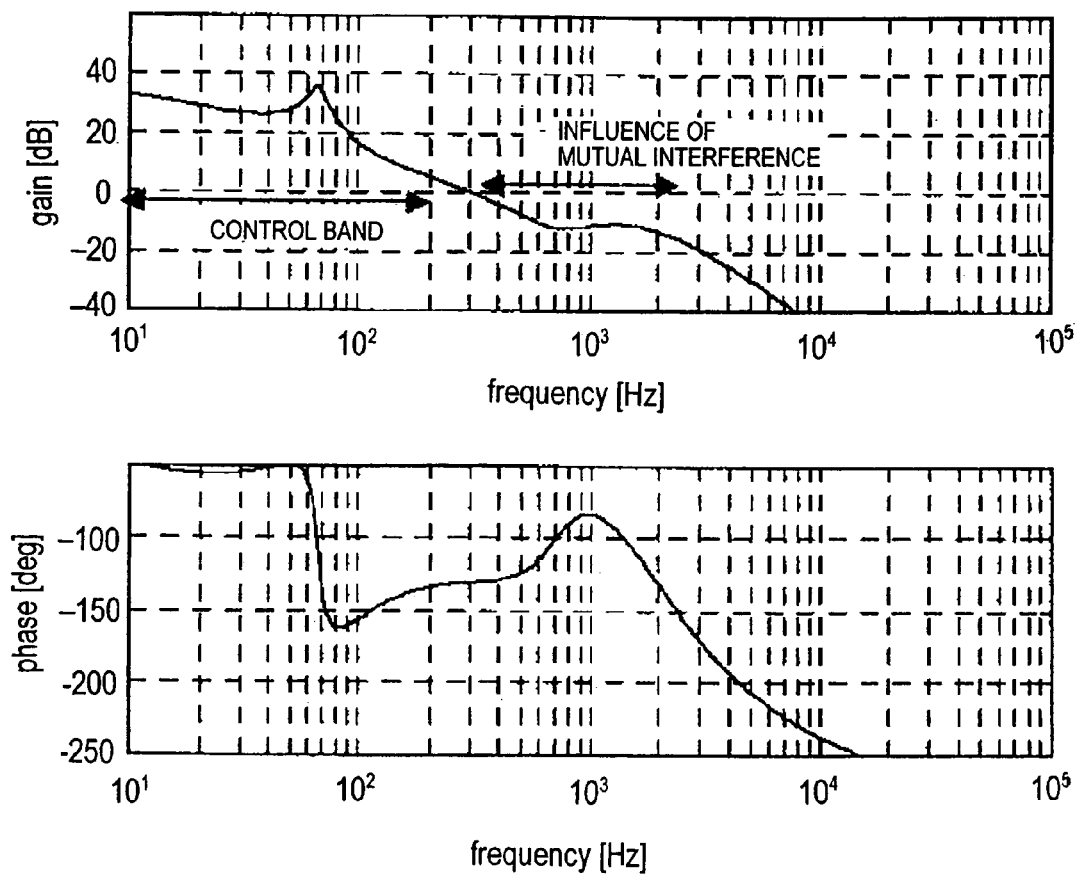
Figure 42C:
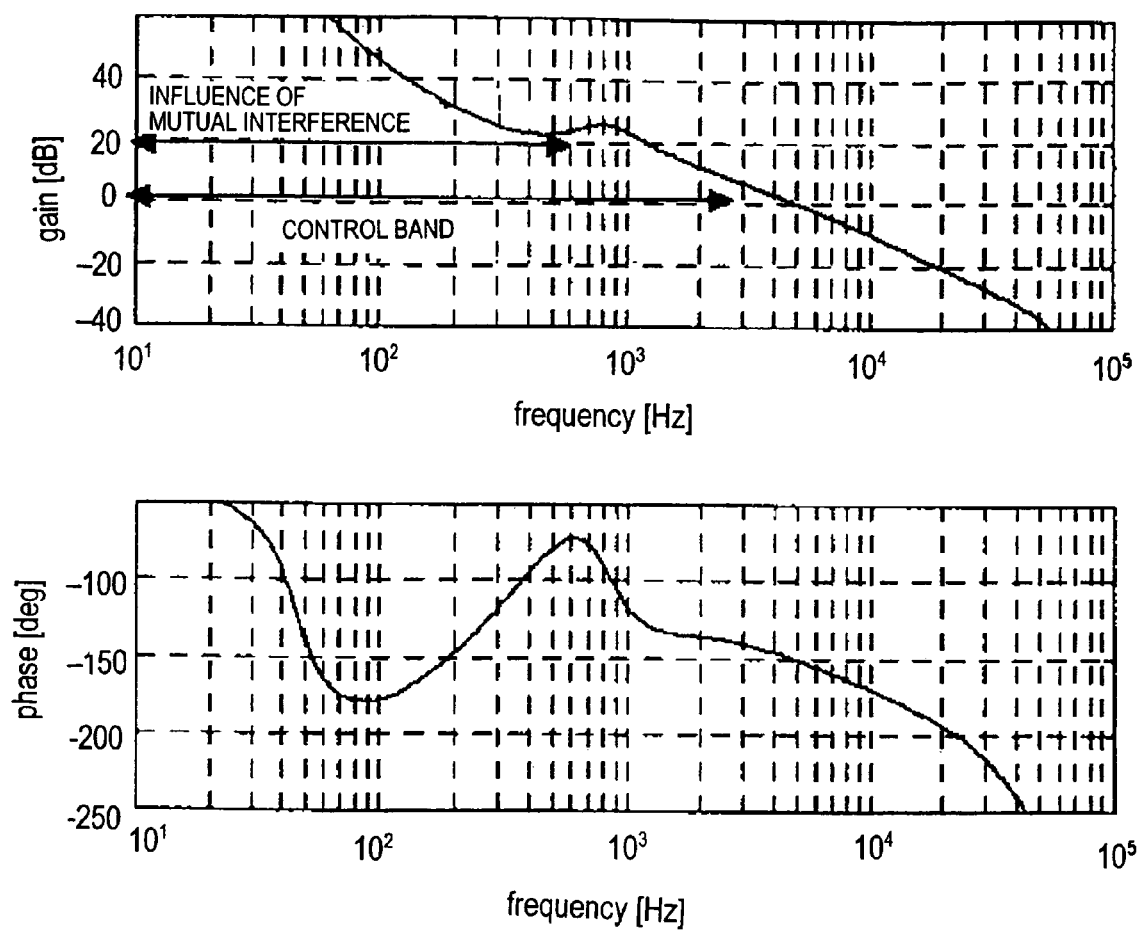
Figure 42D:
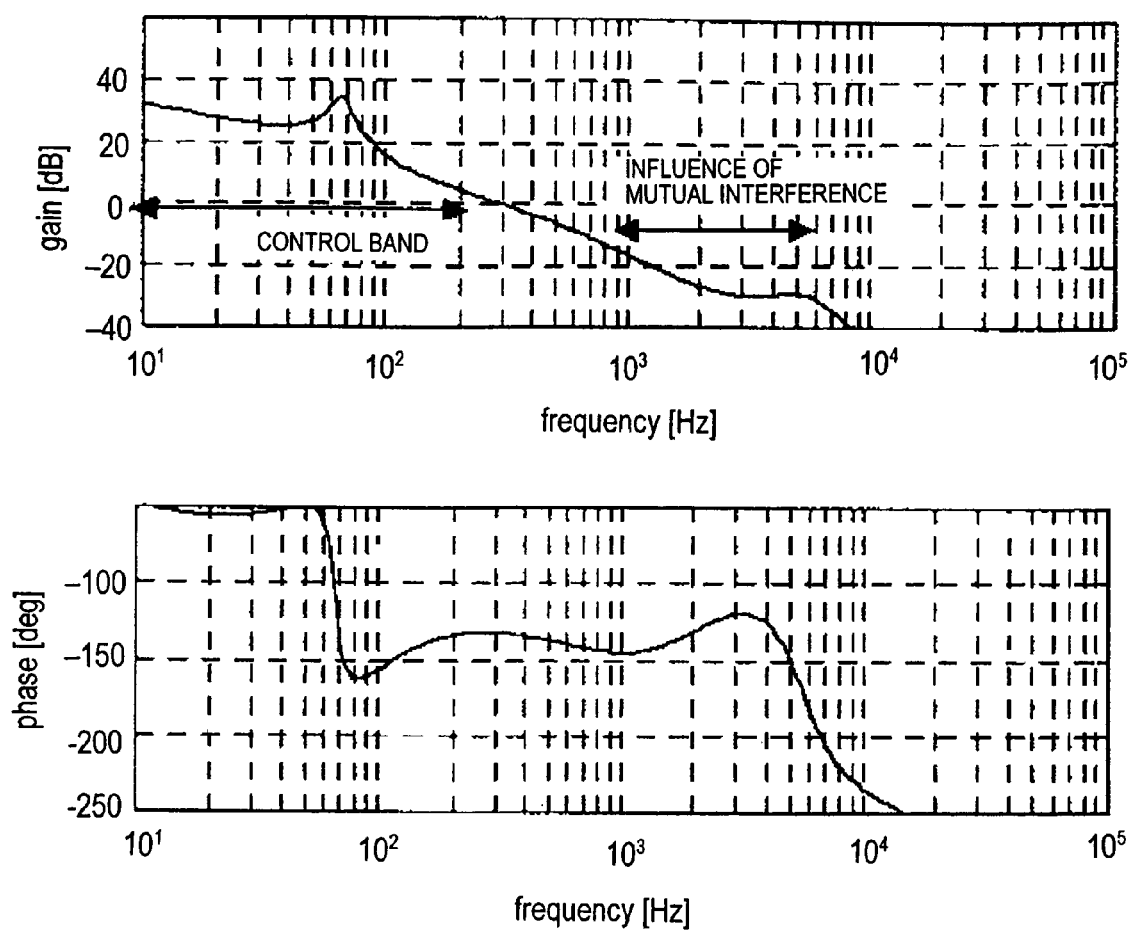

As shown in FIGS. 42A and 42C, the control band of the focus is increased from 2 KHz (FIG. 42A) to 5 KHz (FIG. 42C) and is separated from the 300 Hz control band of spherical aberration correction, so that a frequency band affected by interference can be sufficiently higher than the control band of spherical aberration control. To be specific, a rise in gain from a frequency of about 50 Hz to 4 KHz (FIG. 42B) is shifted to about 1.3 to 11 KHz. As shown in FIG. 42D, when the rising range of gain is close to the control band, the gain rises to around 0 dB, so that oscillation is likely to occur due to some changes in gain and the influence of disturbance. However, as shown in FIG. 42D, when the rising range of gain is far from the control band, a rise in gain is sufficiently lower than 0 dB, stabilizing the control system. Further, also when the control band of spherical aberration control is reduced from 300 Hz, it is possible to eliminate the influence of interference from the control band of the focus. As described above, by setting the control band of focus control at ten times or larger than the band of spherical aberration control, it is possible to reduce the interference of the focus control system and the spherical aberration control system, achieving stable focus control and spherical aberration control.

Embodiment 10

Figure 45:
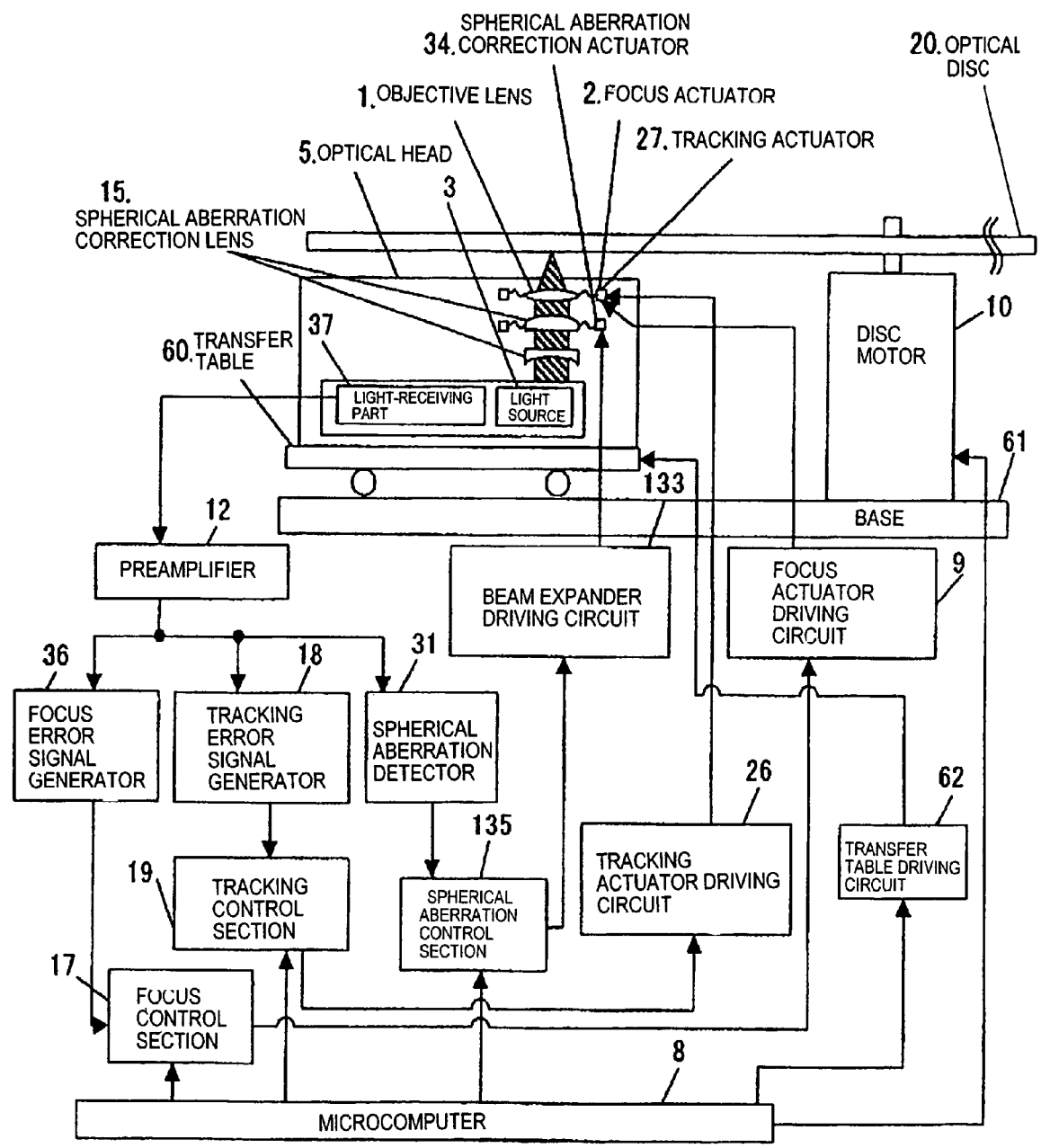
FIG. 45 is a block diagram showing the configuration of an optical disc device according to Embodiment 10 of the present invention.
Figure 46:
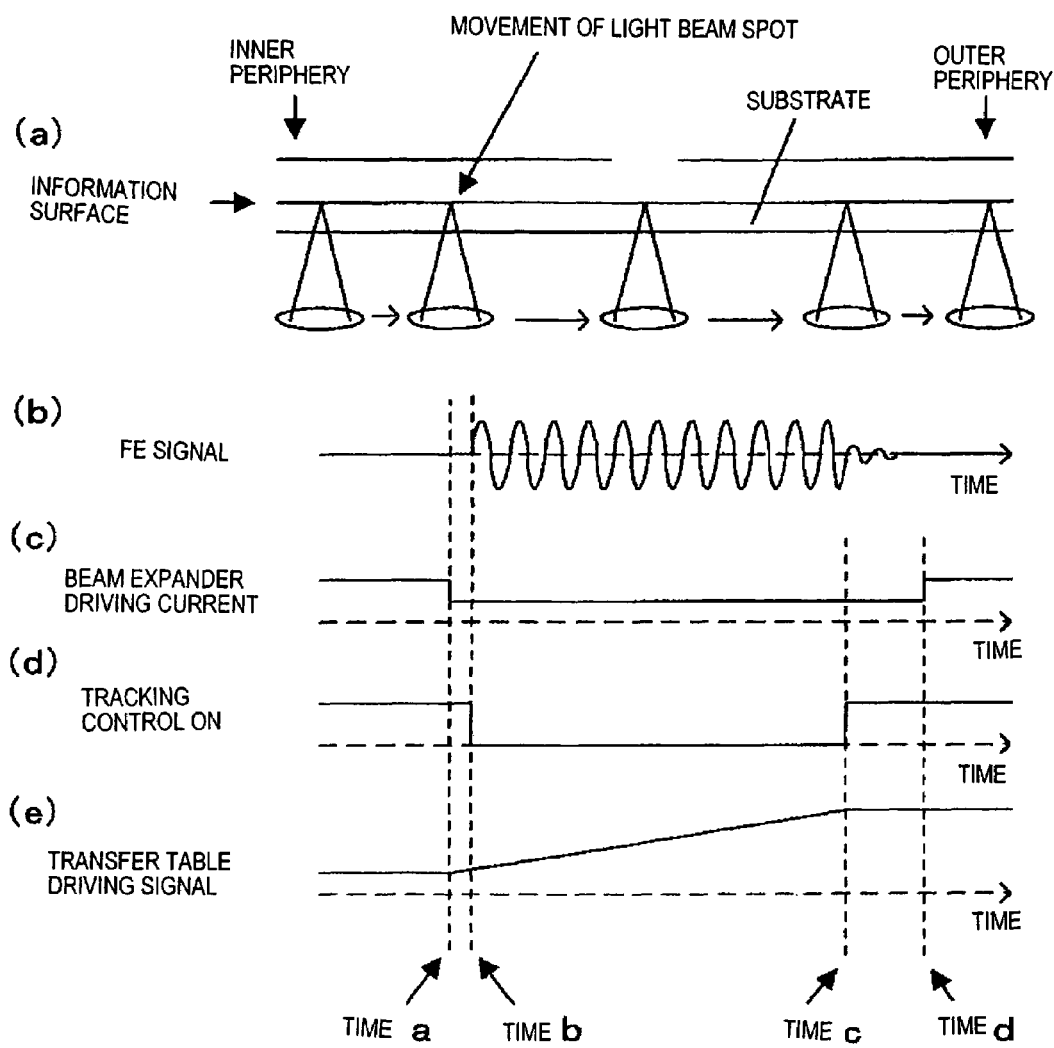
FIGS. 46(a) to 46(e) are waveform charts for explaining spherical aberration correction during a search according to Embodiment 10.
Figure 47:
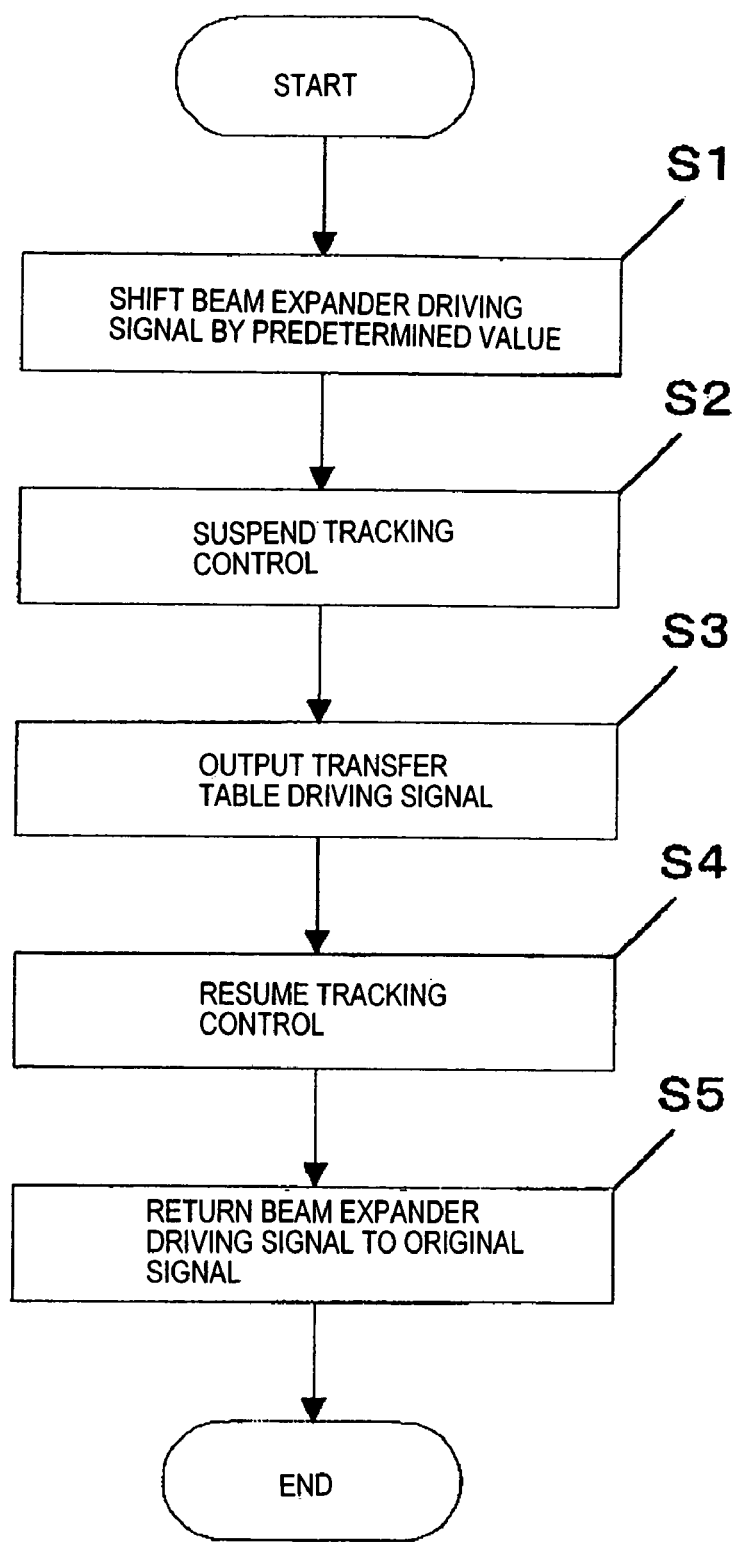
FIG. 47 is a flowchart showing the sequence of spherical aberration correction during movement in the radius direction according to Embodiment 10.

FIG. 45 is a block diagram showing the configuration of an optical disc device according to Embodiment 10. FIG. 46 is a waveform chart for explaining spherical aberration correction during search according to Embodiment 10. FIG. 47 is a flowchart showing the sequence of spherical aberration correction in movement along the radius direction according to Embodiment 10. In these drawings, the same members and components as those of the conventional art and Embodiment 6 are indicated by the same reference numerals and the explanation thereof is omitted. Further, as Embodiment 6, focus control is performed based on a focus error signal which is an added signal of an outer peripheral focus error signal and an inner peripheral focus error signal, and a spherical aberration detection signal is generated by a difference signal of the outer peripheral focus error signal and the inner peripheral focus error signal.

A spherical aberration detection signal, which is an output signal of a spherical aberration detector 31, is inputted to a spherical aberration control section 135, and a filtering operation such as phase compensation and gain compensation is performed by the spherical aberration control section 135 to generate a spherical aberration correction signal for correcting spherical aberration. The spherical aberration control section 135 outputs a driving signal for moving a spherical aberration correction lens unit 15 to a beam expander driving circuit 133, and a spherical aberration correction actuator 34 having received the driving signal moves the spherical aberration correction lens unit 15.

Namely, correction control is performed so that spherical aberration is almost 0, that is, a focal point B and a focal point C of FIG. 2 are coincident with each other as described in Embodiment 6. In other words, correction control is performed so that the focal point B and the focal point C are both brought close to a position A.

A tracking error signal generator 18 generates, based on the output signal of a preamplifier 11, an error signal of a track 28 and a light beam spot, which has been outputted from an optical head 5 and focused, with respect to the radius direction of the optical disc 20. The tracking error signal generator 18 generates a tracking error signal (hereinafter, referred to as a TE signal) based on an input signal according to a method of detecting a tracking error, the method being generally called the push-pull method. The TE signal which is the output signal of the tracking error signal generator 18 is subjected to a filtering operation such as phase compensation and gain compensation in a tracking control section 19. Thereafter, the TE signal is outputted to a tracking actuator driving circuit 26.

An objective lens 1 is driven by a tracking actuator 27 based on a driving signal generated by the tracking actuator driving circuit 26, the light beam spot is driven so as to scan the tracks 28 on an information layer 29 of the optical disc 20, and thus tracking control is achieved.

The optical head 5 can be moved in the radius direction of the optical disc 20 by a transfer table 60 acting as searching means. Moreover, the transfer table 60 is driven by an output signal (driving signal) from a transfer table driving circuit 62. However, when focus control and spherical aberration control are performed and tracking control is not performed, during crossing of a light beam spot over the tracks on the information layer 29, disturbance having a frequency equal to that of the TE signal is superimposed on the FE signal, resulting in unstable focus control. The present invention is devised in view of the above problem.

Hence, when tracking control is not performed, spherical aberration control is stopped and the spherical aberration actuator is displaced from the optimum position to cause spherical aberration. A light beam on the information layer is increased in spot size by the occurrence of spherical aberration. Thus, since the spot size becomes larger than the pitch of a groove, the TE signal is reduced in amplitude. Therefore, disturbance superimposed on the FE signal is reduced in amplitude.

Figure 48:
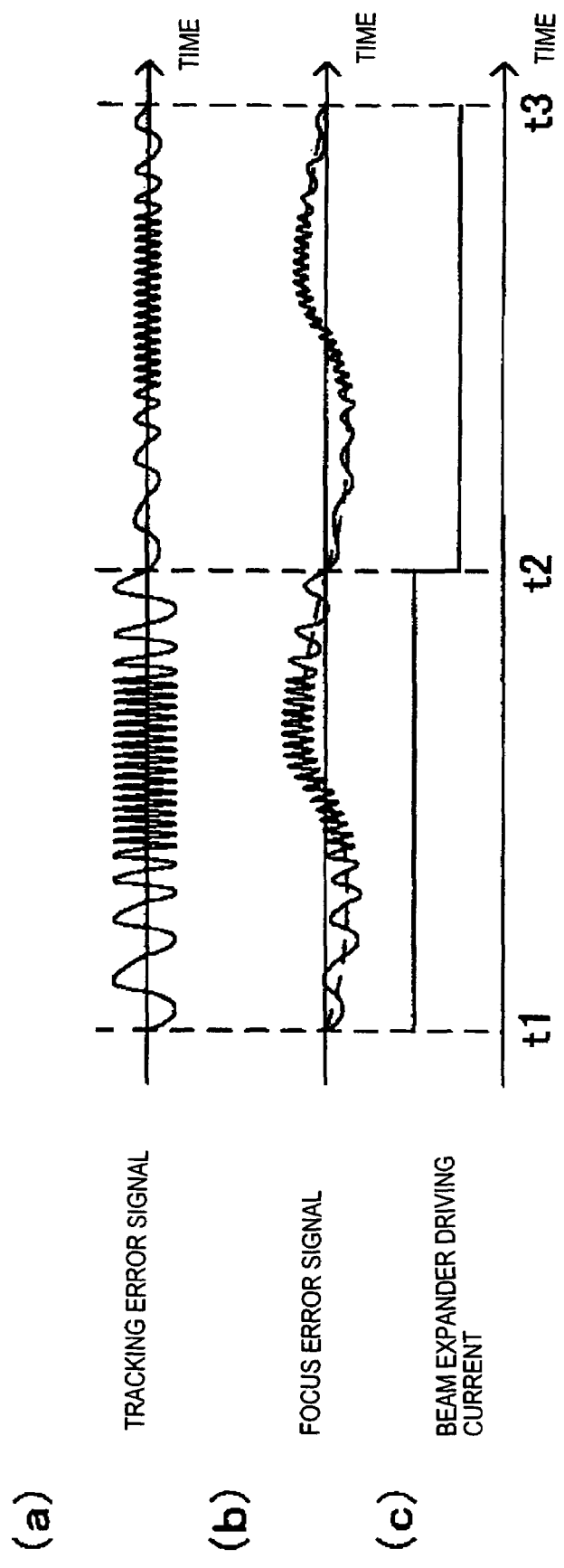
FIGS. 48(a) to 48(c) are waveform charts showing the influence of the crossing of grooves upon a focus error signal according to Embodiment 10.

Referring to FIG. 48, this operation will be discussed below. Additionally, an uneven thickness of a substrate is changed at a frequency higher than the band of the focus control system and a frequency lower than the band of the spherical aberration control system. FIG. 48(a) shows the output of the tracking error signal generating section 18, FIG. 48(b) shows the output of a focus error signal generating section 36, and FIG. 48(c) shows the output of the beam expander driving circuit 133. The vertical axis of FIG. 48(c) represents current, the vertical axes of the other waveforms represent voltages of the signals, and a horizontal axis represents time. Besides, in a section from time t1 to time t2, the beam expander driving circuit 133 has the optimum output and no spherical aberration occurs on a beam spot on the information layer of the optical disc 20. Moreover, in a section from time t2 to time t3, the output of the beam expander driving circuit 133 is shifted from the optimum value by a predetermined amount and spherical aberration considerably occurs on a beam spot on the information layer 29 of the optical disc 20.

Since the tracks on the optical disc 20 have eccentricity, a number of tracks are crossed when tracking control is not operated. A tracking error signal has the waveform of FIG. 48(a). Since a focus error signal is generated by the astigmatic method the light beam spot crosses over the truck, the signal is affected by the crossing of grooves and has the waveform of FIG. 48(b).

Besides, in FIG. 48(b), a solid line indicates a focus error signal affected by the crossing of grooves and a broken line indicates a focus error signal not being affected by the crossing of grooves.

In FIG. 48(c), a section from time t1 to t2 indicates the optimum output causing no spherical aberration on a beam spot on the information layer of the optical disc 20, and a section from time t2 to time t3 indicates an output shifted from the optimum value by a predetermined amount so that spherical aberration considerably occurs on a beam spot on the information layer 29.

Since no spherical aberration occurs on the information layer in the section from time t1 to t2, the tracking error signal has the maximum amplitude as shown FIG. 48(a). However, since spherical aberration considerably occurs in the section from time t2 to t3, the tracking error signal is reduced in amplitude. Similarly the crossing of grooves occurring on the focus error signal has the maximum influence in the section from time t1 to t2 during which no spherical aberration occurs on the information layer, and the influence is reduced in the section from time t2 to t3 during which spherical aberration considerably occurs.

In this way, when tracking control is not performed, spherical aberration control is stopped, the influence of the crossing of grooves upon the focus error signal can be reduced by shifting the correction amount of spherical aberration from the optimum position by a predetermined amount, and thus focus control is stabilized. Moreover, since it is possible to reduce a disturbance component which is the influence of the crossing of grooves, current flowing to the focus actuator 2 can be reduced and the focus actuator 2 can be protected from a damage caused by overcurrent on the focus actuator 2.

Referring to FIG. 46, this operation will be discussed below. FIG. 46(a) shows the position in the radius direction of a light beam spot relative to time. Similarly FIG. 46(b) shows the output of the focus error signal generator 31, FIG. 46(c) shows the output of the beam expander driving circuit 133, FIG. 46(d) shows the operating state of the tracking control section 19, and FIG. 46(e) shows an output to the transfer table driving circuit 62. A vertical axis represents voltages of the signals and a horizontal axis represents time.

In the radius direction movement during searching and so on, the spherical aberration control section 135 firstly stops, at time a, the output to the beam expander driving circuit 133 based on the output of the spherical aberration detector 31 according to an instruction of the microcomputer 8 as shown in FIG. 46(c). Similarly an output value of the beam expander driving circuit 133 is changed so as to move the spherical aberration correction lens unit 15 to a position shifted by a predetermined value from a position having spherical aberration of almost 0. Then, as shown in FIG. 46(d), the tracking control section 19 suspends tracking control at time b according to an instruction of the microcomputer 8.

Subsequently, the microcomputer 8 outputs a transfer table driving signal to the transfer table driving circuit 62 until time c as shown in FIG. 46(e). From time b to time c, the transfer table driving circuit 62 moves the transfer table 60, which is loaded with the optical head 5, in the radius direction of the optical disc 20 based on the transfer table driving signal transmitted from the microcomputer 8. Thus, as shown in FIG. 46(a), a light beam spot is moved from the inner periphery to the outer periphery of the optical disc. Subsequently, as shown in FIG. 46(d), the tracking control section 19 resumes tracking control at time c according to an instruction of the microcomputer 8. Finally as shown in FIG. 46(c), the spherical aberration control section 135 cancels the stopping of an output to the beam expander driving circuit 133 at time d according to an instruction of the microcomputer 8, the stopping having been performed according to the output of the spherical aberration detector 31, and the spherical aberration control section 135 resumes spherical aberration control.

In this way, when tracking control is not performed, the spherical aberration correction lens unit 15 is shifted by a predetermined amount to increase spherical aberration occurring on a light beam spot, so that the influence of the crossing of grooves upon the FE signal can be reduced.

Referring to the flowchart of FIG. 47, an operation for movement in the radius direction of a light beam spot will be further discussed below. First in step S1, the microcomputer 8 instructs the spherical aberration control section 135 to stop spherical aberration control and move the spherical aberration correction lens unit 15 to a position shifted by a predetermined value from a current control position. In step S2, the microcomputer 8 instructs the tracking control section 19 to suspend tracking control. In step S3, the microcomputer 8 outputs a transfer table driving signal to the transfer table driving circuit 62 so as to move a light beam spot to a target radius position. In step S4, the microcomputer 8 instructs the tracking control section 19 to resume tracking control. In step S5, the microcomputer 8 instructs the spherical aberration control section 135 to return the spherical aberration correction lens unit 15 having been shifted from the control position by the predetermined value to the control position of step S1 and resume spherical aberration control, and thus the operation is completed.

Hence, during a search with a movement in the radius direction, it is possible to reduce the influence of the crossing of grooves upon the FE signal, achieving stable focus control.

The above embodiments described the optical disc devices in which data is written on an optical disc having one or two information storage layers or data is read from such an optical disc. The number of information storage layers may be three or more.

Additionally, regarding the optical disc devices of Embodiments 6 to 10, the stepping motor 35 and the spherical aberration correction actuator which are used for the optical disc of Embodiment 1 may be used to drive the spherical aberration correction lens. Particularly when the information recording surface of the optical disc has three or more layers, the stepping motor 35 is added with effect.

INDUSTRIAL APPLICABILITY

According to an optical disc of the present invention, even when an objective lens for emitting a light beam on the optical disc has a lager NA than a conventional NA (e.g. NA is 0.85 or larger), spherical aberration can be properly corrected, achieving recording/reproduction of data with a high density.

The invention claimed is:

1. An optical disc device, comprising:
   converging means for converging a light beam toward an information storage medium,
   a focus actuator for moving the converging means substantially perpendicularly to an information layer of the information storage medium,
   spherical aberration changing means for changing spherical aberration occurring on a converging position of the light beam converged by the converging means,
   driving means for operating the spherical aberration changing means,
   light-receiving means for receiving light reflected from the information storage medium of the light beam,
   converging state detecting means for detecting a signal according to a converging state on the information layer of the information storage medium of the light beam based on a signal of the light-receiving means,
   focus control means for driving the focus actuator based on a signal of the converging state detecting means and performing control so that the light beam is converged on a desired position of the information layer of the information storage medium,
   spherical aberration detecting means for detecting a signal, based on a signal of the light-receiving means, according to an amount of spherical aberration occurring on the converging position of the light beam on the information layer of the information storage medium,
   spherical aberration control means for driving the driving means based on a signal of the spherical aberration detecting means and performing control so that spherical aberration is almost 0, and
   spherical aberration signal correcting means for amplifying a signal of the converging state detecting means by a predetermined gain and then adding the signal to a detection signal of the spherical aberration detecting means.

2. The optical disc device of claim 1, further comprising:
   first test signal generating means for applying a test signal to the focus actuator,
   first amplitude detecting means for detecting amplitude of the detection signal of the spherical aberration detecting means, and
   spherical aberration correction learning means for calculating an added gain of the spherical aberration signal correcting means so that the first amplitude detecting means detects minimum amplitude of the spherical aberration detecting signal in a state in which the test signal is applied to the focus actuator by the first test signal generating means.

3. The optical disc device of claim 2, wherein the spherical aberration correction learning means learns an added gain in a state in which the focus control means is operated and the spherical aberration control means is not operated.

4. The optical disc device of claim 1, wherein the spherical aberration signal correction means comprises added gain storing means for storing an added gain for each layer in the information unit having information layers in a laminated structure, and added gain switching means for retrieving an added gain corresponding to a position of the optical beam from the added gain storing means and switching the added gain.

5. The optical disc device of claim 1, further comprising:
   first test signal generating means for applying a test signal to the focus actuator,
   focus control gain adjusting means for adjusting a gain of the focus control means,
   second test signal generating means for applying a test signal to the driving means, and
   spherical aberration control gain adjusting means for adjusting a gain of the spherical aberration control means,
   wherein when the focus control means and the spherical aberration control means are operated, the focus control gain adjusting means makes an adjustment based on a first test signal generated by the first test signal generating means and the first test signal after focus control, and the spherical aberration control gain adjusting means makes an adjustment based on a spherical aberration test signal generated by the second test signal generating means and the spherical aberration test signal after spherical aberration control.

* * * * *